US008704675B2

(12) United States Patent
Jung et al.

(10) Patent No.: US 8,704,675 B2
(45) Date of Patent: Apr. 22, 2014

(54) OBTAINING USER ASSISTANCE

(75) Inventors: Edward K. Y. Jung, Bellevue, WA (US); Royce A. Levien, Lexington, MA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 644 days.

(21) Appl. No.: 12/798,451

(22) Filed: Apr. 2, 2010

(65) Prior Publication Data

US 2010/0309011 A1 Dec. 9, 2010

Related U.S. Application Data

(63) Continuation-in-part of application No. 10/955,966, filed on Sep. 30, 2004, and a continuation-in-part of application No. 10/974,476, filed on Oct. 26, 2004, and a continuation-in-part of application No. 10/974,555, filed on Oct. 26, 2004, and a continuation-in-part of application No. 10/974,561, filed on Oct. 27, 2004, now Pat. No. 8,341,522, and a continuation-in-part of application No. 10/978,243, filed on Oct. 29, 2004, and a continuation-in-part of application No. 11/000,687, filed on Dec. 1, 2004, and a continuation-in-part of application No. 11/000,736, filed on Dec. 1, 2004, and a continuation-in-part of application No. 11/037,828, filed on Jan. 18, 2005, and a continuation-in-part of application No. 11/037,825, filed on Jan. 18, 2005, now Pat. No. 7,664,736, and a continuation-in-part of application No. 11/037,827, filed on Jan. 18, 2005, now Pat. No. 7,798,401.

(51) Int. Cl.
*G08B 21/00* (2006.01)

(52) U.S. Cl.
USPC ............... 340/686.6; 340/568.1; 340/426.21

(58) Field of Classification Search
USPC ........... 340/686.6, 572.1, 539.13, 585, 691.6, 340/686.4, 568.1, 426.21, 539.22
See application file for complete search history.

(56) References Cited

U.S. PATENT DOCUMENTS

| 5,287,102 A | 2/1994 | McKiel, Jr. |
| 5,311,434 A | 5/1994 | Tamai |
| 5,388,251 A | 2/1995 | Makino et al. |
| 5,812,977 A | 9/1998 | Douglas |
| 5,825,355 A | 10/1998 | Palmer et al. |

(Continued)

FOREIGN PATENT DOCUMENTS

| JP | 2002-123349 | 4/2002 |
| JP | 2003-030207 | 1/2003 |

(Continued)

OTHER PUBLICATIONS

U.S. Appl. No. 11/528,480, Jung, et al.

(Continued)

*Primary Examiner* — Daniel Previl
(74) *Attorney, Agent, or Firm* — Suiter Swantz pc llo

(57) ABSTRACT

An apparatus, device, method, computer program product, and system that detects a first electronic device in a proximity to a second electronic device; and obtains an end user assistance corresponding to an at least substantially common aspect of the first electronic device and the second electronic device.

31 Claims, 51 Drawing Sheets

(56) References Cited

U.S. PATENT DOCUMENTS

| | | | |
|---|---|---|---|
| 5,877,757 A | 3/1999 | Baldwin et al. | |
| 5,887,171 A | 3/1999 | Tada et al. | |
| 5,923,325 A | 7/1999 | Barber et al. | |
| 5,938,721 A | 8/1999 | Dussell et al. | |
| 5,965,858 A | 10/1999 | Suzuki et al. | |
| 5,985,858 A | 11/1999 | Miyata et al. | |
| 5,991,739 A | 11/1999 | Cupps et al. | |
| 6,107,938 A * | 8/2000 | Du et al. | 340/12.22 |
| 6,112,181 A | 8/2000 | Shear et al. | |
| 6,167,255 A | 12/2000 | Kennedy, III et al. | |
| 6,230,170 B1 | 5/2001 | Zellweger et al. | |
| 6,256,378 B1 | 7/2001 | Iggulden et al. | |
| 6,385,541 B1 | 5/2002 | Blumberg et al. | |
| 6,462,660 B1 | 10/2002 | Cannon et al. | |
| 6,466,899 B1 | 10/2002 | Yano et al. | |
| 6,542,814 B2 | 4/2003 | Polidi et al. | |
| 6,584,496 B1 | 6/2003 | Ludtke | |
| 6,650,902 B1 | 11/2003 | Richton | |
| 6,651,053 B1 | 11/2003 | Rothschild | |
| 6,727,830 B2 | 4/2004 | Lui et al. | |
| 6,788,313 B1 | 9/2004 | Heil | |
| 6,799,205 B2 | 9/2004 | Ludtke | |
| 6,816,881 B1 | 11/2004 | Mohindra et al. | |
| 6,823,188 B1 | 11/2004 | Stern | |
| 6,829,668 B2 | 12/2004 | Keskar et al. | |
| 6,874,037 B1 | 3/2005 | Abram et al. | |
| 6,882,712 B1 | 4/2005 | Iggulden et al. | |
| 6,892,936 B2 | 5/2005 | Riggert et al. | |
| 6,920,612 B2 | 7/2005 | Makinen | |
| 6,967,576 B2 * | 11/2005 | Hayes et al. | 340/572.1 |
| 7,043,691 B1 | 5/2006 | Kwon et al. | |
| 7,055,737 B1 | 6/2006 | Tobin et al. | |
| 7,082,365 B2 | 7/2006 | Sheha et al. | |
| 7,129,927 B2 | 10/2006 | Mattsson | |
| 7,202,783 B2 * | 4/2007 | Want et al. | 340/568.1 |
| 7,212,827 B1 * | 5/2007 | Veschl | 455/456.1 |
| 7,277,884 B2 | 10/2007 | Vadai et al. | |
| 7,446,655 B2 | 11/2008 | Jha et al. | |
| 7,457,628 B2 | 11/2008 | Blumberg et al. | |
| 7,490,763 B2 | 2/2009 | Keohane et al. | |
| 7,684,321 B2 | 3/2010 | Muirhead et al. | |
| 7,798,401 B2 * | 9/2010 | Jung et al. | 235/385 |
| 8,284,034 B2 | 10/2012 | Stewart et al. | |
| 2001/0055976 A1 | 12/2001 | Crouch et al. | |
| 2002/0007225 A1 | 1/2002 | Costello et al. | |
| 2002/0023144 A1 | 2/2002 | Linyard et al. | |
| 2002/0032497 A1 | 3/2002 | Jorgenson et al. | |
| 2002/0062280 A1 | 5/2002 | Zachariassen et al. | |
| 2002/0069030 A1 | 6/2002 | Xydis | |
| 2002/0075243 A1 | 6/2002 | Newton | |
| 2002/0105550 A1 | 8/2002 | Biebesheimer et al. | |
| 2002/0105582 A1 | 8/2002 | Ikeda | |
| 2002/0107610 A1 | 8/2002 | Kaehler et al. | |
| 2002/0133545 A1 | 9/2002 | Fano et al. | |
| 2002/0152173 A1 | 10/2002 | Rudd | |
| 2002/0164997 A1 | 11/2002 | Parry | |
| 2003/0016238 A1 | 1/2003 | Sullivan et al. | |
| 2003/0018742 A1 | 1/2003 | Imago | |
| 2003/0032426 A1 | 2/2003 | Gilbert et al. | |
| 2003/0035075 A1 | 2/2003 | Butler et al. | |
| 2003/0043178 A1 | 3/2003 | Gusler et al. | |
| 2003/0048288 A1 | 3/2003 | Drif et al. | |
| 2003/0058266 A1 | 3/2003 | Dunlap et al. | |
| 2003/0064805 A1 | 4/2003 | Wells | |
| 2003/0098876 A1 | 5/2003 | Makinen | |
| 2003/0100964 A1 | 5/2003 | Kluge et al. | |
| 2003/0101178 A1 | 5/2003 | Miyata et al. | |
| 2003/0125057 A1 | 7/2003 | Pesola | |
| 2003/0132854 A1 | 7/2003 | Swan et al. | |
| 2003/0191820 A1 | 10/2003 | Ludtke | |
| 2003/0222897 A1 | 12/2003 | Moore et al. | |
| 2003/0227392 A1 | 12/2003 | Ebert et al. | |
| 2004/0034651 A1 | 2/2004 | Gupta et al. | |
| 2004/0067773 A1 | 4/2004 | Rachabathuni et al. | |
| 2004/0088228 A1 | 5/2004 | Mercer et al. | |
| 2004/0088696 A1 | 5/2004 | Kawano et al. | |
| 2004/0090451 A1 | 5/2004 | Lay et al. | |
| 2004/0093102 A1 | 5/2004 | Liiri et al. | |
| 2004/0095480 A1 | 5/2004 | Battles et al. | |
| 2004/0103153 A1 | 5/2004 | Chang et al. | |
| 2004/0107043 A1 | 6/2004 | de Silva | |
| 2004/0107144 A1 | 6/2004 | Short | |
| 2004/0111273 A1 | 6/2004 | Sakagami et al. | |
| 2004/0117131 A1 * | 6/2004 | Peters et al. | 702/34 |
| 2004/0117634 A1 | 6/2004 | Letterer et al. | |
| 2004/0121764 A1 | 6/2004 | Rivero | |
| 2004/0128613 A1 | 7/2004 | Sinisi | |
| 2004/0136574 A1 | 7/2004 | Kozakaya et al. | |
| 2004/0139180 A1 | 7/2004 | White et al. | |
| 2004/0162896 A1 | 8/2004 | Cen et al. | |
| 2004/0174434 A1 | 9/2004 | Walker et al. | |
| 2004/0179545 A1 * | 9/2004 | Erola et al. | 370/449 |
| 2004/0201867 A1 | 10/2004 | Katano | |
| 2004/0205191 A1 | 10/2004 | Smith et al. | |
| 2004/0242224 A1 | 12/2004 | Janik et al. | |
| 2005/0055287 A1 | 3/2005 | Schmidtberg et al. | |
| 2005/0060436 A1 | 3/2005 | Kienhoefer | |
| 2005/0076302 A1 | 4/2005 | Okamoto | |
| 2005/0080879 A1 | 4/2005 | Kim et al. | |
| 2005/0136903 A1 | 6/2005 | Kashima et al. | |
| 2005/0154985 A1 * | 7/2005 | Burkhart et al. | 715/705 |
| 2005/0160270 A1 | 7/2005 | Goldberg et al. | |
| 2005/0219223 A1 | 10/2005 | Kotzin et al. | |
| 2005/0228869 A1 | 10/2005 | Imago | |
| 2005/0262062 A1 | 11/2005 | Xia | |
| 2005/0268234 A1 | 12/2005 | Rossi et al. | |
| 2006/0026304 A1 | 2/2006 | Prince | |
| 2006/0028428 A1 | 2/2006 | Dai et al. | |
| 2006/0055805 A1 | 3/2006 | Stockton et al. | |
| 2006/0073815 A1 | 4/2006 | Pines et al. | |
| 2006/0076398 A1 | 4/2006 | Jung et al. | |
| 2006/0080188 A1 | 4/2006 | Jung et al. | |
| 2006/0081695 A1 | 4/2006 | Jung et al. | |
| 2006/0086781 A1 | 4/2006 | Jung et al. | |
| 2006/0090132 A1 | 4/2006 | Jung et al. | |
| 2006/0092033 A1 | 5/2006 | Hoff et al. | |
| 2006/0100912 A1 | 5/2006 | Kumar et al. | |
| 2006/0115802 A1 | 6/2006 | Reynolds | |
| 2006/0116979 A1 | 6/2006 | Jung et al. | |
| 2006/0117001 A1 | 6/2006 | Jung et al. | |
| 2006/0157550 A1 | 7/2006 | Jung et al. | |
| 2006/0170687 A1 | 8/2006 | Nakamura et al. | |
| 2006/0173816 A1 | 8/2006 | Jung et al. | |
| 2006/0190428 A1 | 8/2006 | Jung et al. | |
| 2006/0206817 A1 | 9/2006 | Jung et al. | |
| 2007/0005233 A1 | 1/2007 | Pinkus et al. | |
| 2007/0027903 A1 | 2/2007 | Evans et al. | |
| 2007/0033414 A1 | 2/2007 | Dunko | |
| 2007/0038529 A1 | 2/2007 | Jung et al. | |
| 2007/0040013 A1 | 2/2007 | Jung et al. | |
| 2007/0064644 A1 | 3/2007 | Dowling et al. | |
| 2010/0005153 A1 | 1/2010 | Tsao | |

FOREIGN PATENT DOCUMENTS

| | | |
|---|---|---|
| JP | 2003-084954 | 3/2003 |
| JP | 2003114897 | 4/2003 |
| JP | 2003-228451 | 8/2003 |

OTHER PUBLICATIONS

U.S. Appl. No. 11/524,025, Jung, et al.
U.S. Appl. No. 11/069,893, Jung, et al.
U.S. Appl. No. 11/061,387, Jung, et al.
U.S. Appl. No. 11/041,861, Jung, et al.
U.S. Appl. No. 11/037,828, Jung, et al.
U.S. Appl. No. 11/037,827, Jung, et al.
U.S. Appl. No. 12/012,216, Jung, et al.
"IBM RFID solution for asset tracking and inventory management"; pp. 1-3; located at: http://www-1.ibm.com/industries/wireless/doc/content/solution/1025230104.html; printed on Feb. 3, 2005.
"IBM RFID solution for asset tracking and inventory management"; pp. 1-3; located at: http://www-1.ibm.com/industries/wireless/doc/content/solution/1025230204.html; printed on Feb. 3, 2005.

(56) References Cited

OTHER PUBLICATIONS

Kuchinskas, Susan; "IBM in Major RFID Expansion"; Jupiterimages; Sep. 27, 2004; pp. 1-2; located at: http://www.internetnews.com/wireless/print.php/3412991; printed on Feb. 3, 2005.
Kuchinskas, Susan; "IBM Takes on Flood of RFID Data"; Jupiterimages; Jul. 19, 2004; pp. 1-3; located at: http://www.internetnews.com/ent-news/print.php/3382621; printed on Feb. 3, 2005.
"Nordstrom: Inventory Management Transformation"; Accenture.com; bearing a date of 1995-2005; pp. 1-2; located at: http://www.accenture.com/xd/xd.asp?it=industries%5Cproducts%5Cretail%5Ccase%5Creta_nordstrom.xml; printed on Feb. 3, 2005.
"Solutions"; Profit Logic; pp. 1-2; located at: http://www.profitlogic.com/solutions.htm; printed on Feb. 3, 2005.
The EPCglobal Network(TM): Overview of Design, Benefits, & Security; EPCglobal Inc.; Sep. 24, 2004; pp. 1-11; located at: http://www.epcglobalinc.org/news/position_papers.html; printed on Feb. 3, 2005.
Japanese State Intellectual Property Office, Office Action; App. No. 2007-538180 (Based on PCT Patent Application No. PCT/US05/038495);Bearing a date of May 31, 2011 (received by our Agent on May 31, 2011); pp. 1-2 (Translation not available).
The State Intellectual Property Office of the People's Republic of China, Office Action; App. No. 2005-80044439.3; Oct. 19, 2011; 6 pages (translation not available).
Chinese State Intellectual Property Office, Decision of Final Rejection, App. No. 2005/800444393 (Based on PCT Patent Application No. PCT/US2005/038495); Oct. 13, 2010 (received by our Agent on Oct. 20, 2010); pp. 1-13.
U.S. Appl. No. 12/592,071, Jung et al.
U.S. Appl. No. 12/592,073, Jung et al.
U.S. Appl. No. 12/660,240, Jung et al.
U.S. Appl. No. 12/660,245, Jung et al.
European Patent Office, Supplementary European Search Report, Pursuant to Rule 62 EPC; App. No. EP 05824191;Sep. 15, 2010 (received by our Agent on Sep. 24, 2010); pp. 1-5.
Japanese State Intellectual Property Office, Notice of Rejection; App. No. 2007-538180 (Based on PCT Patent Application No. PCT/US05/038495); Bearing a date of May 31, 2011 (received by our Agent on May 31, 2011); pp. 1-2 (machine translation).
Excerpt from the Cambridge Dictionary Online; bearing a date of 2009; printed on Oct. 23, 2009; pp. 1-2; Cambridge University Press; located at http://dictionary.cambridge.org/define.asp?key=62453&dict=CALD; (as provided by examiner).
PCT International Search Report; International App. No. PCT/US05/38495; Jul. 9, 2008; pp. 1-2.
PCT International Search Report; International App. No. PCT/US05/38839; Jul. 7, 2008; pp. 1-3.
Heywood, Drew; "Drew Heywood's Windows 2000 Network Services"; bearing a date of Feb. 28, 2001; pp. 1-17; Sam's; located at http://proquest.safaribooksonline.com/print?xmlid=0672317419/ch01lev1sec4; printed on Mar. 13, 2008.
"Capabilities"; Profit Logic; pp. 1-2; located at: http://www.profitlogic.com/capabilities.htm; printed on Feb. 3, 2005.
Emigh, Jacqueline; "IBM Unleashes New RFID Middleware"; eWeek Enterprise News & Reviews—Attention Health Care Technology Experts; bearing dates of Dec. 16, 2004 and 2005; pp. 1-2; located at: http://www.eweek.com/print_article2/0,2533,a=141068,00.asp; printed on Feb. 3, 2005.
"EPC RFID-based Inventory Management Solution Delivers Faster, Better Goods Logistics"; Solution Architects; bearing a date of 2003; pp. 1-15; located at: www.intel.com/business/bss/solutions/blueprints/pdf/30034101.pdf; printed on Jan. 10, 2005.
"Get real time warehouse management with Cadence WMS."; Cadre Cadence Warehouse Management System Software; pp. 1; located at: http://www.cadretech.com/warehouse_mgmt.html; printed on Jan. 10, 2005.

\* cited by examiner

FIG. 11

402 A computer-readable medium.

404 A computer program for executing on a computing device a computer process, the computer process comprising:
a) receiving a signal indicative of an item having a presence within a geographic locale;
b) identifying the item in response to the signal indicative of an item; and
c) obtaining an end user assistance corresponding to the item.

562 A computer-readable medium.

564 A computer program for executing on a computing device a computer process, the computer process comprising:
 a) receiving a signal indicative of an aspect of an item having a presence within a geographic locale;
 b) identifying the item in response to the signal indicative of an aspect of an item having a presence within a geographic locale;
 c) obtaining an end user assistance corresponding to the aspect of the item; and
 d) save the end user assistance corresponding to the aspect of the item.

568 detecting a presence of the item within a geographic locale 570 generating the signal indicative of the aspect of an item 572 requesting the end user assistance corresponding to aspect of the item 574 providing the end user assistance corresponding to the aspect of the item

902 A computer-readable medium.

904 A computer program product encoding a computer program for executing on a computing device a computer process, the computer process comprising:
  a) identifying an operative coupling between a first electronic device and a second electronic device, the first and second electronic devices having a presence in a geographic locale; and
  b) obtaining an end user assistance corresponding to the operative coupling.

906 c) Receiving a signal indicative of the operative coupling between a first electronic device and a second electronic device.

908 c) Saving the end user assistance corresponding to the operative coupling.

910 c) Providing the end user assistance corresponding to the operative coupling.

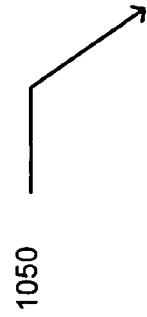

1052 A computer-readable medium.

1054 A computer program product encoding a computer program for executing on a computing device a computer program, the computer process comprising:
    a) detecting a transition of an electronic device from a first state to a second state; and
    b) obtaining an end user assistance corresponding to the second state.

1056 c) Receive a signal indicative of the operative coupling between a first electronic device and a second electronic device.

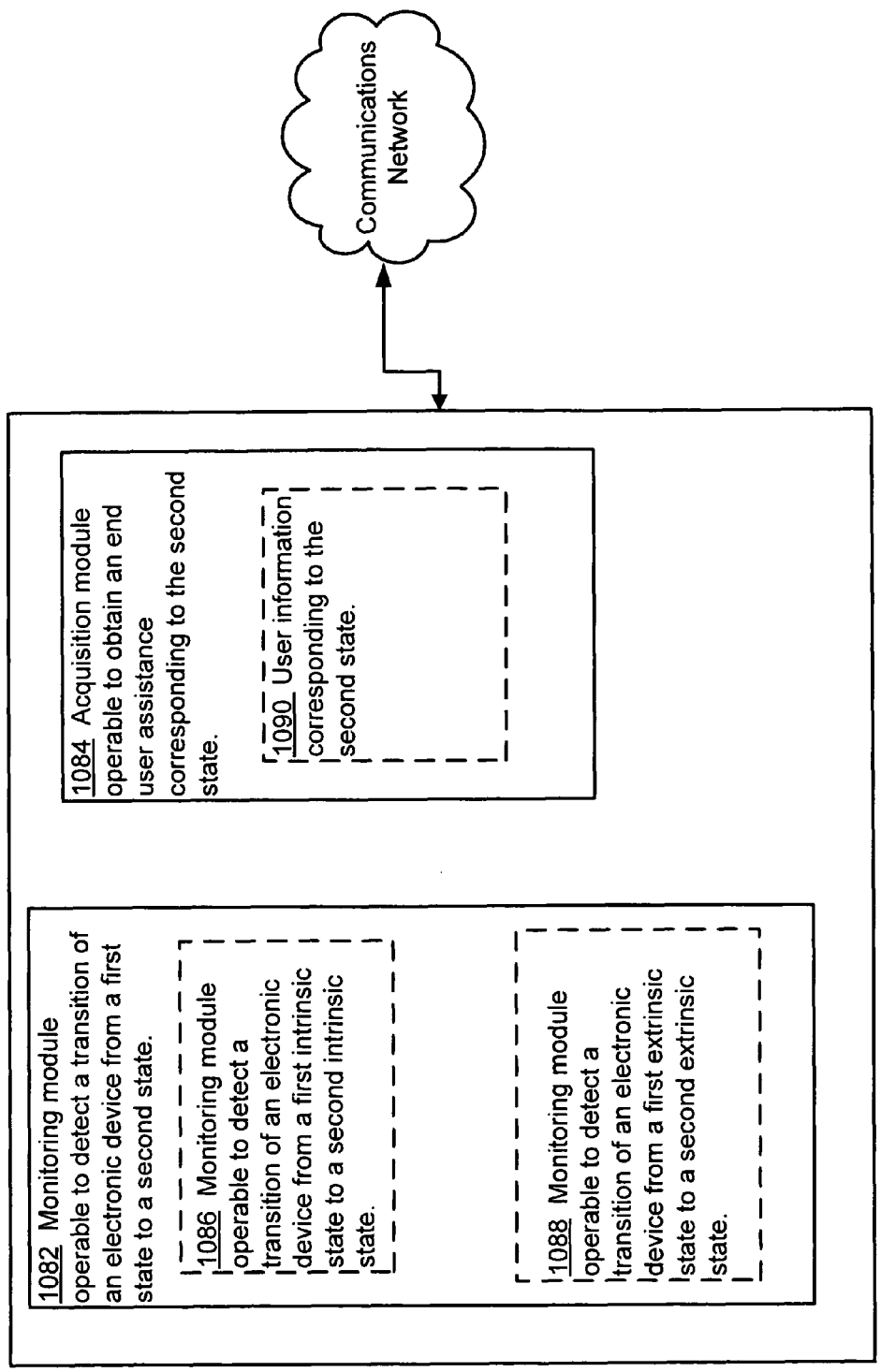

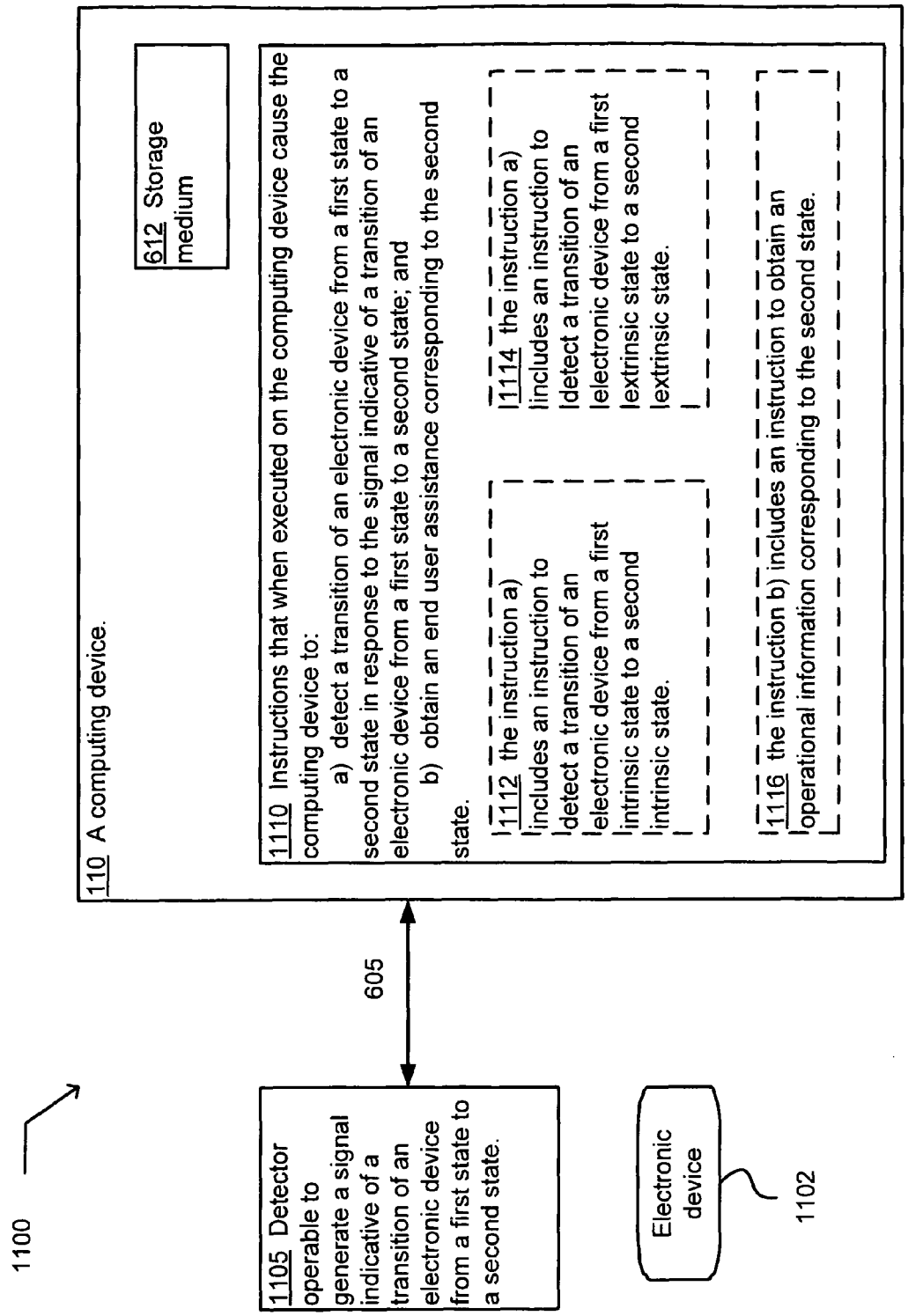

1202 A computer-readable medium.

1204 A computer program product encoding a computer program for executing on a computing device a computer process, the computer process comprising:
  a) identifying a state of an electronic device;
  b) obtaining an end user assistance corresponding to the state of the electronic device; and
  c) providing the end user assistance.

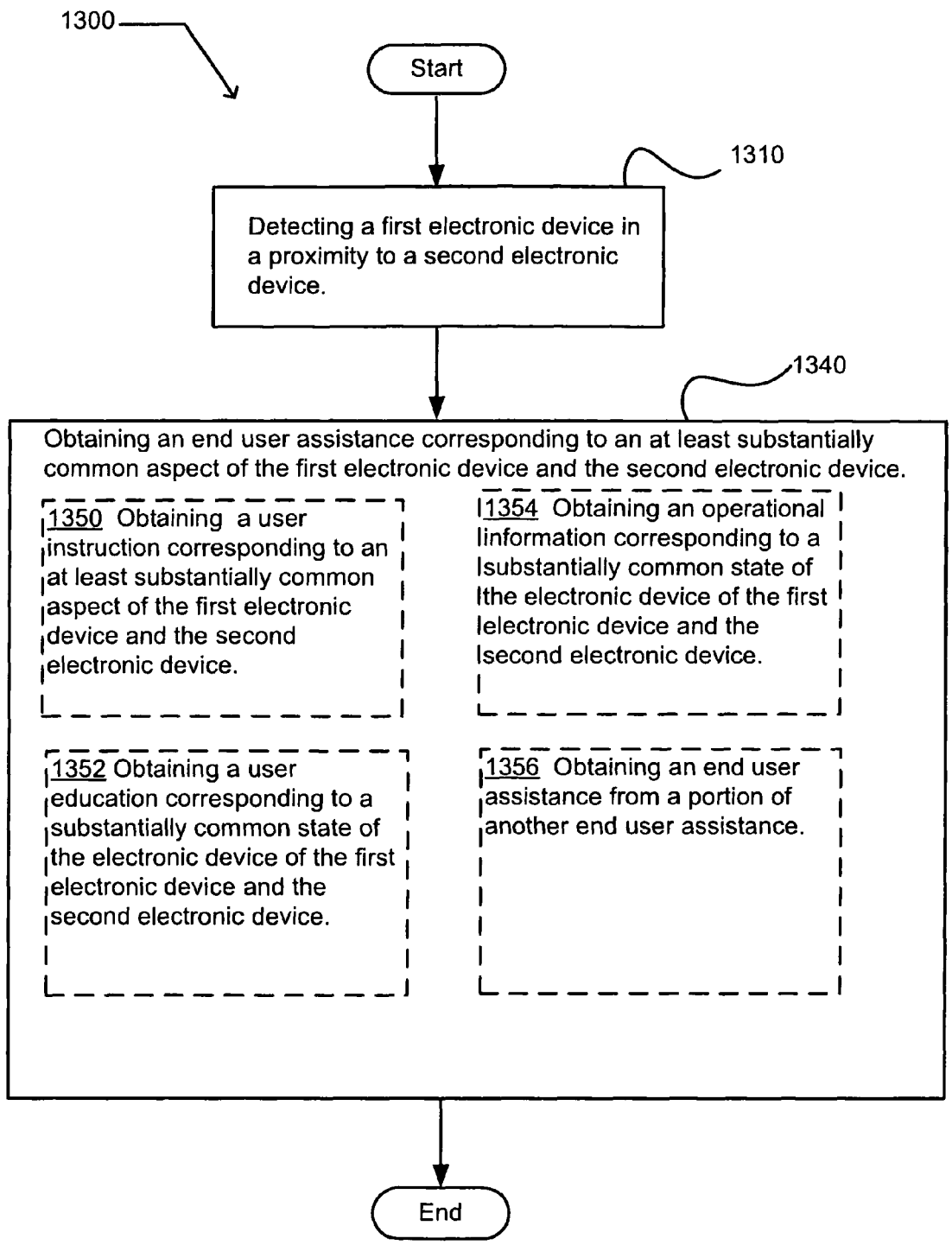

FIG. 48

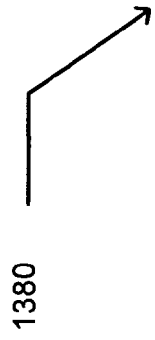

1380

1382 A computer-readable medium.

1384 A computer program product encoding a computer program for executing on a computing device a computer process, the computer process comprising:
 a) detecting a first electronic device in a proximity to a second electronic device; and
 b) obtaining an end user assistance corresponding to an at least substantially common aspect of the first electronic device and the second electronic device.

1386 c) providing the end user assistance.

OBTAINING USER ASSISTANCE

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the herein listed application(s); the present application also claims the earliest available effective filing date(s) from, and also incorporates by reference in its entirety all subject matter of any and all parent, grandparent, great-grandparent, etc. applications of the herein listed application(s). The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. For purposes of the USPTO extra-statutory requirements, the present application constitutes a continuation in part of currently co-pending United States patent application entitled PROVIDING ASSISTANCE, naming Edward K. Y. Jung, Royce A. Levien, Mark A. Malamud, and John D. Rinaldo, Jr., as inventors, filed Sep. 30, 2004, Ser. No. 10/955,966.

2. For purposes of the USPTO extra-statutory requirements, the present application constitutes a continuation in part of currently co-pending United States patent application entitled ENHANCED USER ASSISTANCE, naming Edward K. Y. Jung, Royce A. Levien, Mark A. Malamud, and John D. Rinaldo, Jr., as inventors, filed Oct. 26, 2004, Ser. No. 10/974,476.

3. For purposes of the USPTO extra-statutory requirements, the present application constitutes a continuation in part of United States patent application entitled ENHANCED USER ASSISTANCE, naming Edward K. Y. Jung, Royce A. Levien, Mark A. Malamud, and John D. Rinaldo, Jr., as inventors, filed Oct. 26, 2004, Ser. No. 10/974,555.

4. For purposes of the USPTO extra-statutory requirements, the present application constitutes a continuation in part of United States patent application entitled ENHANCED CONTEXTUAL USER ASSISTANCE, naming Edward K. Y. Jung, Royce A. Levien, Mark A. Malamud, and John D. Rinaldo, Jr., as inventors, filed Oct. 27, 2004, Ser. No. 10/974,561 now U.S. Pat. No. 8,341,522.

5. For purposes of the USPTO extra-statutory requirements, the present application constitutes a continuation in part of currently co-pending United States patent application entitled ENHANCED USER ASSISTANCE, naming Edward K. Y. Jung, Royce A. Levien, Mark A. Malamud, and John D. Rinaldo, Jr., as inventors, filed Oct. 29, 2004, Ser. No. 10/978,243.

6. For purposes of the USPTO extra-statutory requirements, the present application constitutes a continuation in part of currently co-pending United States patent application entitled ENHANCED USER ASSISTANCE, naming Edward K. Y. Jung, Royce A. Levien, Mark A. Malamud, and John D. Rinaldo, Jr., as inventors, filed Dec. 1, 2004, Ser. No. 11/000,687.

7. For purposes of the USPTO extra-statutory requirements, the present application constitutes a continuation in part of currently co-pending United States patent application entitled ENHANCED USER ASSISTANCE, naming Edward K. Y. Jung, Royce A. Levien, Mark A. Malamud, and John D. Rinaldo, Jr., as inventors, filed Dec. 1, 2004, Ser. No. 11/000,736.

8. For purposes of the USPTO extra-statutory requirements, the present application constitutes a continuation in part of currently co-pending United States patent application entitled OBTAINING USER ASSISTANCE, naming Edward K. Y. Jung, Royce A. Levien, Mark A. Malamud, and John D. Rinaldo, Jr., as inventors, filed Jan. 18, 2005, Ser. No. 11/037,828.

9. For purposes of the USPTO extra-statutory requirements, the present application constitutes a continuation in part of United States patent application entitled OBTAINING USER ASSISTANCE, naming Edward K. Y. Jung, Royce A. Levien, Mark A. Malamud, and John D. Rinaldo, Jr., as inventors, filed Jan. 18, 2005, Ser. No. 11/037,825 now U.S. Pat. No. 7,664,736.

10. For purposes of the USPTO extra-statutory requirements, the present application constitutes a continuation in part of United States patent application entitled OBTAINING USER ASSISTANCE, naming Edward K. Y. Jung, Royce A. Levien, Mark A. Malamud, and John D. Rinaldo, Jr., as inventors, filed Jan. 18, 2005, Ser. No. 11/037,827 now U.S. Pat. No. 7,798,401.

The above applications are specifically incorporated herein by reference in their entirety for all that they disclose and teach. In an event of any conflict between the instant application and an application incorporated by reference, the instant application controls.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

An embodiment provides a method. The method includes detecting a first electronic device in a proximity to a second electronic device, and obtaining an end user assistance corresponding to an at least substantially common aspect of the first electronic device and the second electronic device. The method may include providing the end user assistance.

Another embodiment provides a computer program product encoding a computer program for executing a computer process on a computing device. The computer process including detecting a first electronic device in a proximity to a second electronic device, and obtaining an end user assistance corresponding to an at least substantially common aspect of the first electronic device and the second electronic device. The computer process may include providing the end user assistance. In addition to the foregoing, other computer program product embodiments are described in the claims, drawings, and text forming a part of the present application.

A further embodiment provides a system. The system includes a computing device and instructions. The instructions when executed on the computing device cause the computing device to detect a first electronic device in a proximity to a second electronic device, and obtain an end user assistance corresponding to an at least substantially common aspect of the first electronic device and the second electronic device. The instructions further include providing the end user assistance. In addition to the foregoing, other system embodiments are described in the claims, drawings, and text forming a part of the present application.

An embodiment provides a device. The device includes a monitoring module operable to detect a first electronic device in a proximity to a second electronic device. The device also includes an acquisition module operable to obtain an end user assistance corresponding to an at least substantially common aspect of the first electronic device and the second electronic device. The device may include a broadcast module operable to provide the end user assistance.

In addition to the foregoing, various other embodiments are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein.

BRIEF DESCRIPTION OF THE DRAWINGS

FIG. 11 illustrates a partial view of an exemplary computer program product that includes a computer program for executing a computer process on a computing device;

FIG. 18 illustrates a partial view of an exemplary computer program product that includes a computer program for executing a computer process on a computing device;

FIG. 27 illustrates a partial view of an exemplary computer program product that includes a computer program for executing the computer process on a computing device;

FIG. 34 illustrates a partial view of an exemplary computer program product that includes a computer program for executing a computer process on a computing device;

FIG. 35 illustrates an exemplary system in which embodiments may be implemented;

FIG. 36 illustrates another exemplary system in which embodiments may be implemented;

FIG. 40 illustrates a partial view of an exemplary computer program product that includes a computer program for executing a computer process on a computing device;

FIG. 47 illustrates another alternative embodiment of the exemplary operational flow of FIG. 43;

FIG. 48 illustrates a partial view of an exemplary computer program product that includes a computer program for executing a computer process on a computing device;

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Features, functionality, and options of computing devices, such as personal computers, have rapidly advanced and evolved as technology provides increased processor speed, storage capacity, and connectivity. Computing technology has moved beyond the personal computer and into everyday items and devices, providing embedded technology and connectivity. Almost any thing or item, from buildings to clothing, from telephones to tools, from appliances to cars, from homes to the human body, from personal information devices to a common a coffee mug, may have an embedded electronic device that includes a computing device. The embedded electronic device typically improves performance and capacity of a basic functionality of the item, and may connect the item with a network of other items or the Internet. These items with embedded electronic devices may be described using a variety of names, which may not have a bright line distinction between them. Commonly used names include a limited resource-computing device, limited capacity computing device, ubiquitous computing device, pervasive computing device, digital appliance, and Internet appliance. Additionally, rapid advances have been made in interconnectability and interoperability of computing devices and other devices at a consumer level, such as handheld devices and cell phones, and at system and a large system level. These advances are intended to provide a user with many benefits.

Realization of these benefits may require that a user read and re-read manuals for their items. However, a user may experience difficulty obtaining, maintaining, updating, and simply keeping track of all the manuals for the items present and/or used in and around their premises, such as their home and/or business premises. Additionally, manuals are sometimes lost, misplaced, or unavailable. A user may benefit from a method, system, and computer program product that automatically identifies and obtains manuals for items having a presence within a user's geographic locale, such as their home and or/business.

Figure 1:
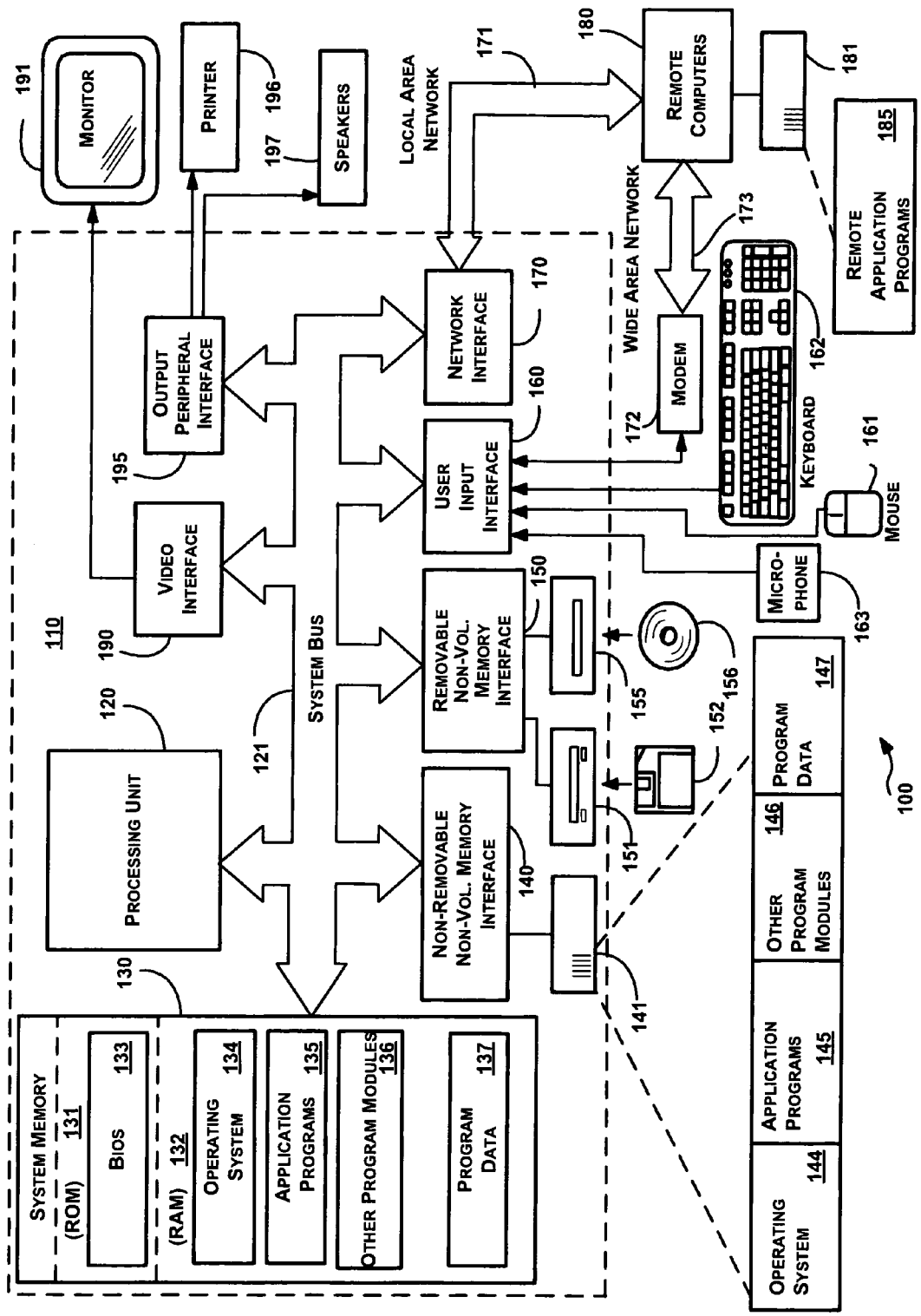
FIG. 1 illustrates an exemplary system in which embodiments may be implemented, including a general-purpose computing device.

FIG. 1 and the following discussion are intended to provide a brief, general description of an environment in which embodiments may be implemented. FIG. 1 illustrates an exemplary electronic device that may correspond in whole or part to a general-purpose computing device, and is shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 1 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 1 provide storage of computer-readable instructions, data structures, program modules, and other data for the computing device 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 1. The logical connections depicted in FIG. 1 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, certain embodiments may be described with reference to acts and symbolic representations of operations that are performed by one or more computing devices, such a computing device 110 of FIG. 1. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIG. 1 illustrates an example of a suitable environment on which embodiments may be implemented. The computing system environment 100 of FIG. 1 is an example of a suitable environment and is not intended to suggest any limitation as to the scope of use or functionality of an embodiment. Neither should the environment be interpreted as having any dependency or requirement relating to any one or combination of components illustrated in an exemplary operating environment.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, server computers, hand-held or laptop devices, personal digital assistants, multiprocessor systems, microprocessor-based systems, set top boxes, programmable consumer electronics, network, minicomputers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in distributed computing environments where tasks are performed by remote processing devices that are linked through a communications network. In a distributed computing environment, program modules may be located in both local and remote computer storage media including memory storage devices.

The following include a series of illustrations depicting implementations of processes. For ease of understanding, certain illustrations are organized such that the initial illustrations present implementations via an overall "big picture" viewpoint and thereafter the following illustrations present alternate implementations and/or expansions of the "big picture" illustrations as either sub-steps or additional steps building on one or more earlier-presented illustrations. This style of presentation utilized herein (e.g., beginning with a presentation of a illustration(s) presenting an overall view and thereafter providing additions to and/or further details in subsequent illustrations) generally allows for a rapid and easy understanding of the various process implementations.

Figure 2:
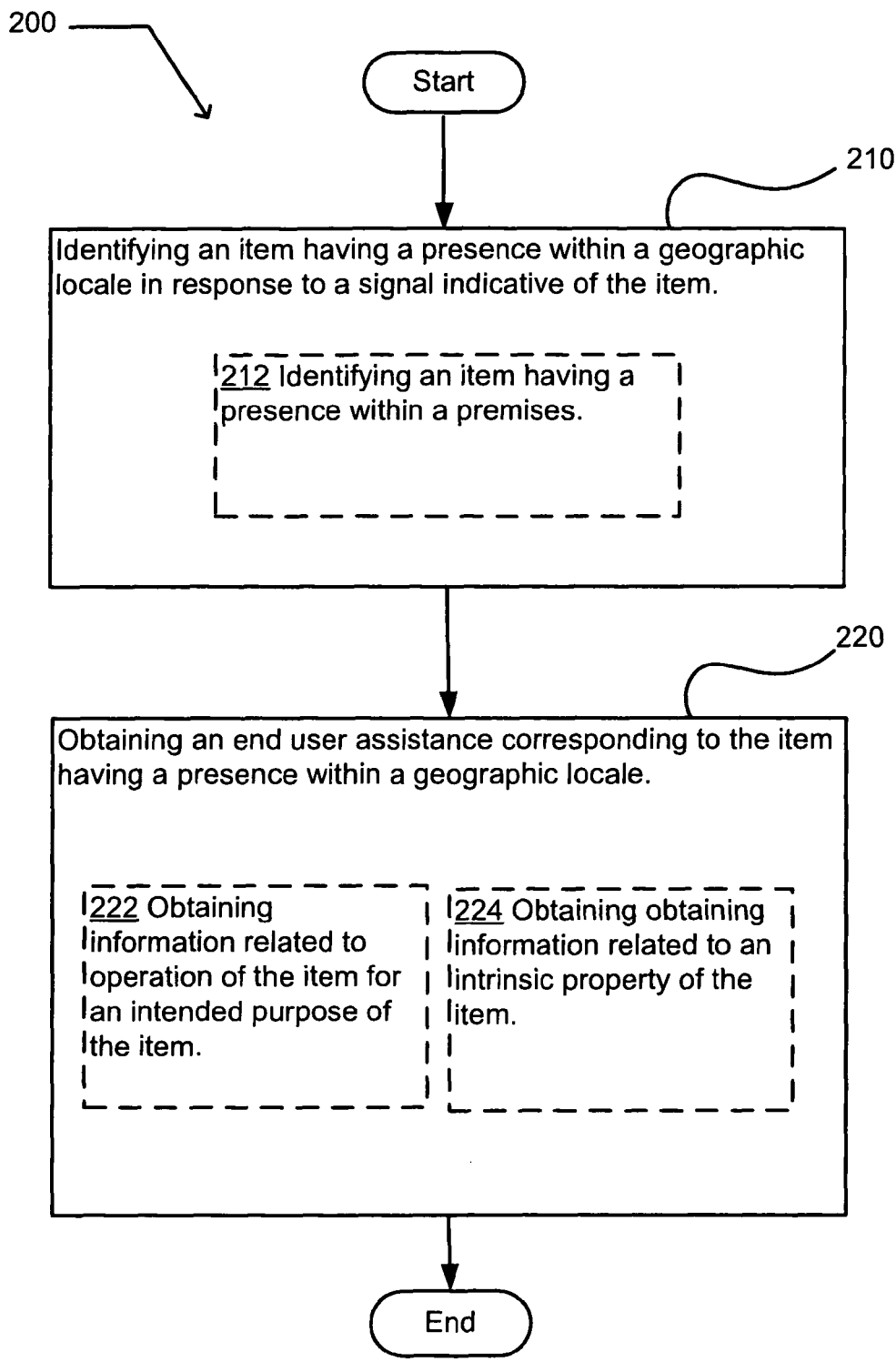
FIG. 2 illustrates an operational flow representing exemplary operations that obtain an assistance corresponding to an item having a presence within a geographic locale.

FIG. 2 illustrates an operational flow 200 representing exemplary operations that obtain an assistance corresponding to an item having a presence within a geographic locale. After a start operation, the operational flow 200 moves to a recognition operation 210 where an item having a presence within a geographic locale is identified in response to a signal indicative of the item. At help operation 220, an end user assistance is obtained corresponding to the item having a presence within a geographic locale. In an embodiment, an end user includes one for whom the item is designed and/or produced, as opposed to those involved creating, manufacturing, transporting, promoting, and/or marketing the item. An end user may include a person, an entity, and/or a government. In another embodiment, an end user includes a consumer of the item. In a further embodiment, an end user assistance may include any type of assistance for an end user. For example, an end user assistance may include an assistance for use by a user, and/or an assistance in operation of the item. In another embodiment, an end user assistance for use by the item may include, for example, an upgrade to a firmware or program present in the item, and responding to a recall notice. A response to a recall notice may include, for example, ordering a replacement part in response to the recall notice.

In an alternative embodiment, the recognition operation 210 may include the operation 212, wherein an item having a presence within a premises is identified in response to a signal indicative of the item. In a further alternative embodiment, the help operation 220 may include the operation 222, wherein information is obtained related to operation of the item for an intended purpose of the item. An alternative embodiment of the help operation 220 may include the operation 224, wherein information is obtained related to an intrinsic property of the item having a presence within a geographic locale. The operational flow 200 then moves to an end operation.

As used herein, in an embodiment, an item may include any object or device capable of having any type of identifiable presence within a geographic locale. For example and without limitation, in certain embodiments an item may include one or more of the following: an electronic device; an appliance; a computing device, such as a personal computer and a server; a limited resource computing device; a pervasive computing device; PDA; a cell phone; a Blackberry appliance; a vehicle, such as a car, boat, and/or aircraft; an X-Box; a home gateway; a set-top box; a point-of-sale terminal; a camera; a TiVo; and an automated teller machine. In other embodiments, an item may be incorporated within another item. In other embodiments, an item may not include a computing device.

Figure 3:
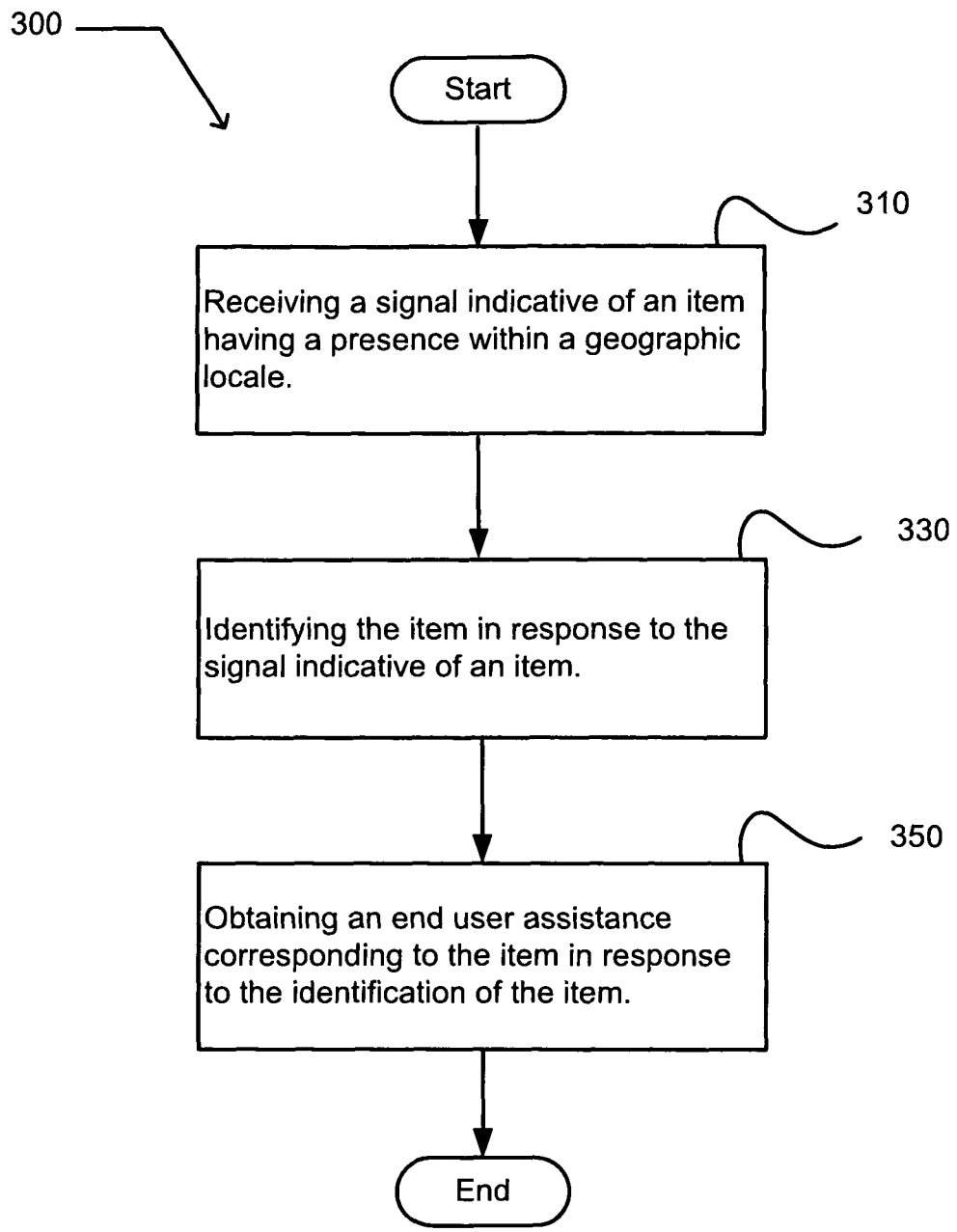
FIG. 3 illustrates another operational flow representing exemplary operations that obtain an assistance corresponding to an item having presence within a geographic locale.

FIG. 3 illustrates an operational flow 300 representing exemplary operations that obtain an assistance corresponding to an item having presence within a geographic locale. After a start operation, the operational flow 300 moves to a reception operation 310. At the operation 310, a signal indicative of an item having a presence within a geographic locale is received. At a recognition operation 330, the item having a presence within a geographic locale is identified in response to the signal indicative of an item. At a help operation 350, an end user assistance is obtained corresponding to the item having a presence within a geographic locale in response to the identification of the item. The operational flow 300 then moves to an end operation.

Figure 4:
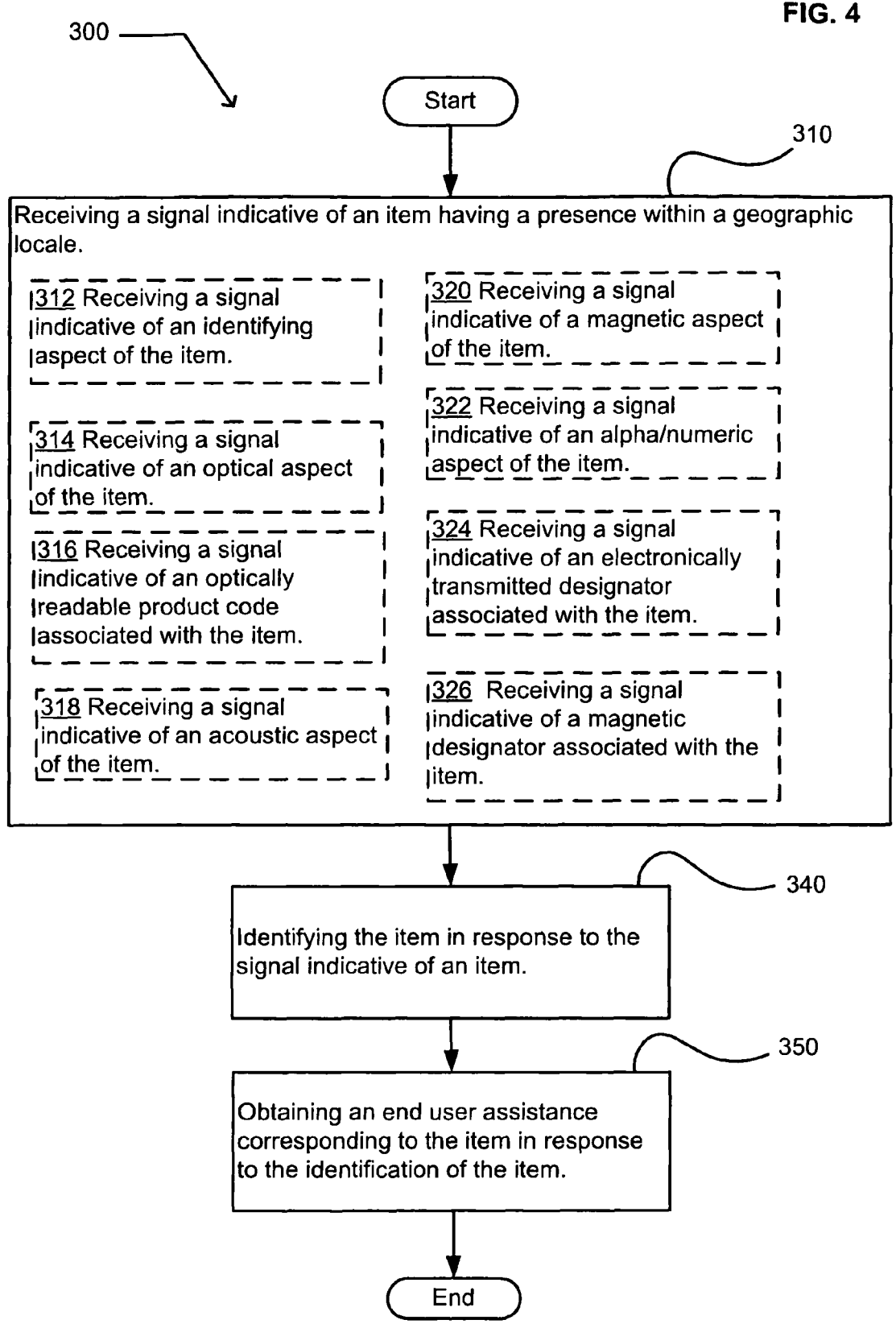
FIG. 4 illustrates an alternative embodiment of the exemplary operational flow of FIG. 3.

FIG. 4 illustrates an alternative embodiment of the exemplary operational flow 300 of FIG. 2. FIG. 4 illustrates an embodiment where the reception operation 310 may include at least one additional operation. Additional operations may include operation 312, operation 314, operation 316, operation 318, operation 320, operation 322, operation 324, and operation 326. At the operation 312, a signal indicative of an identifying aspect of the item is received. An identifying aspect of the item may include any aspect or aspects useful in identifying the item. For example, an identifying aspect of an item may include a profile, a shape, or other of distinguishable aspect of the item. In addition and without limitation, an identifying aspect of the item may include a visual signature the item, an acoustic signature the item, an electromagnetic signature of the item, and/or a magnetic signature of the item. At the operation 314, a signal indicative of an optical aspect of the item is received. An optical aspect of the item may include any optical aspect or aspects useful in identifying the item. For example, an optical aspect may include a known shape, for example a robot, a ship, and a car. At the operation 316, a signal indicative of an optically readable product code associated with the item is received. An optically readable product code associated with the item may include any optically readable product code useful in identifying the item. For example, an optically readable product code may include a bar code reflecting a vehicle identification number, and/or a SKU number.

At the operation 318, a signal indicative of an acoustic aspect of the item is received. An acoustic aspect of the item may include any acoustic aspect or aspects useful identifying the item. For example, an acoustic aspect may include a sound of a motorcycle, such as a Harley Davidson motorcycle. At the operation 320, a signal indicative of a magnetic aspect of the item is received. A magnetic aspect of the item may include a presence or absence of a magnetic characteristic of the item. At the operation 322, a signal indicative of an alpha/numeric aspect of the item is received. An alpha/numeric aspect of the item may include any alpha/numeric aspect useful in identifying the item. For example, an alpha/numeric aspect may include a trademark, such as "Ford" on a vehicle, "Dell" on a computing device. An alpha/numeric aspect may include a model number, and publicly viewable characters on a license plate or an aircraft registration number. At the operation 324, a signal indicative of an electronically transmitted designator associated with the item is received. The electronically transmitted designator may include any designator useful in identifying the item, such as a signal transmitted by an RFID device. At operation 326, a signal indicative of a magnetic designator associated with the item is received. The magnetic designator associated with the item may be any magnetic designator useful identifying the item, such as a scanable magnetic strip incorporated into a card or the item.

Figure 5:
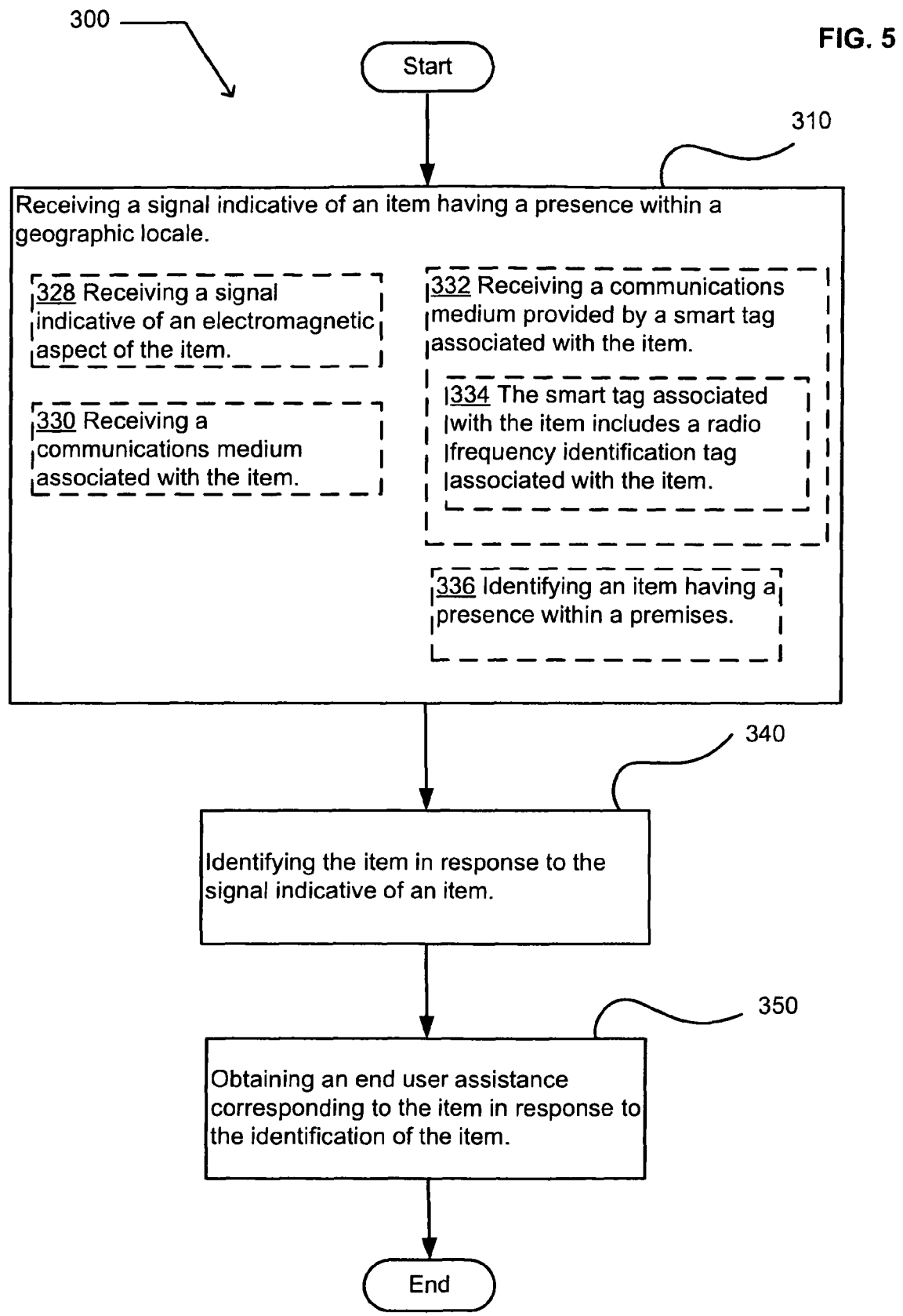
FIG. 5 illustrates another alternative embodiment of the exemplary operational flow of FIG. 3.

FIG. 5 illustrates an alternative embodiment of the exemplary operational flow 300 of FIG. 2. FIG. 5 illustrates an embodiment where the reception operation 310 may include at least one additional operation. The additional operations may include operation 328, operation 330, operation 332, operation 334, and operation 336. At operation 328, a signal indicative of an electromagnetic aspect of the item is received. The electromagnetic aspect may be any aspect of the item useful in identifying the item, such as an electromagnetic signature of the item. At operation 330, a communications medium associated the item is received. The communications medium associated with or associatable with the item may be any communications medium associatable and useful in identifying the item. At operation 332, a communications medium provided by a smart tag associated with the item is received. In a further alternative embodiment, the operation 332 may include operation 334 wherein the smart tag associated with the item includes a radio frequency identification tag associated with the item. the identifying an item having a presence within a geographic locale includes identifying an item having a presence within a premises.

Figure 6:
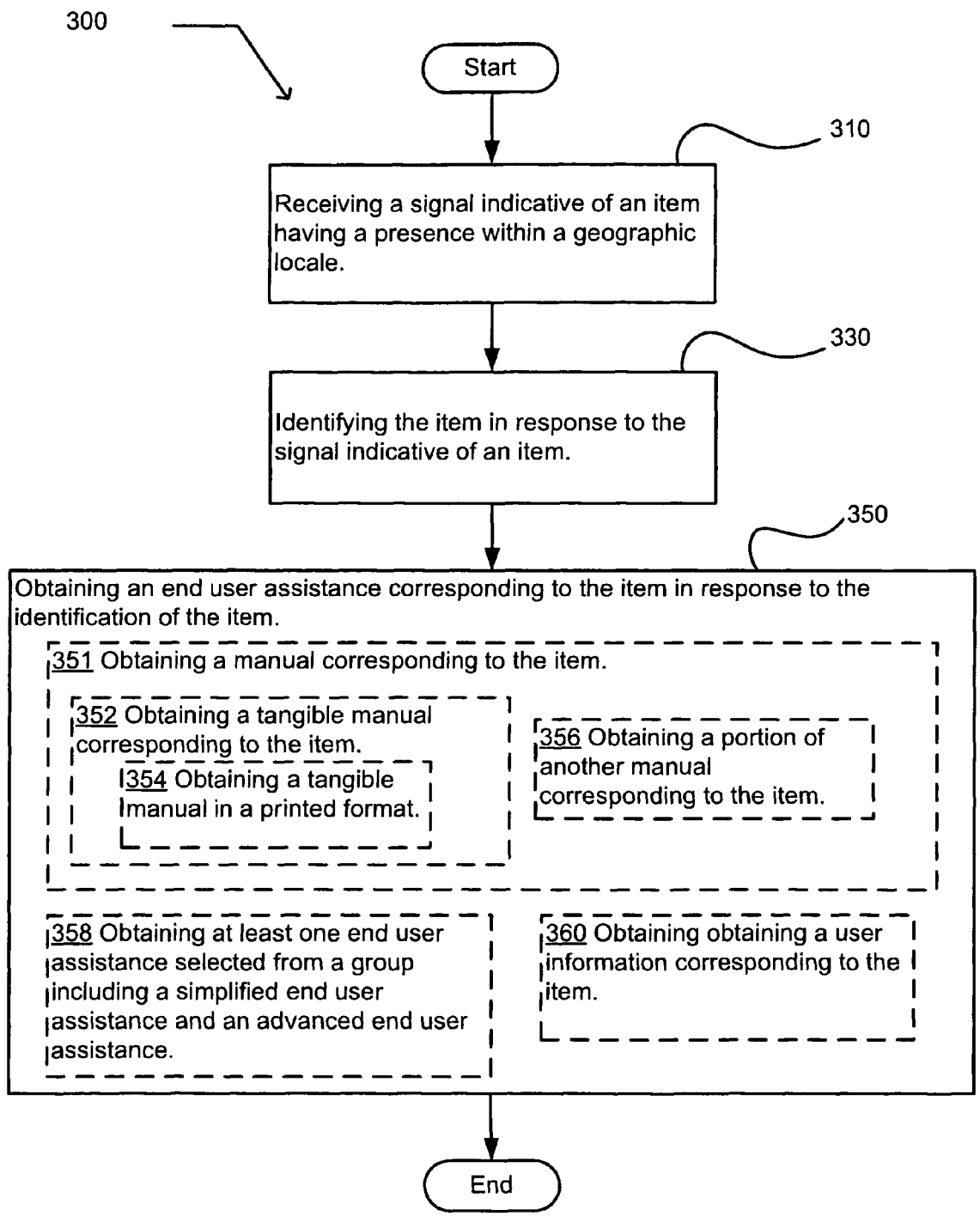
FIG. 6 illustrates a further alternative embodiment of the exemplary operational flow of FIG. 3.

FIG. 6 illustrates an alternative embodiment of the exemplary operational flow 300 of FIG. 2. FIG. 6 illustrates an embodiment where the reception operation 350 may include at least one additional operation. Additional operations may include operation 351, operation 358, and operation 360. At operation 351, a manual corresponding to the item is obtained. Operation 351 may include additional operations, such as operation 352, and operation 356. At operation 352, a tangible manual corresponding to the item is obtained. Operation 352 may include an additional operation 354, wherein a tangible manual in a printed format is obtained. In other alternative embodiments, operation 351 may include obtaining an intangible manual, and the intangible manual may include a manual having a digital format. At operation 356, the obtaining a manual may include a portion of another manual corresponding to the item. At operation 358, at least one end user assistance is obtained by selecting from a group including a simplified user assistance and an advanced user assistance. At operation 360, the obtaining an end user assistance corresponding to the item includes obtaining a user information corresponding to the item.

Figure 7:
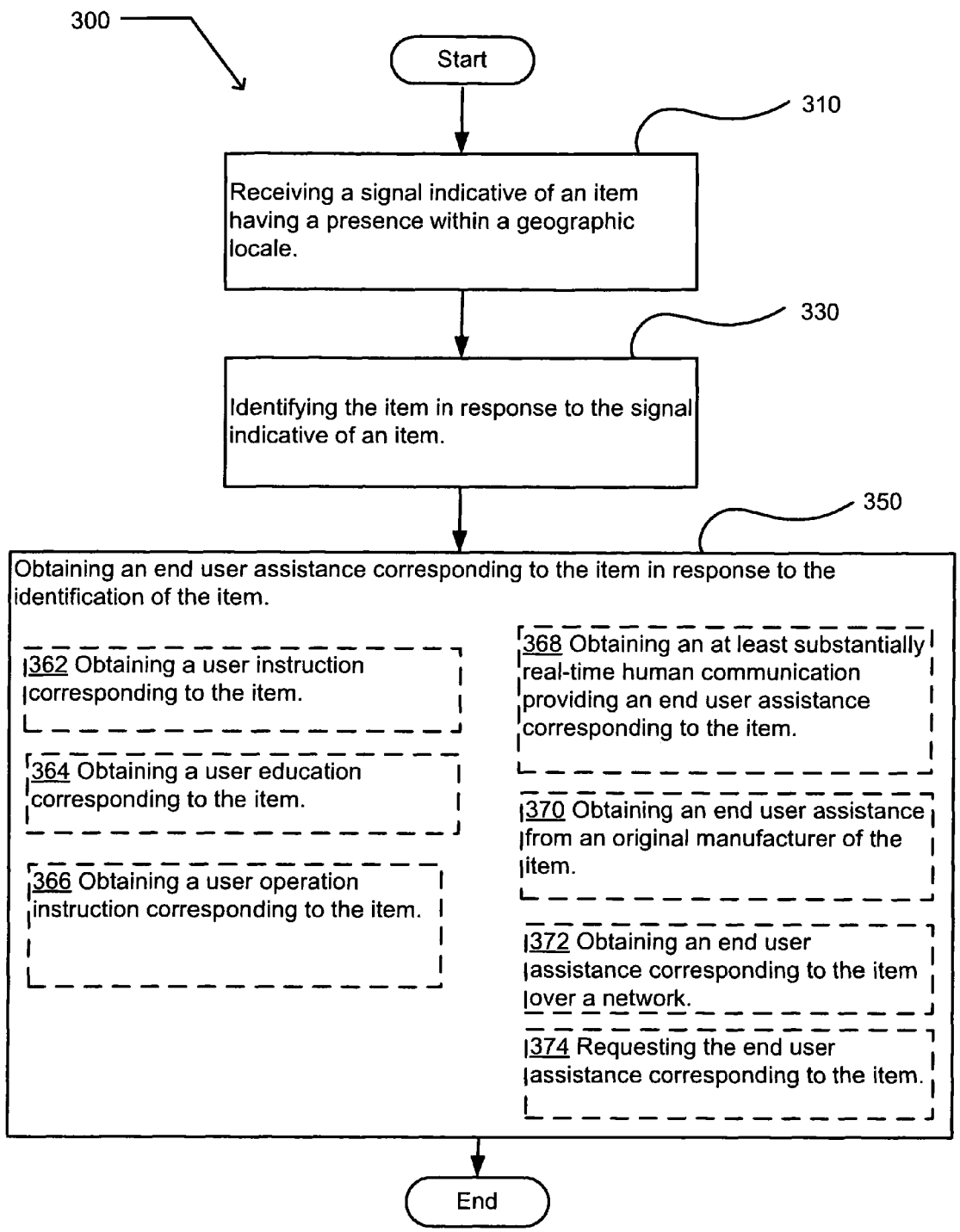
FIG. 7 illustrates yet another alternative embodiment of the exemplary operational flow of FIG. 3.

FIG. 7 illustrates an alternative embodiment of the exemplary operational flow 300 of FIG. 2. FIG. 7 illustrates an embodiment where the reception operation 350 may include at least one additional operation. Additional operations may include operation 362, operation 364, operation 366, operation 368, operation 370, operation 372, and operation 374. At operation 362, a user instruction corresponding to the item is obtained. At operation 364, a user education corresponding to the item is obtained. At operation 366, a user operation instruction corresponding to the item is obtained. At operation 368, an at least substantially real-time human communication is obtained a providing an end user assistance corresponding to the item. At operation 370, an end user assistance is obtained from an original manufacturer of the item. At operation 372, an end user assistance corresponding to the item is delivered over a network. In another alternative embodiment, an end user assistance corresponding to the item is delivered by a mail service, such as the U.S. Post Office or a private mail service. At operation 374, the obtaining an end user assistance corresponding to the item includes requesting the end user assistance corresponding to the item.

Figure 8:
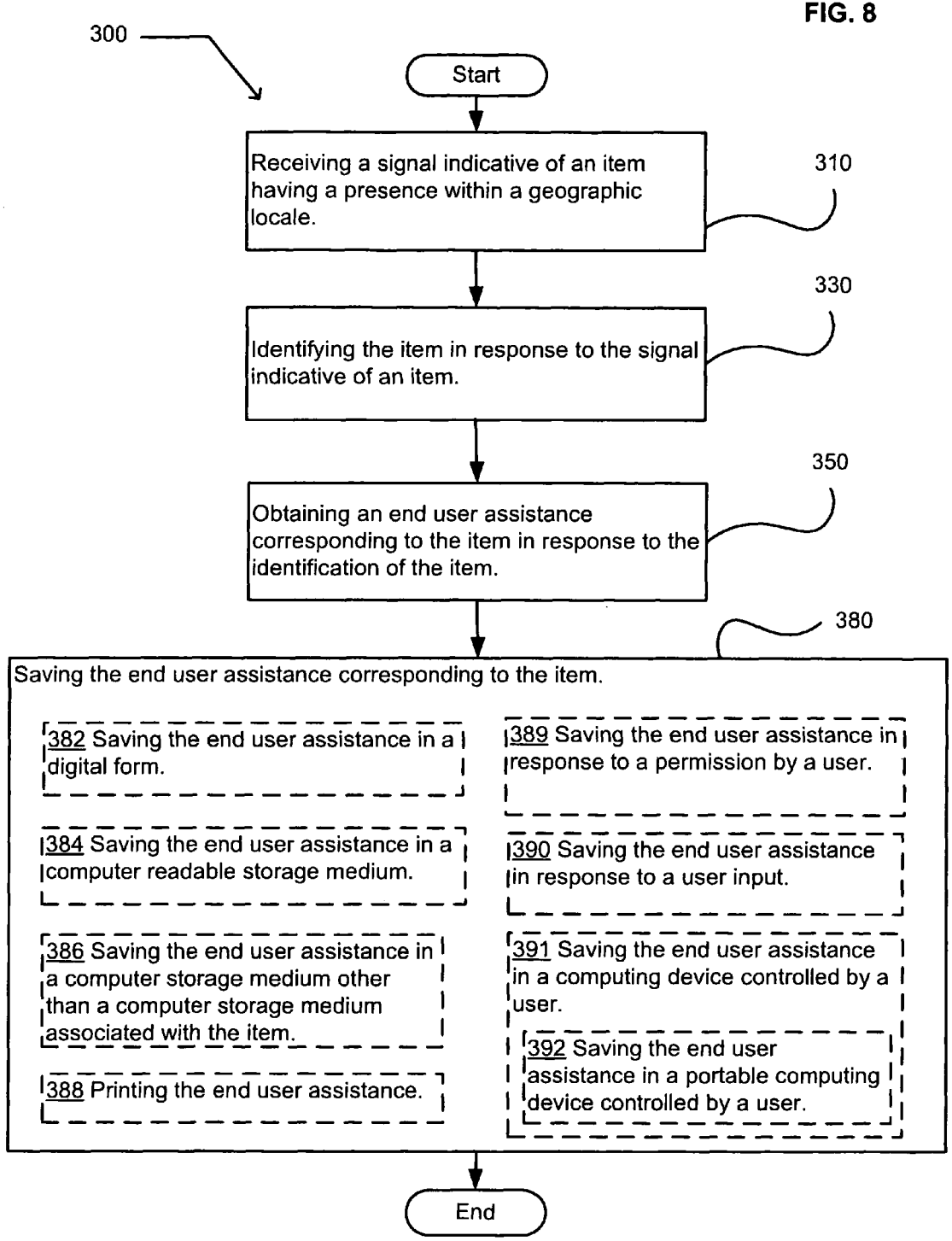
FIG. 8 illustrates an alternative embodiment of the exemplary operational flow of FIG. 3 that includes a retention operation.

FIG. 8 illustrates an alternative embodiment of the exemplary operational flow 300 of FIG. 2 that includes a retention operation 380. At operation 380, the end user assistance corresponding to the item is saved. An alternative embodiment of the operation 380 may include at least one additional operation. Additional operations may include operation 382, operation 384, operation 386, operation 388, operation 389, operation 390, an operation 391. At the operation 382, the end user assistance is saved in a digital form. At operation 384, the end user assistance is saved on a computer readable storage medium. At operation 386, the end user assistance is saved on a computer storage medium other than a computer storage medium associated with the item. At operation 388, the end user assistance is printed. At operation 389, the end user assistance is saved in response to a permission by a user. At operation 390, the end user assistance is saved in response to a user input. At operation 391, the end user assistance is saved in a computing device controlled by a user. An alternative embodiment of the operation 391 includes operation 392, wherein the end user assistance is saved in a portable computing device controlled by the user.

Figure 9:
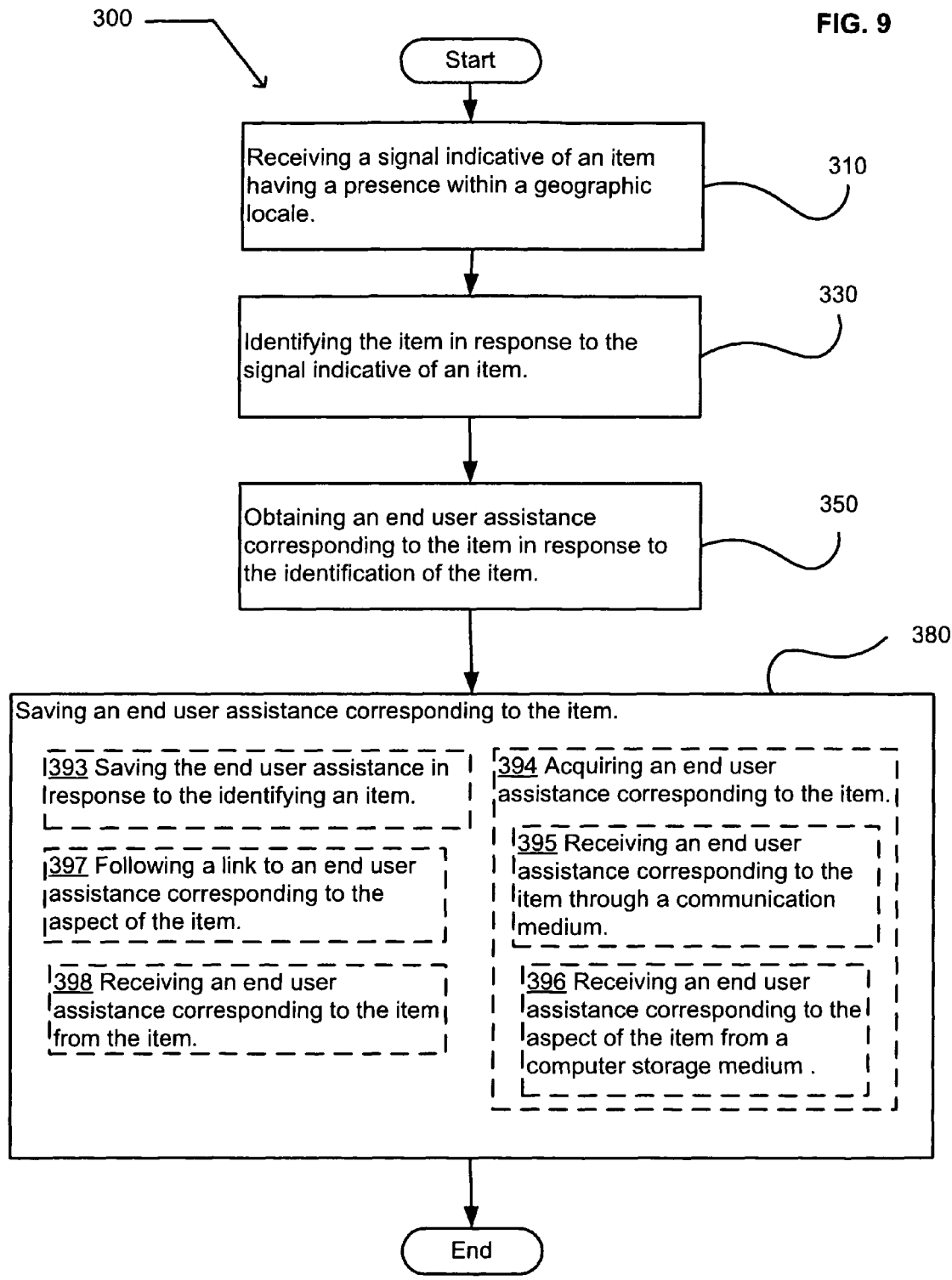
FIG. 9 illustrates an alternative embodiment of the exemplary operational flow of FIGS. 3 and 8.

FIG. 9 illustrates an alternative embodiment of the exemplary operational flow 300 of FIGS. 3 and 8. FIG. 9 illustrates an embodiment where the retention operation 380 may include at least one additional operation. Additional operations may include operations 393 through operation 398. At operation 393, the end user assistance is saved in response to the identifying an item. At operation 394, the saving the end user assistance corresponding to the item includes acquiring an end user assistance corresponding to the item. An alternative embodiment of the operation 394 may include at least one additional operation. Additional operations may include operations 395 and operation 396. At operation 395, an end user assistance corresponding to the item is received through a communication medium. For example, the communications medium may include a modulated data stream, which may be received over a wired and/or wired network connection. At operation 396, an end user assistance corresponding to the aspect of the item is received from a computer storage medium. The computer storage medium may include any medium suitable for conveyance of the end user assistance. For example, the computer storage medium may include a DVD, a CD, a diskette, an external hard drive, and a portable flash memory device. At operation 397, the acquiring an end user assistance corresponding to the item includes following a link to an end user assistance corresponding to the aspect of the item. The link may include a hyperlink. At operation 398, an end user assistance corresponding to the item maybe acquired from the item.

Figure 10:
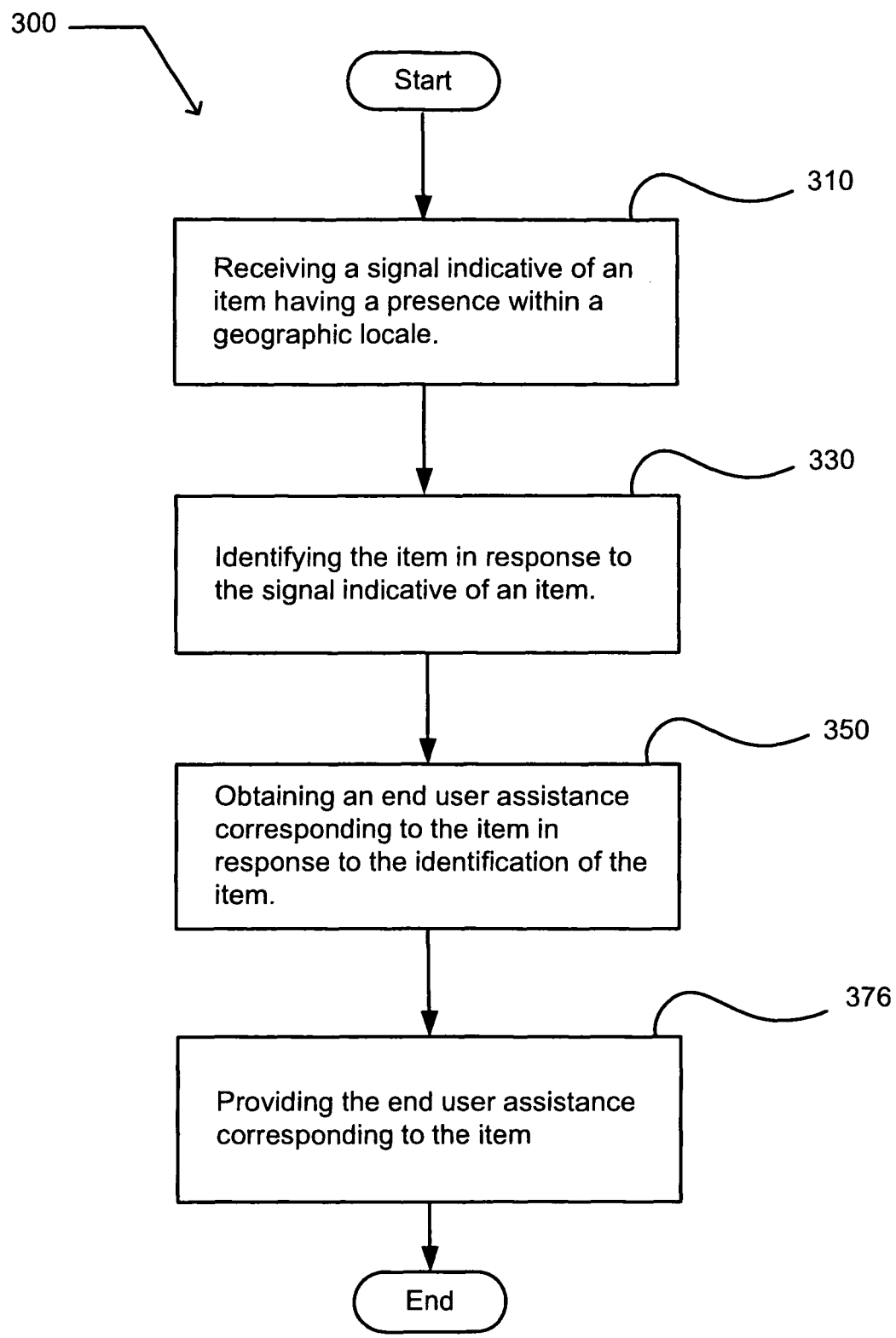
FIG. 10 illustrates an alternative embodiment of the exemplary operational flow of FIG. 3 that includes a broadcast operation.

FIG. 10 illustrates an alternative embodiment of the exemplary operational flow 300 of FIG. 3 that includes a broadcast operation 376. At the operation 376, the end user assistance corresponding to the item is provided.

FIG. 11 illustrates a partial view of an exemplary computer program product 400 that includes a computer program 404 for executing a computer process on a computing device. An embodiment of the exemplary computer program product 400 is provided using a computer-readable medium 402, and includes computer executable instructions. The computer executable instructions encode the computer program 404 for executing on a computing device a process that includes receiving a signal indicative of an item having a presence within a geographic locale, identifying the item in response to the signal indicative of an item, and obtaining an end user assistance corresponding to the item. The computer-readable medium 402 may be carried by a computer-readable carrier (not shown). The computer-readable medium 402 may include a computer storage medium, which may be carried by a computer-readable carrier (not shown). The computer-readable medium 402 may include a communications medium (not shown).

Figure 12:
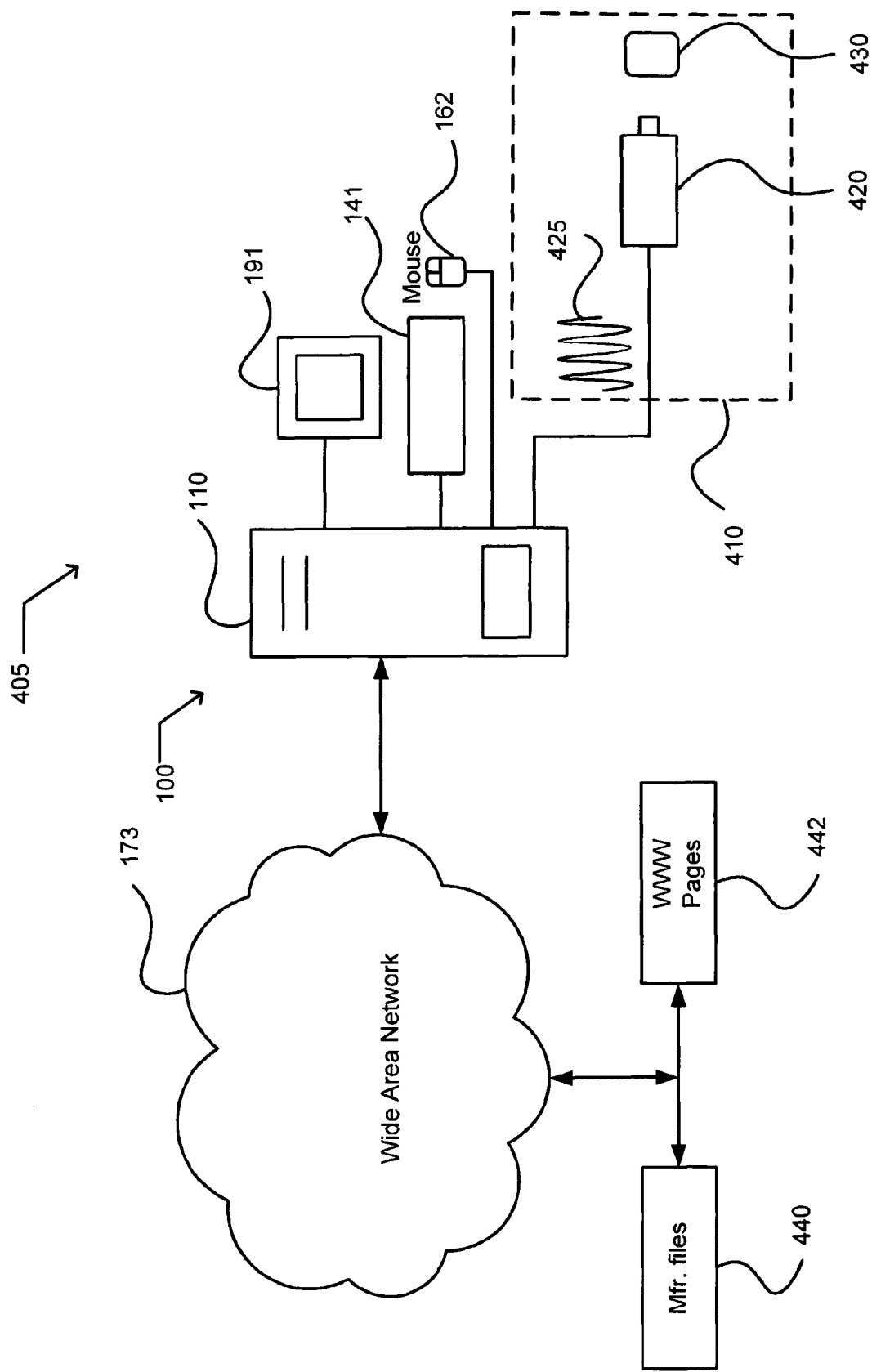
FIG. 12 illustrates an exemplary system in which embodiments may be implemented.
Figure 13:
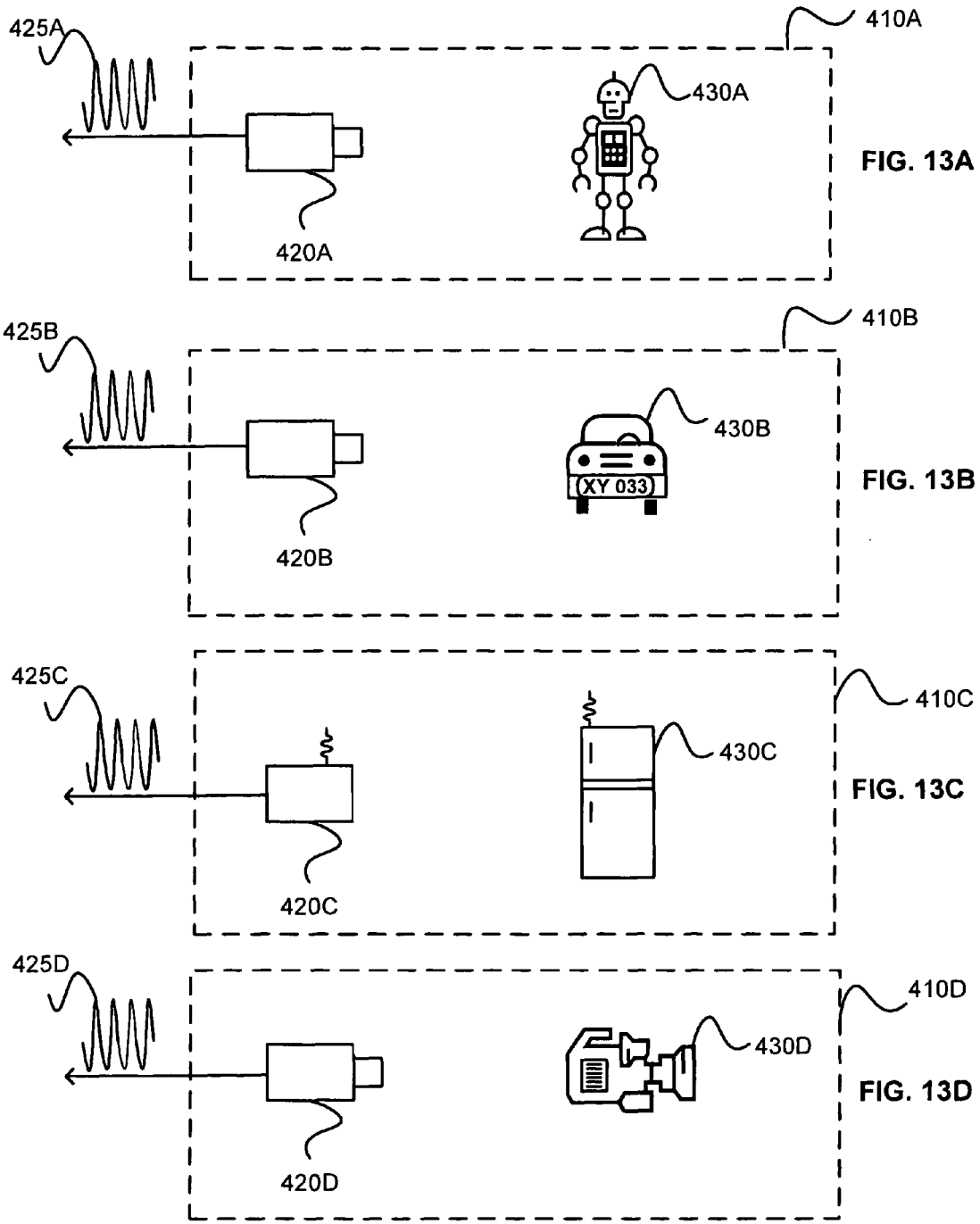
FIGS. 13A-13D illustrate certain alternative embodiments of the sensor and proximate environment of FIG. 12.

FIGS. 12 and 13 illustrate an exemplary system 405 in which embodiments may be implemented. The system 405 includes a computing system environment, illustrated as the computing system environment 100 of FIG. 1. The system 405 also includes a sensor 420 operable to provide a signal 425 indicative of an item 430 having a presence within a geographic locale 410. The computing device 110 includes an operability to receive the signal 425 indicative of an item 430. The system 405 further includes a computer program product encoding a computer program for executing on a computing device a computer process for obtaining an end user assistance, such as the computer program product 400 described in conjunction with FIG. 11. The computer process includes receiving the signal 425 indicative of an item having a presence within a geographic locale 410, and identifying the item in response to the signal indicative of an item. The computer process also includes obtaining an end user assistance corresponding to the item having a presence within a geographic locale.

In an embodiment, the geographic locale may include any environment in which one more items, such as the item 430, may have a presence. The geographic locale may include a bounded environment. For example and without limitation, in certain embodiments, the geographic locale may include a portion of a residential premises or the entire residential premises. The premises may be under control of one or more persons, such as an individual or a family. In other embodiments, the geographic locale may include a portion of a business premises or the entire business premises.

The sensor 420 may include any type of sensor suitable for generating a signal indicative of an item having a presence within its sensing and/or detection range, such as the signal 425 indicative of the item 430. By way of example and without limitation, in an embodiment, the sensor 420 may be positioned in a premises entrance such that items entering and leaving the premises have a presence at some time proximate to the sensor. In another embodiment, the sensor 420 may be physically located within the geographic locale 410. In a further embodiment, the sensor 420 may be proximate to the geographic locale 410 and operable to provide the signal 425 indicative of an item 430 having a presence within the geographic locale.

In an alternative embodiment, the system 405 may include a plurality (not shown) of the sensors 420. The plurality of sensors may include at least two sensors having different sensing parameters, each respectively operable to provide a different signal 425 indicative of the item 430. FIGS. 13A-13D illustrate certain alternative embodiments of the sensor 420 and a proximate environment, illustrated as embodiments 420A-420 D and geographic locales 410A-410D.

FIG. 13A illustrates an alternative embodiment that includes a sensor 420A located within a geographic locale 410A. The sensor 420A includes an optical sensor parameter operable to provide a signal 425A indicative of an optical aspect of an item 430A within the geographic locale, illustrated as a known shape of the robot 3CPO. An optical aspect may include any optical aspect or aspects useful in identifying the item.

FIG. 13B illustrates an alternative embodiment that includes a sensor 420B positioned with a geographic locale 410B. The sensor 420B includes an optical sensor parameter operable to provide a signal 425B indicative of an alpha/numeric aspect of the item 430B within the geographic locale, illustrated as a license plate number XY 033 of a car.

FIG. 13C illustrates an alternative embodiment that includes a sensor 420C located within a geographic locale 410C. The sensor 420C includes an identification signal sensor parameter operable to receive an electronically transmitted designator (not shown) associated with the item and provide a signal 425C indicative of item. The item is illustrated as a refrigerator 430C with an associated electronically transmitted designator. For example, the electronically transmitted designator may be transmitted by an RFID device. FIG. 13D illustrates an alternative embodiment that includes a sensor 420D positioned within a geographic locale 410D. The sensor 420D includes an optical code reader parameter operable to provide a signal 425D indicative of an optically readable aspect or aspects useful in identifying the item 430D. The item 430D is illustrated as video camera with an optically readable bar code. The signals 425A-425D are received by the computing device 110 of computing system environment 100 of FIG. 12.

Figure 14:
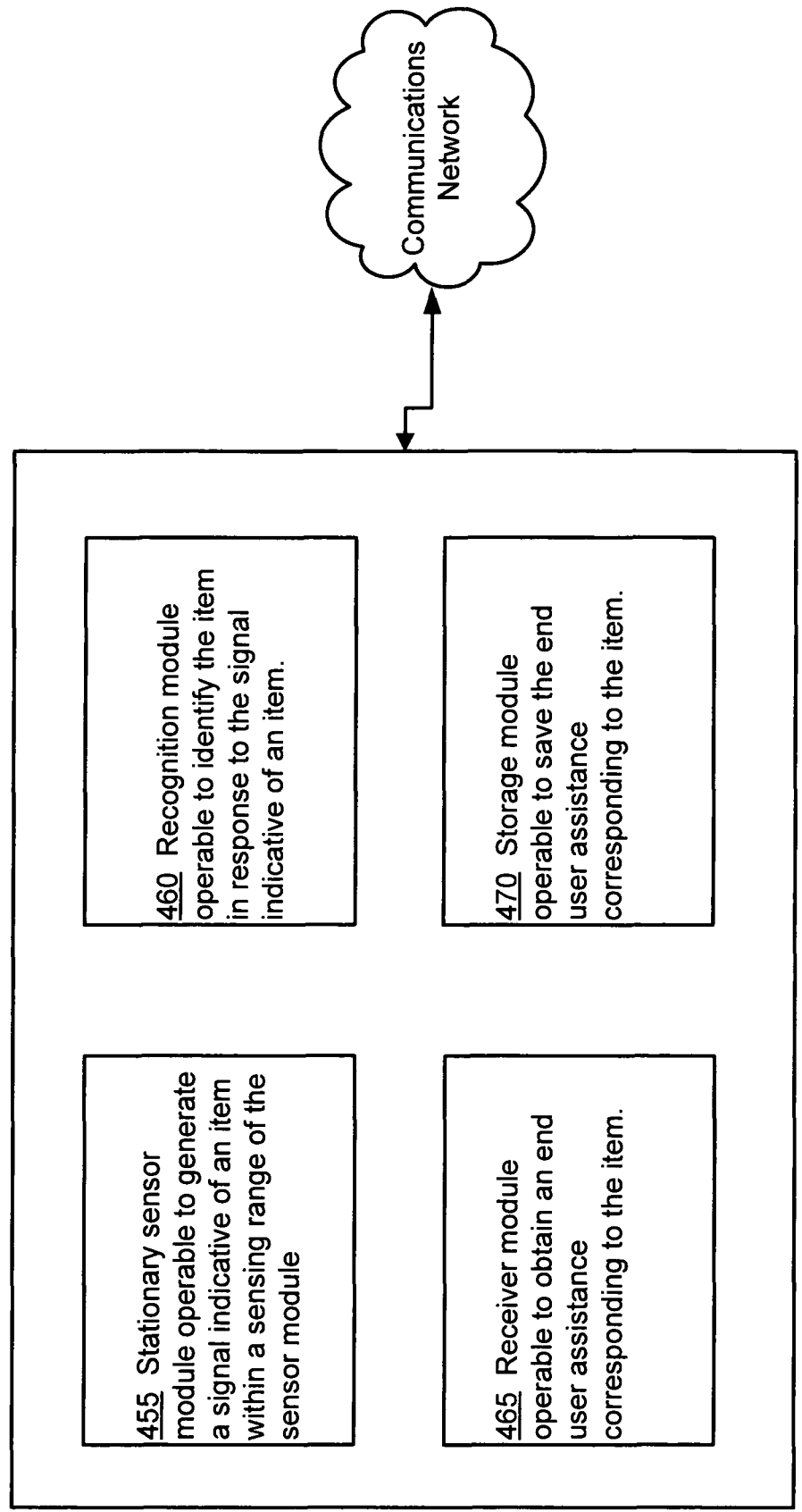
FIG. 14 illustrates an exemplary system in which embodiments may be implemented.

FIG. 14 illustrates an exemplary system 450 in which embodiments may be implemented. The system 450 includes a stationary sensor module 455 operable to generate a signal indicative of an item within a sensing range of the sensor module. In an embodiment, the stationary sensor module 455 is placed in a location selected to sense one or more items that may be under control of a user over time. While the stationary sensor module 455 may be relatively permanently located in an embodiment, another embodiment provides the stationary sensor module 455 being relatively moveable within a premises. The system 450 also includes a recognition module 460 operable to identify the item in response to the signal indicative of an item, and a receiver module 465 operable to obtain an end user assistance corresponding to the identified item. In an alternative embodiment, the system 450 may include a storage module 470 operable to save the end user assistance corresponding to the item.

Figure 15:
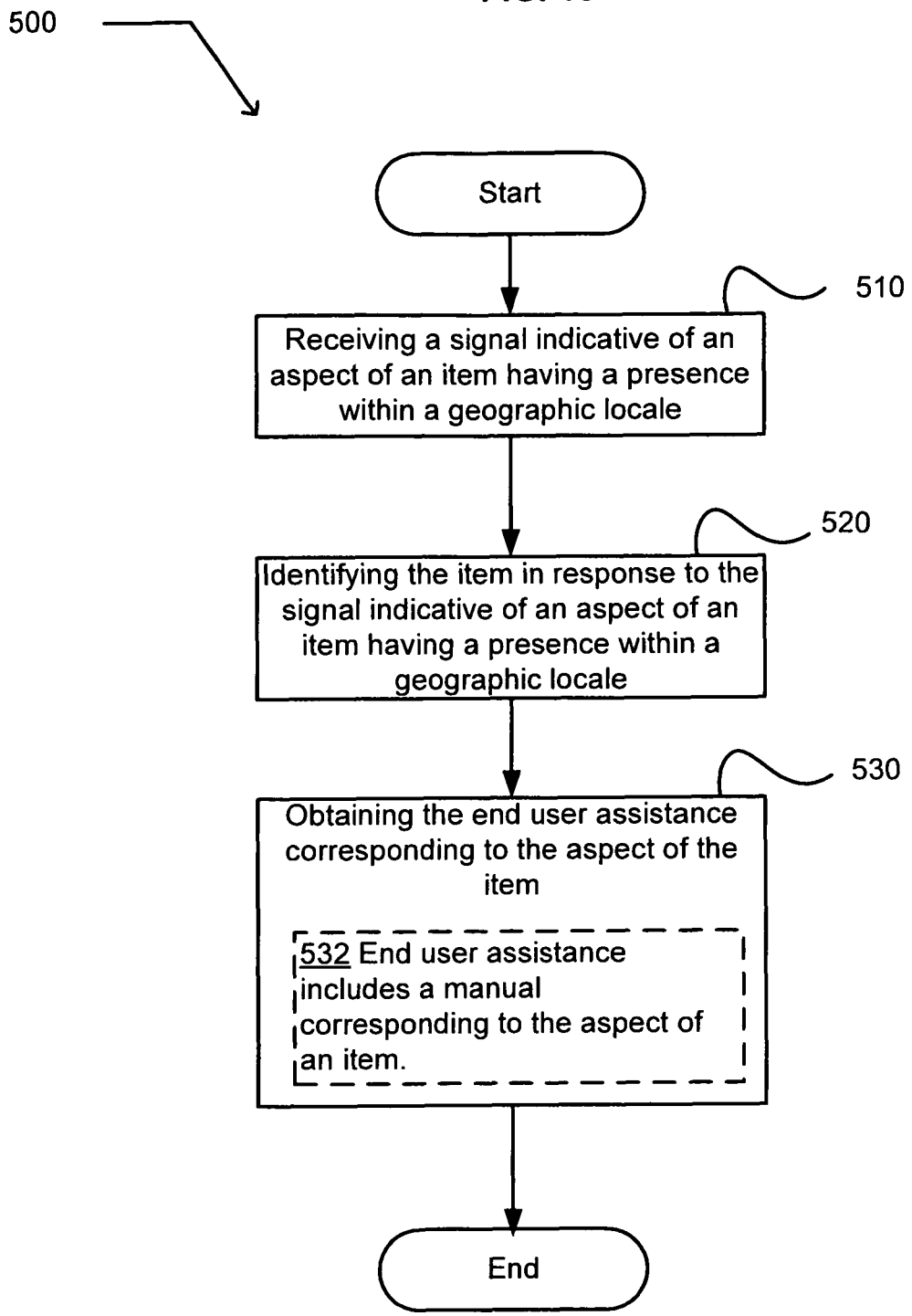
FIG. 15 illustrates an operational flow representing exemplary operations that obtain an assistance corresponding to an item having presence within a geographic locale.

FIG. 15 illustrates an operational flow 500 representing exemplary operations that obtain an assistance corresponding to an item having presence within a geographic locale. After a start operation, the operational flow 500 moves to an acquisition operation 510, wherein a signal indicative of an aspect of an item having a presence within a geographic locale is received, such as the signal 425 indicative of the item 420 with the geographic locale 410 of FIG. 12. At a recognition operation 520, the item is identified in response to the signal indicative of an aspect of an item having a presence within a geographic locale. Operational flow 500 moves to a reception operation 530, where the end user assistance corresponding to the aspect of the item is obtained. In an alternative embodiment, the operation 530 may include an operation 532, wherein the end user assistance corresponding to an aspect of an item includes a manual corresponding to the aspect of an item. In an alternative embodiment, the reception operation may include an operation (not shown) wherein a manual corresponding to the aspect of the item is obtained. The manual may include any content associated with the item, such as assistance information, instructions, and specifications. The operational flow 500 then moves to an end operation.

Figure 16:
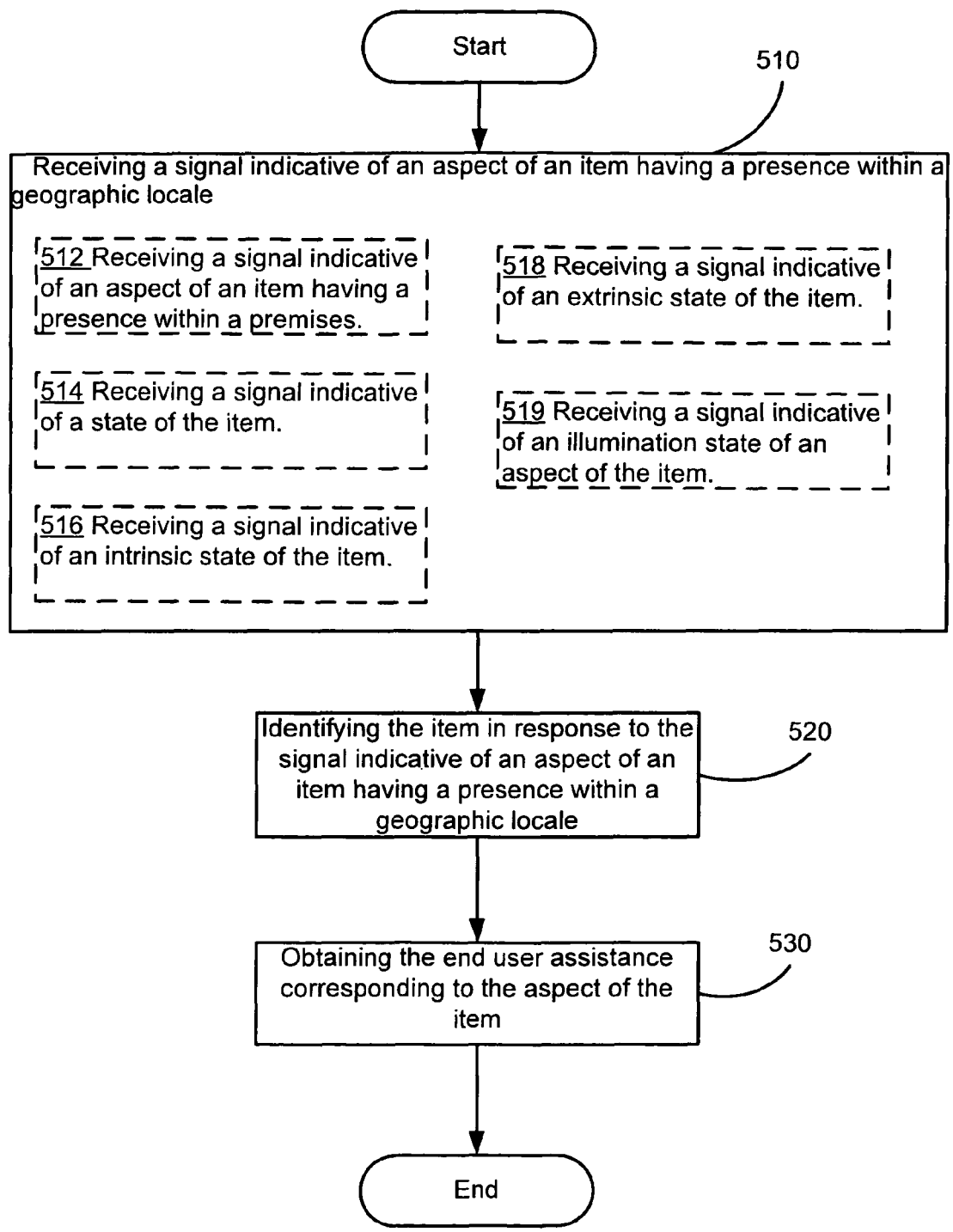
FIG. 16 illustrates an alternative embodiment of the exemplary operational flow of FIG. 15.

FIG. 16 illustrates an alternative embodiment of the exemplary operational flow 500 of FIG. 15. FIG. 16 illustrates an embodiment where the reception operation 510 may include at least one additional operation. The additional operations may include an operation 512, an operation 514, an operation 516, an operation 518, and an operation 519. At operation 512, a signal indicative of an aspect of an item having a presence within a premises is received. At operation 514, a signal indicative of a state of the item is received. At the operation 516, a signal indicative of an intrinsic state of the item is received. At the operation 518, a signal indicative of an extrinsic state of the item is received. At the operation 519, a signal indicative of an illumination state of an aspect of the item is received.

Figure 17:
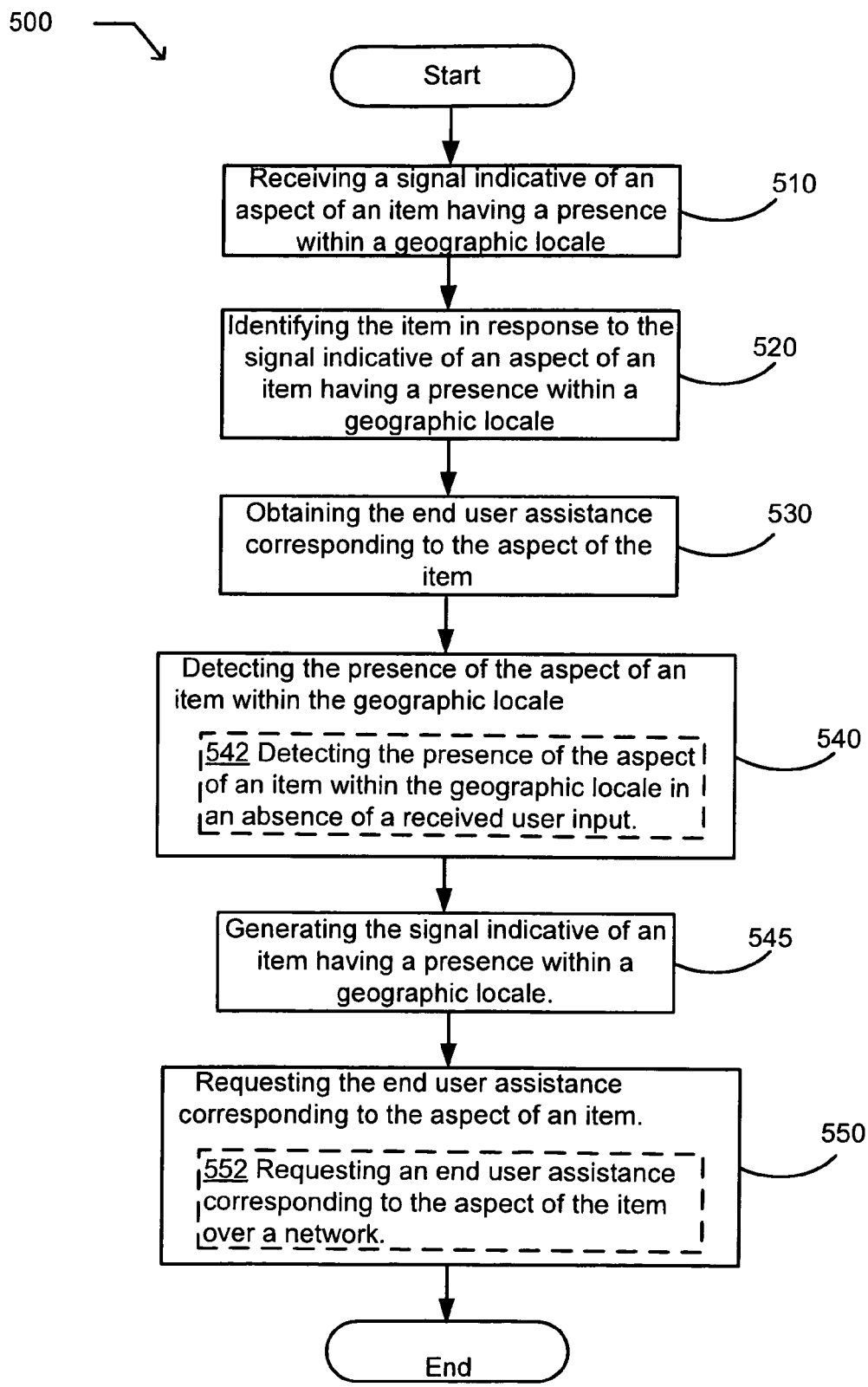
FIG. 17 illustrates another alternative embodiment of the exemplary operational flow of FIG. 15.

FIG. 17 illustrates an alternative embodiment of the exemplary operational flow 500 of FIG. 15. FIG. 17 illustrates an embodiment where the operational flow 500 may include a discovery operation 540, a generating operation 545, and a requesting operation 550. The discovery operation 540 includes detecting the presence of the aspect of an item within the geographic locale. In a further alternative embodiment, the discovery operation 540 may include an operation 542. At operation 542, the presence of the aspect of an item within the geographic locale is detected in an absence of a received user input. At the operation 545, the signal indicative of an item having a presence within a geographic locale is generated. At the request an operation 550, the end user assistance corresponding to the aspect of an item is requested. In a further alternative embodiment, the request operation 550 may include an operation 552. At operation 552, an end user assistance corresponding to the aspect of the item is requested over a network. The requesting end user assistance over a network may include requesting an end user assistance from a server. The operational flow 500 may in another embodiment include a providing operation (not shown). The providing operation includes providing the end user assistance corresponding to the aspect of the item.

FIG. 18 illustrates a partial view of an exemplary computer program product 560 that includes a computer program 564 for executing a computer process on a computing device. An embodiment of the exemplary computer program product 560 may be provided using a computer-readable medium 562, and includes computer executable instructions. The computer executable instructions encode the computer program 564 for executing on a computing device a process that includes receiving a signal indicative of an aspect of an item having a presence within a geographic locale, and identifying the item in response to the signal indicative of an aspect of an item having a presence within a geographic locale. The computer program 564 also includes obtaining an end user assistance corresponding to the aspect of the item, and saving the end user assistance corresponding to the aspect of the item. In certain embodiments, the computer program 564 may also include at least one additional process, such as a process 568, a process 570, a process 572, and a process 574. The process 568 includes detecting a presence of the item within a geographic locale. The process 570 includes generating a signal indicative of the aspect of an item. The process 572 includes requesting the end user assistance corresponding to aspect of the item. The process 574 includes providing the end user assistance corresponding to the aspect of the item. The computer-readable medium 562 may include a computer storage medium, which may be carried by a computer-readable carrier (not shown). The computer-readable medium 562 may include a communications medium (not shown).

Figure 19:
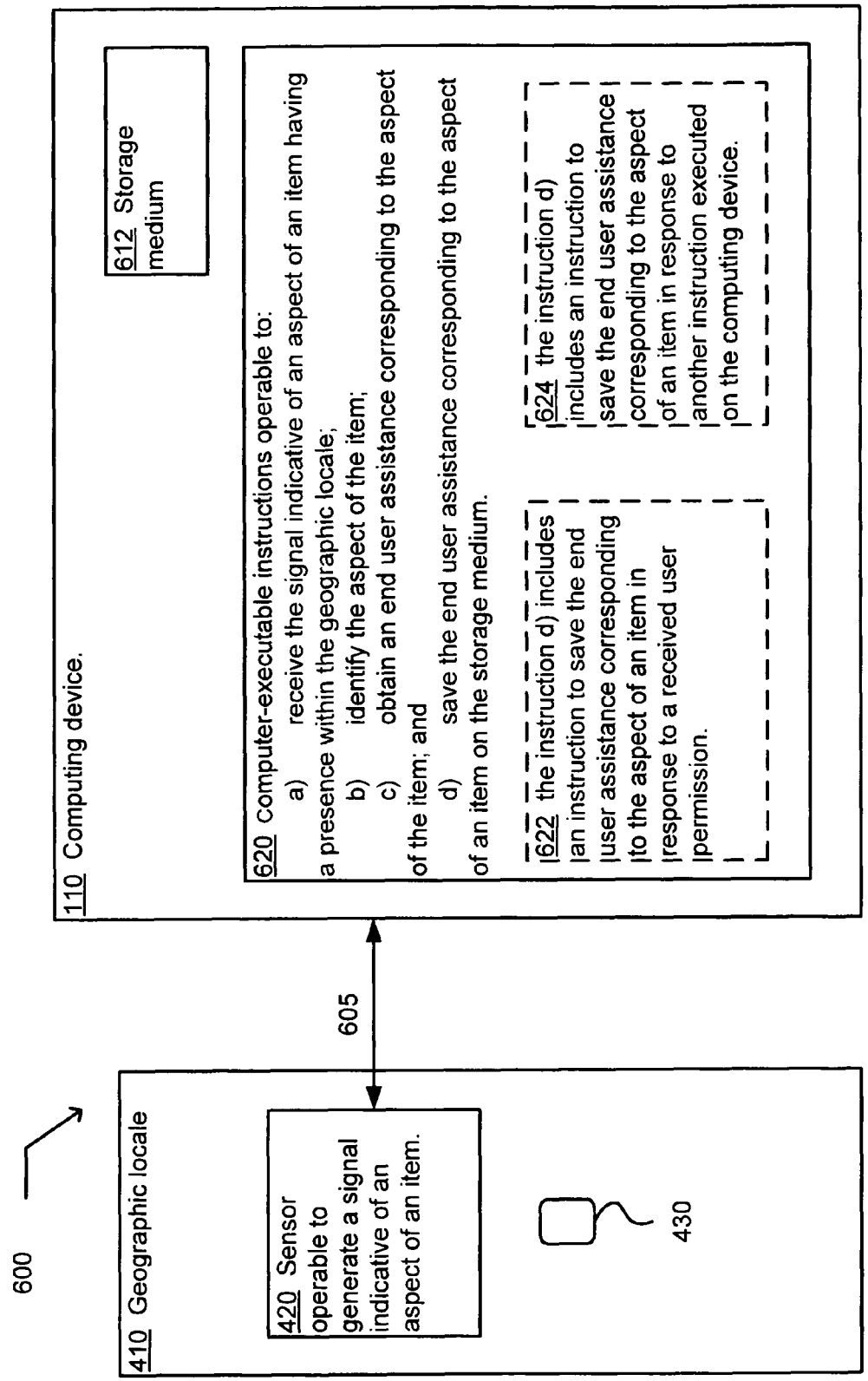
FIG. 19 illustrates an exemplary system in which embodiments may be implemented.

FIG. 19 illustrates an exemplary system 600 in which embodiments may be implemented. The system 600 includes a computing system environment that includes a computing device, illustrated as the computing device 110 of FIG. 1. The system 600 also includes the sensor 420 operable to generate a signal (not shown) indicative of an aspect of the item 430 having a presence within the geographic locale 410. The computing device 110 includes a storage medium 612, and is operable to receive the signal indicative of an aspect of an item through a coupling 605 between the sensor 420 and the computing device 110. The storage medium 612 may be any computer storage media. The system 600 further includes computer executable instructions 620 that when executed on the computing device causes the computing device to receive the signal indicative of an aspect of an item having a presence within the geographic locale, and identify the aspect of the item. The instructions further obtain an end user assistance corresponding to the aspect of the item, and save the end user assistance corresponding to the aspect of an item on the storage medium 612. The computer executable instructions 620 may include at least one additional operation. At operation 622, the instruction d) to save the end user assistance corresponding to the aspect of an item includes an instruction to save the end user assistance corresponding to the aspect of an item in response to a received user permission. At operation 624, the instruction d) to save the end user assistance corresponding to the aspect of an item includes an instruction to save the end user assistance corresponding to the aspect of an item in response to another instruction executed on the computing device 110.

Figure 20:
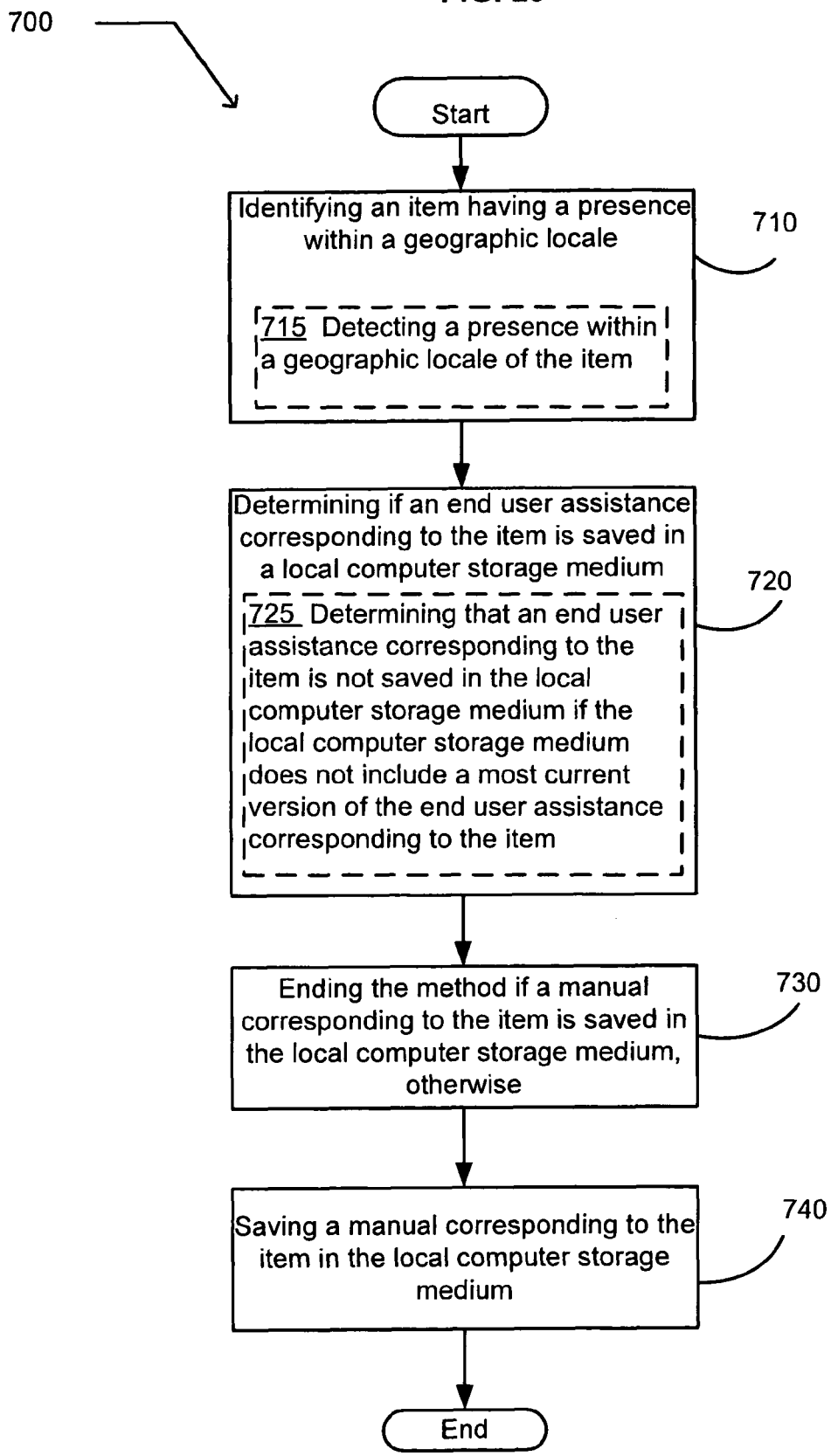
FIG. 20 illustrates an operational flow representing an exemplary operation that saves an end user assistance corresponding to an item having presence within a geographic locale.

FIG. 20 illustrates an operational flow 700 representing exemplary operations that save an end user assistance corresponding to an item having presence within a geographic locale. After a start operation, the operational flow 700 moves to a recognition operation 710 wherein an item having a presence within a geographic locale is identified. At discovery operation 720, a determination is made if an end user assistance corresponding to the item is saved in a computer storage medium local to the geographic locale. At termination operation 730, the operational flow 700 is ended if an end user assistance corresponding to the item is saved in the local computer storage medium. Otherwise, the operation flow 700 moves to retention operation 740, wherein an end user assistance corresponding to the item is saved in the local computer storage medium. The operational flow 700 then moves to an end operation.

In an alternative embodiment, the recognition operation 710 may include a sensing operation 715. At operation 715, a presence of the item within the geographic locale is detected. In another embodiment, the discovery operation 720 may include an operation 725. At the operation 725, a determination is made that an end user assistance corresponding to the item is not saved in the local computer storage medium if the local computer storage medium does not include a most current version of the end user assistance corresponding to the item.

Figure 21:
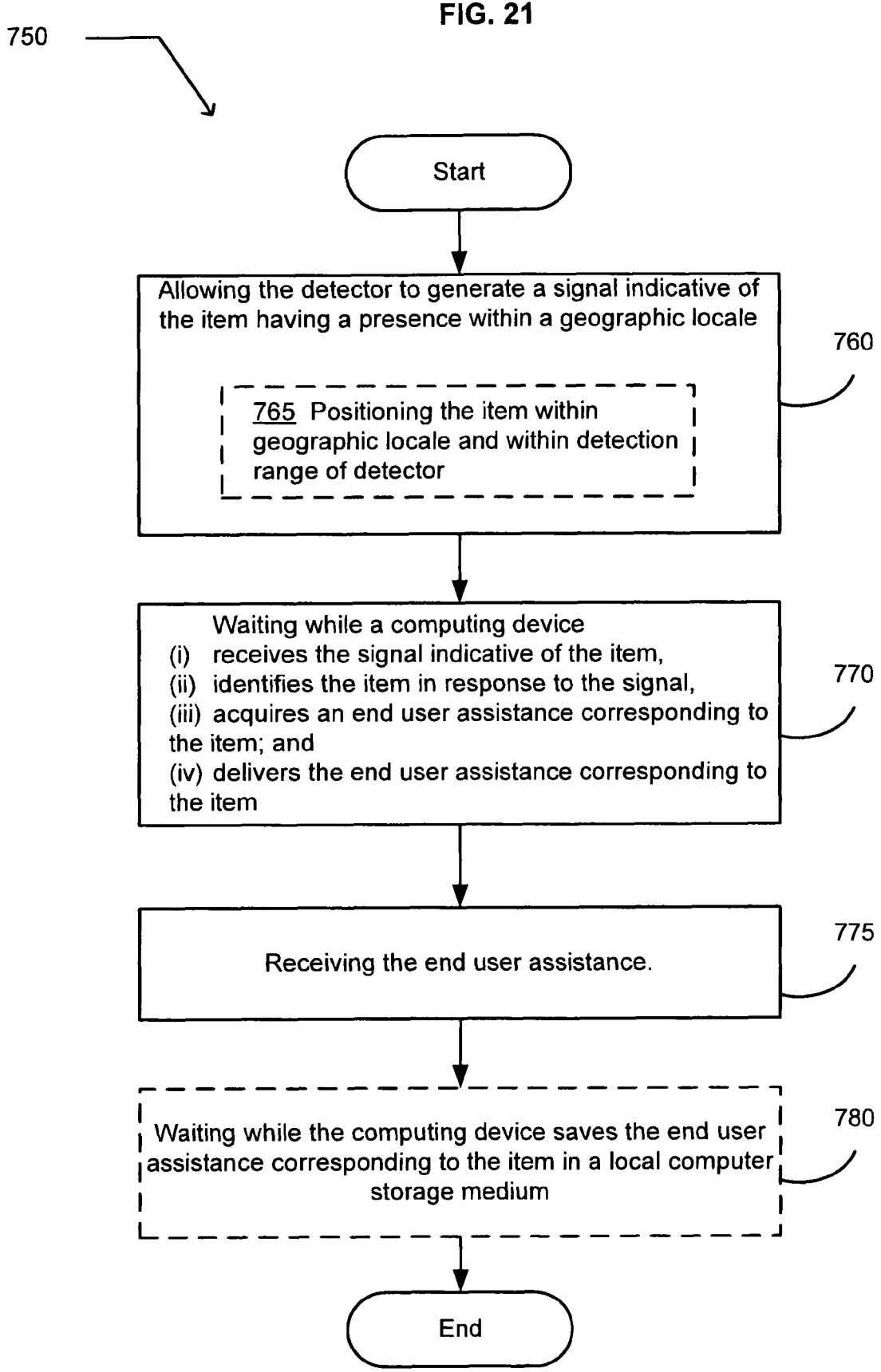
FIG. 21 illustrates an operational flow representing exemplary operations implemented in a computing device for receiving an end user assistance corresponding to an item having presence within a geographic locale.

FIG. 21 illustrates an operational flow 750 representing exemplary operations implemented in a computing device for receiving an end user assistance corresponding to an item having presence within a geographic locale. After a start operation, the operational flow 750 moves to a discovery operation 760 wherein a detector is allowed to generate a signal indicative of an item having a presence within a geographic locale. At operation 770, the operational flow 750 includes waiting while a computing system receives the signal indicative of the item, identifies the item in response to the signal, acquiring an end user assistance corresponding to the item, and delivers the end user assistance corresponding to the item. At operation 775, the end user assistance is received. The operational flow 750 then moves to an end operation. In an alternative embodiment, the discovery operation 760 may include an additional operation, such as an operation 765. At the operation 765, the item and the detector are positioned within a detection range that allows the detector to generate a signal indicative of the item. In a further alternative embodiment, the operational flow 750 may include an additional operation 780. The operation 780 includes a waiting while the computing device saves the end user assistance corresponding to the item in a local computer storage medium.

Figure 22:
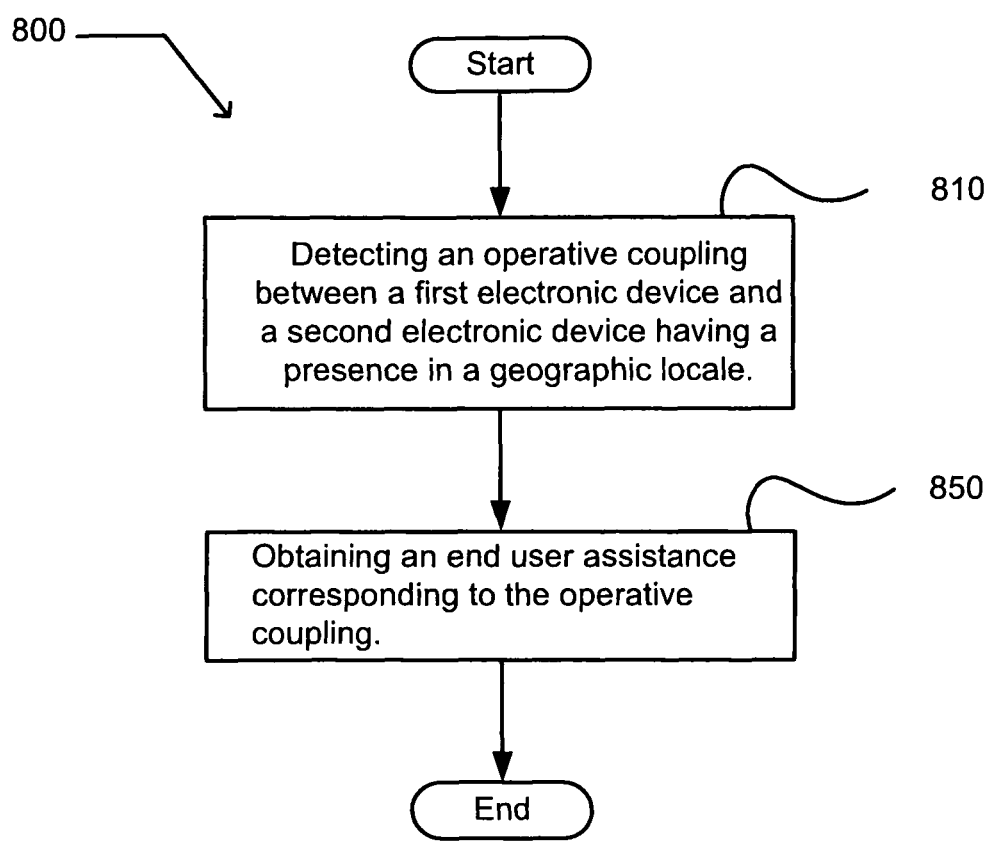
FIG. 22 illustrates an operational flow representing exemplary operations that obtain an end user assistance corresponding to an operative coupling between two electronic devices.

FIG. 22 illustrates an operational flow 800 representing exemplary operations that obtain an end user assistance corresponding to an operative coupling between a plurality of electronic devices. After a start operation, the operational flow 800 moves to a recognition operation 810 wherein an operative coupling is detected between a first electronic device and a second electronic device. The first and second electronic devices each having a presence in a geographic locale. In an embodiment, the first electronic device and the second electronic device both have a generally simultaneous presence within the geographic locale. At help operation 850, an end user assistance is obtained corresponding to the operative coupling. The operational flow 800 then moves to an end operation. In an embodiment, an operative coupling may include any communication of data and/or information between a sending electronic device and a receiving electronic device. In another embodiment, an operative coupling includes a two-way communication of data and/or information between electronic devices. In a further embodiment, an operative coupling between a first electronic device and second electronic device includes both devices having a functionality to mutually communicate without regard to whether a communication has ever occurred.

Figure 23:
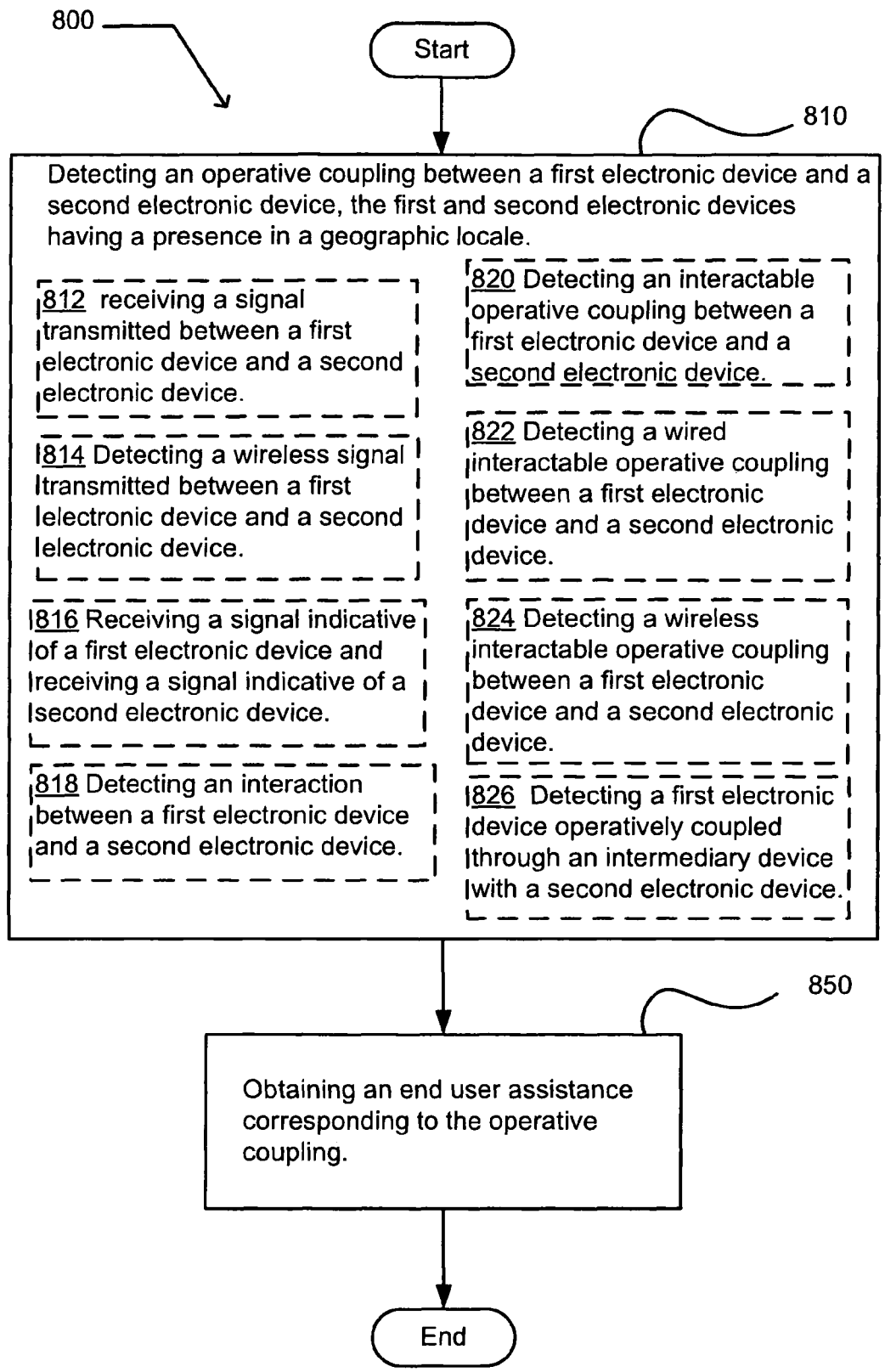
FIG. 23 illustrates an alternative embodiment of exemplary operational flow of FIG. 22.

FIG. 23 illustrates an alternative embodiment of the exemplary operational flow 800 of FIG. 22. FIG. 23 illustrates an embodiment where the recognition operation 810 may include at least one additional operation. Additional operations may include an operation 812, an operation 814, an operation 816, an operation 818, an operation 820, an operation 822, an operation 824, and an operation 826. At operation 812, a signal transmitted between the first electronic device and the second time device is received. At the operation 814, a wireless signal transmitted between a first electronic device and a second electronic device is detected. At the operation 816, a signal indicative of a first electronic device is received and a signal indicative of a second electronic device is received. At the operation 818, an interaction between a first electronic device and a second electronic device is detected. At the operation 820, an interactable coupling between a first electronic device and a second electronic device is detected. At the operation 822, a wired interactable coupling is detected between a first electronic device and a second electronic device. At the operation 824, a wireless interactable coupling is detected between a first electronic device and a second electronic device. At the operation 826, a first electronic device is detected operatively coupled through an intermediary device with a second electronic device.

Figure 24:
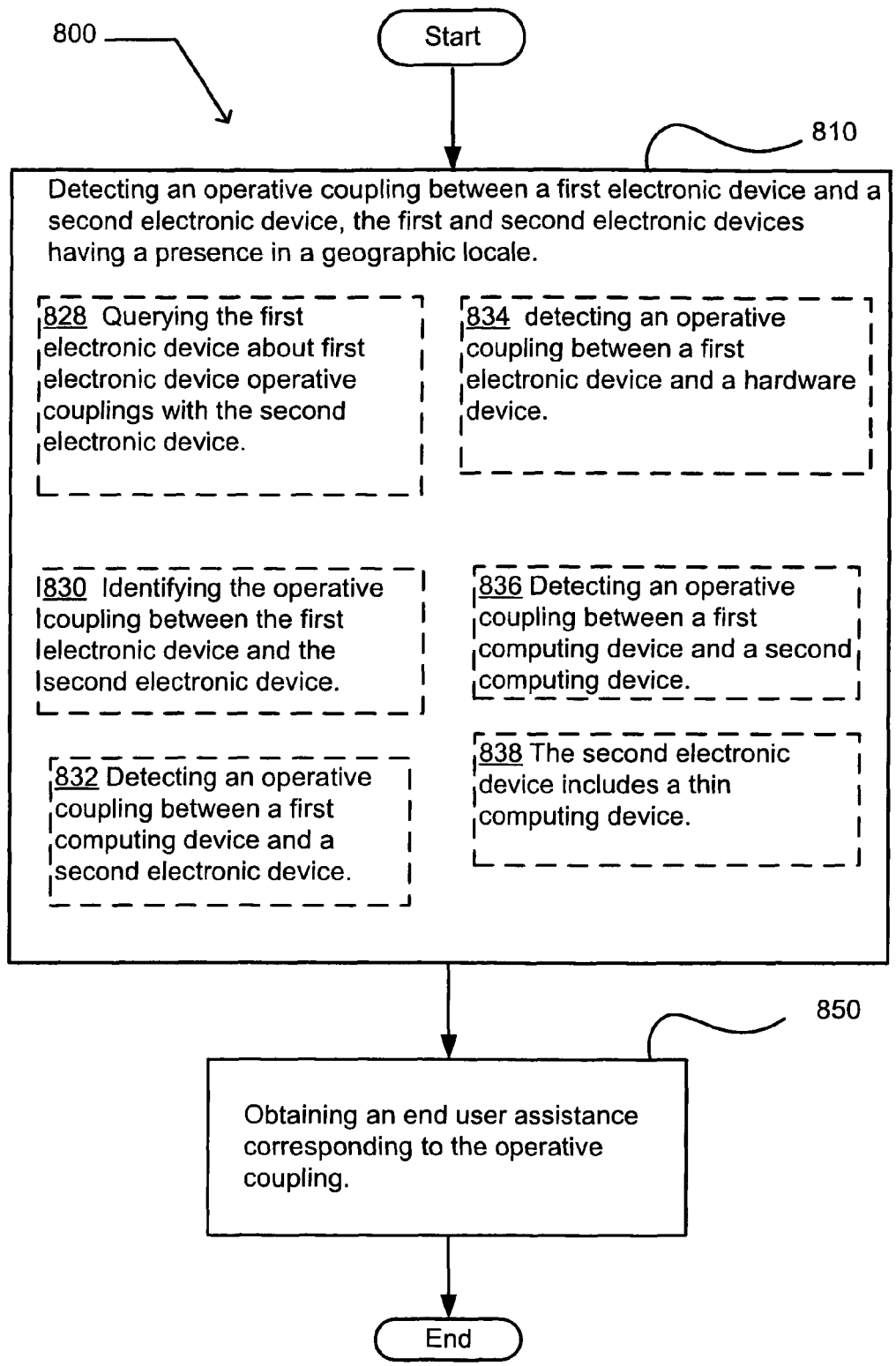
FIG. 24 illustrates a further alternative embodiment of the exemplary operational flow of FIG. 22.

FIG. 24 illustrates a further alternative embodiment of the exemplary operational flow 800 of FIG. 22. FIG. 24 illustrates an embodiment where the recognition operation 810 may include at least one additional operation. Additional operations may include an operation 828, an operation 830, and operation 832, an operation 834, an operation 836, and an operation 838. At the operation 828, the first electronic device is queried about first electronic device operative couplings with the second electronic device. At the operation 830, the operative coupling between the first electronic device and the second electronic device is identified. At the operation 832, an operative coupling is detected between a first computing device and a second electronic device. At the operation 834, an operative coupling is detected between a first electronic device and a hardware device. At the operation 836, an operative coupling is detected between a first computing device and a second computing device. At the operation 838, the second electronic device includes a thin computing device.

Figure 25:
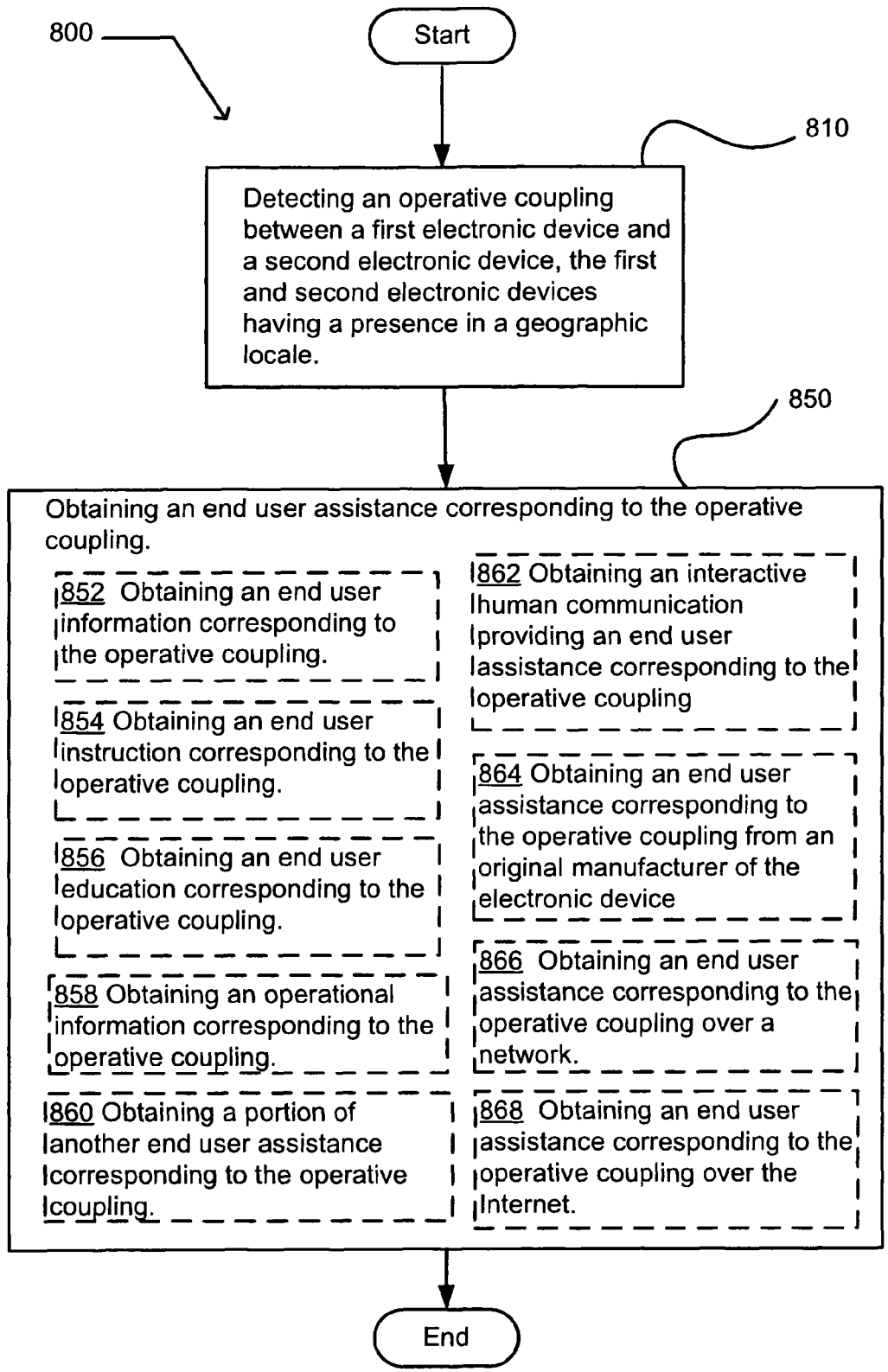
FIG. 25 illustrates another alternative embodiment of the exemplary operational flow of FIG. 22.

FIG. 25 illustrates another alternative embodiment of the exemplary operational flow 800 of FIG. 22. FIG. 25 illustrates an embodiment where the help operation 850 may include at least one additional operation. Additional operations may include an operation 852, an operation 854, an operation 856, an operation 858, an operation 860, an operation 862, an operation 864, an operation 866, and an operation 868. At the operation 852, a user information corresponding to the operative coupling is obtained. At the operation 854, a user instruction corresponding to the operative coupling is obtained. At the operation 856, a user education corresponding to the operative coupling is obtained. At the operation 858, an operational information corresponding to the operative coupling is obtained. At the operation 860, a portion of another user assistance corresponding to the operative coupling is obtained. At the operation 862, an interactive human communication providing an end user assistance corresponding to the operative coupling is obtained. At the operation 864, an end user assistance corresponding to the operative coupling is obtained from an original manufacturer of the electronic device. At the operation 866, an end user assistance corresponding to the operative coupling is obtained over a network. At the operation 868, an end user assistance corresponding to the operative coupling is obtained over the Internet.

Figure 26:
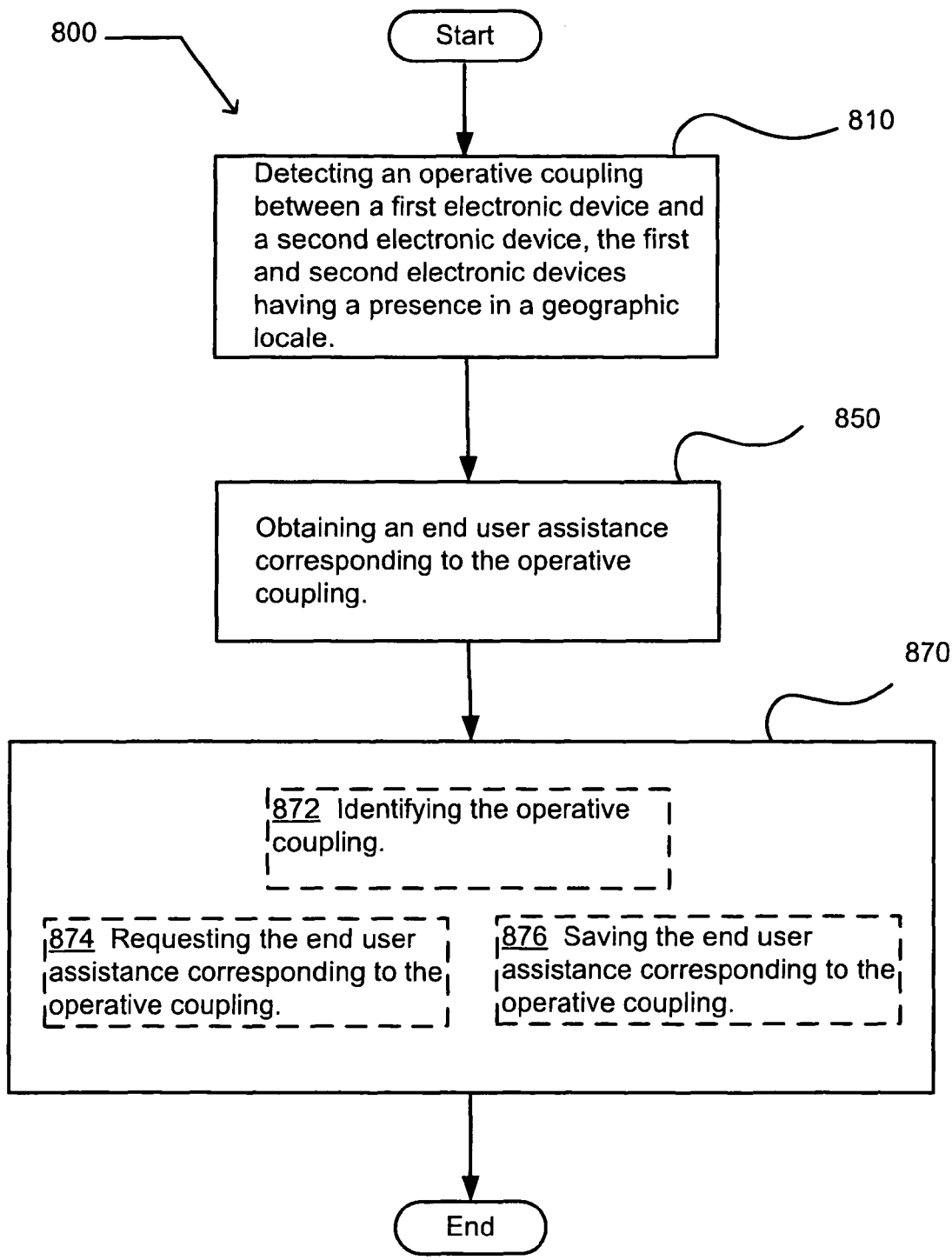
FIG. 26 illustrates an alternative embodiment of the exemplary operational flow of FIG. 22.

FIG. 26 illustrates an alternative embodiment of the exemplary operational flow 800 of FIG. 22. FIG. 26 illustrates an embodiment where the operational flow 870 may include at least one additional operation. Additional operations may include a recognition operation 872, a call operation 874, and a storage operation 876. At the recognition operation 872, the operative coupling is identified. At the call operation 874, the end user assistance corresponding to the operative coupling is requested. At the storage operation 876, the end user assistance corresponding to the operative coupling is saved.

FIG. 27 illustrates a partial view of an exemplary computer program product 900 that includes a computer program 904 for executing a computer process on a computing device. An embodiment of the exemplary computer program product 900 may be provided using a computer-readable medium 902, and includes computer executable instructions. The computer executable instructions encode the computer program 904 for executing on a computer system a process that includes identifying an operative coupling between a first electronic device and a second electronic device, the first and second electronic devices having a presence in a geographic locale. The process also includes obtaining an end user assistance corresponding to the operative coupling. In an alternative embodiment, the process may include at least one additional instruction. Additional instructions may include instruction 906, instruction 908, and instruction 910. At instruction 906, the process includes receiving a signal indicative of the operative coupling between a first electronic device and a second electronic device. At the instruction 908, the process includes saving the end user assistance corresponding to the operative coupling. At the instruction 910, the process includes providing the end user assistance corresponding to the operative coupling. The computer-readable medium 902 may include a computer storage medium, which may be carried by a computer-readable carrier (not shown). The computer-readable medium 902 may include a communications medium (not shown).

Figure 28:
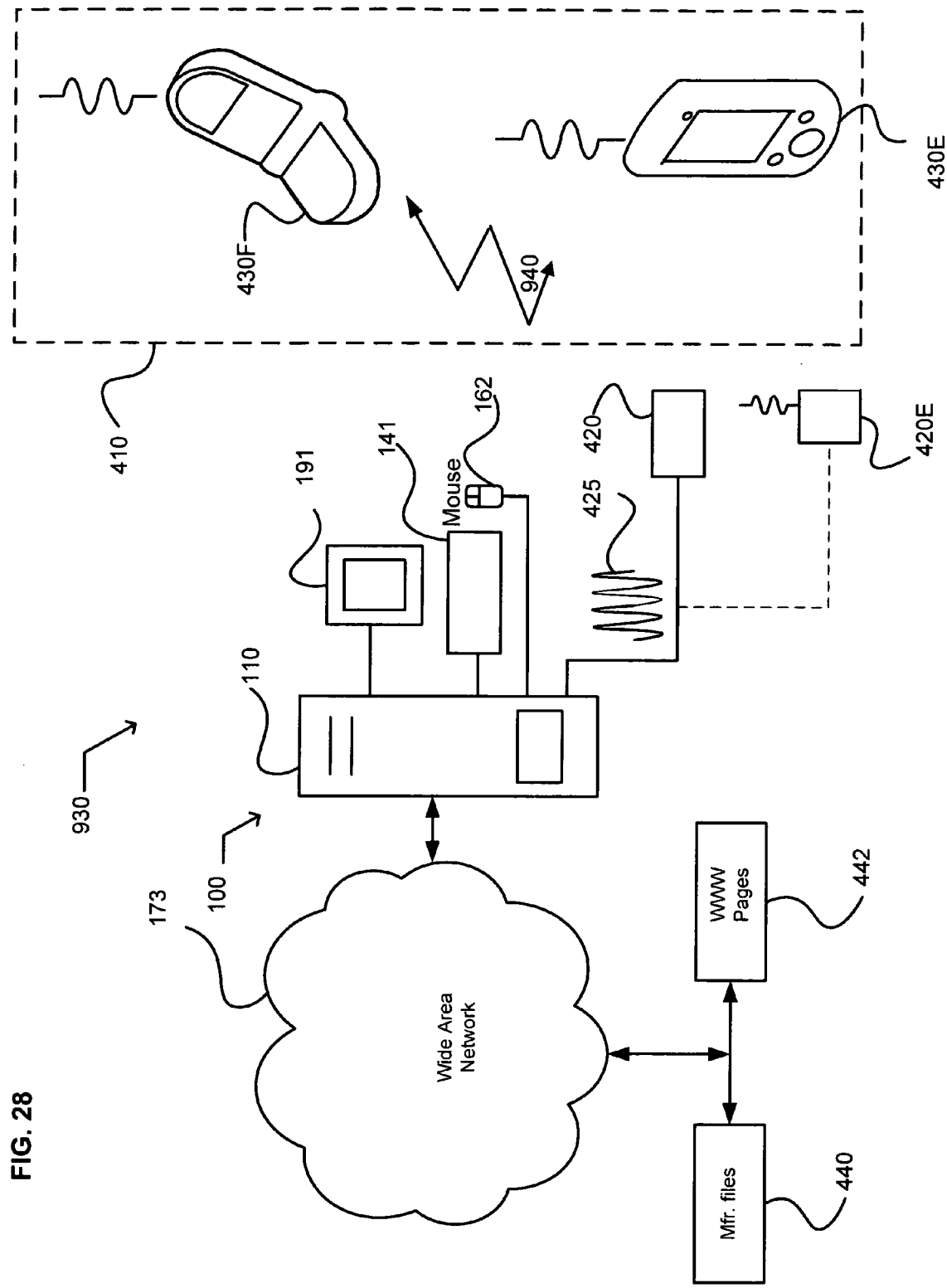
FIG. 28 illustrates an exemplary system in which embodiments may be implemented.

FIG. 28 illustrates an exemplary system 930 in which embodiments may be implemented. The system 930 includes a computing system environment, illustrated as the computing system environment 100 and the computing device 110 of FIG. 2. The system 930 may include a sensor, such as the sensor 420, operable to provide a signal, such as the signal 425 indicative of a plurality of items each having a presence within the geographic locale 410. The plurality of items is illustrated as an electronic device 430E and an electronic device 430F. FIG. 28 illustrates an operative coupling 940 between the electronic device 430E and electronic device 430 F. The operative coupling 940 may include any type of operative coupling. For example and without limitation, the operative coupling 940 may include a wired coupling, and/or a wireless coupling. The computing device 110 includes an operability to receive a signal indicative of the operative coupling 940 between the first electronic device 430E and the second electronic device 430F. The computing device 110 further includes a computer program product encoding a computer program for executing on the computing device a computer process for obtaining an end user assistance corresponding to the operative coupling 940. The computer process includes instructions that when executed on the computing device cause the computing device to identify the operative coupling between a first electronic device and a second electronic device in response to the signal indicative of an operative coupling, and obtain an end user assistance corresponding to the identified operative coupling. In an alternative embodiment, the first electronic device 430E may include the computing device 110. In further alternative embodiments, the instructions may include saving the end user assistance, and/or providing the end user assistance.

Figure 29:
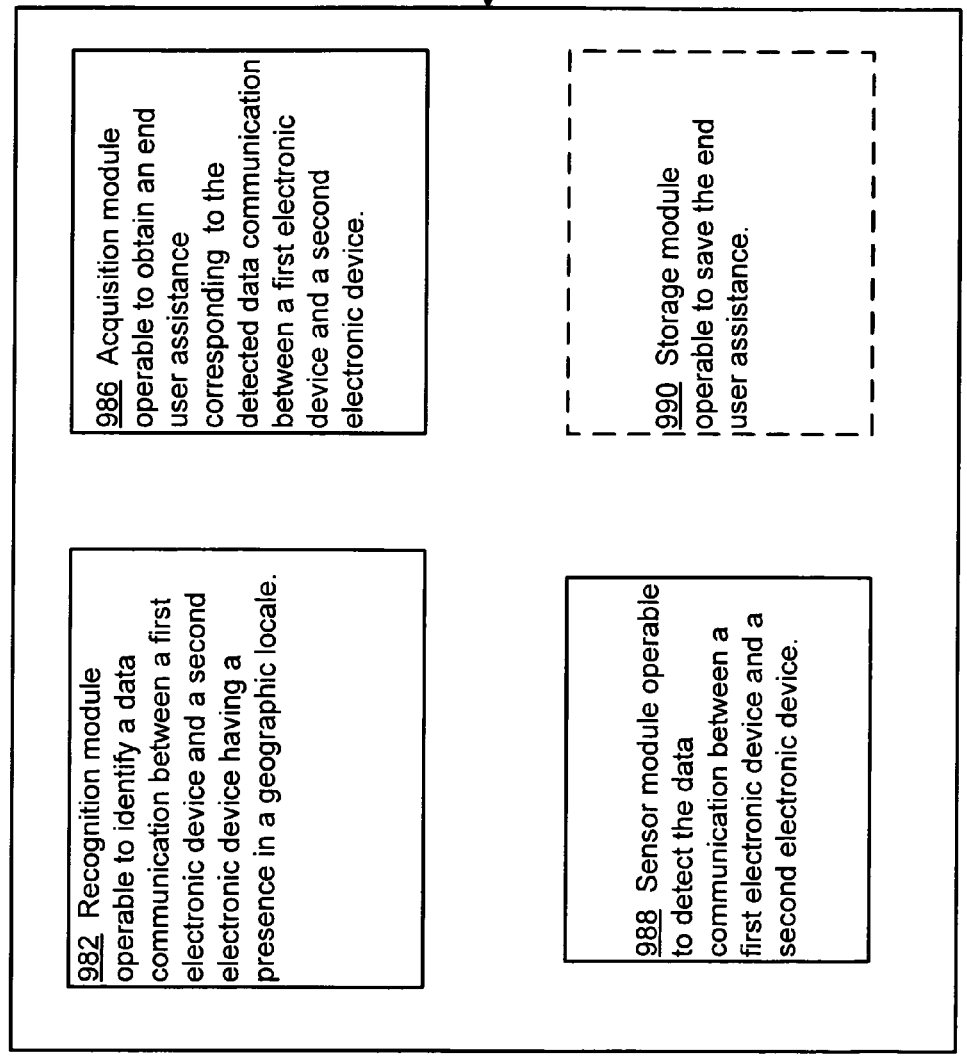
FIG. 29 includes an exemplary system in which embodiments may be implemented.

FIG. 29 includes an exemplary system 980 in which embodiments may be implemented. The system 980 includes a recognition module 982, an acquisition module 986, and a sensor module 988. The recognition module 982 includes operability to identify a data communication between a first electronic device and a second electronic device, the first and second electronic devices having a presence in a geographic locale. The acquisition module 986 includes operability to obtain an end user assistance corresponding to the detected data communication between a first electronic device and a second electronic device. The sensor module 988 includes operability to detect the data communication between a first electronic device and a second electronic device. In an alternative embodiment, the system 980 may include at least one additional module. An additional module may include a storage module 990 operable to save the end user assistance.

Figure 30:
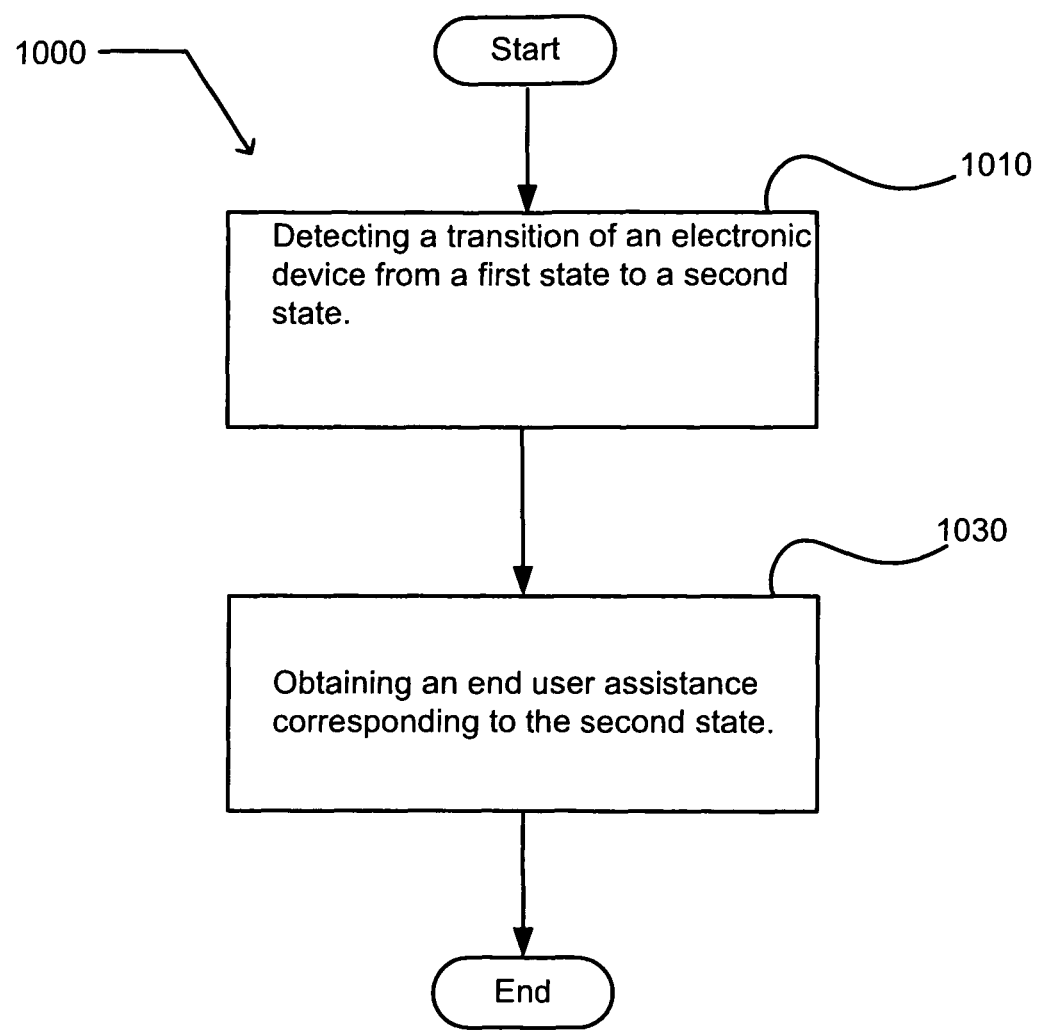
FIG. 30 illustrates an operational flow representing exemplary operations that obtain an end user assistance.

FIG. 30 illustrates an operational flow 1000 representing exemplary operations that obtain an end user assistance. After a start operation, the operation flow 1000 moves to a recognition operation 1010 wherein a transition of an electronic device from a first state to a second state is detected. At help operation 1030, an end user assistance corresponding to the second state is obtained. The operational flow 1000 then moves to an end operation.

Figure 31:
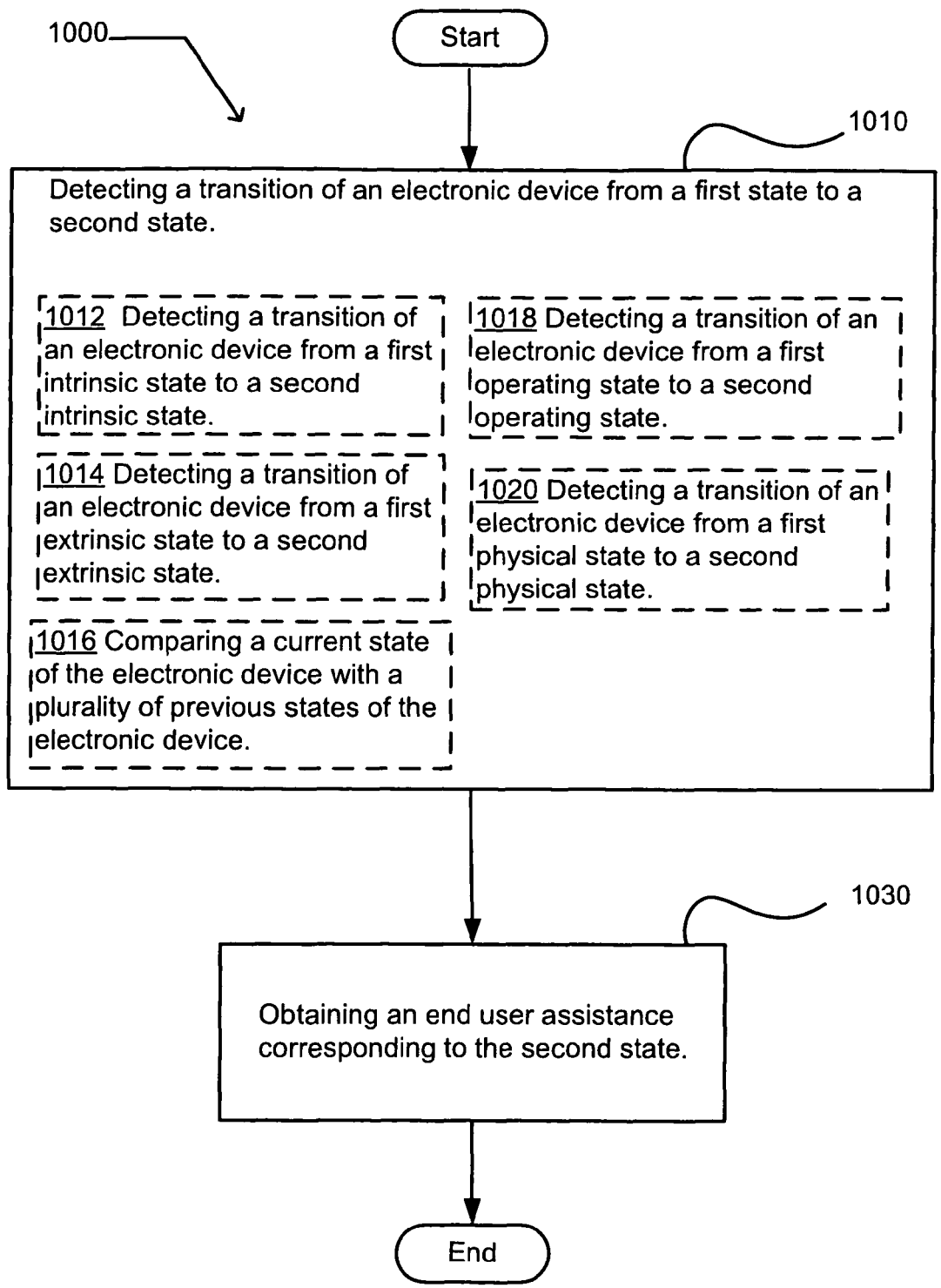
FIG. 31 illustrates an alternative embodiment of the exemplary operational flow of FIG. 30.

FIG. 31 illustrates an alternative embodiment of the exemplary operational flow 1000 of the FIG. 30. FIG. 31 illustrates an embodiment where the recognition operation 1010 may include at least one additional operation. Additional operations may include an operation 1012, an operation 1014, an operation 1016, at operation 1018, and an operation 1020. At the operation 1012, a transition of an electronic device is detected from a first intrinsic state to a second intrinsic state. At the operation 1014, a transition of an electronic device is detected from a first extrinsic state to a second extrinsic state. At the operation 1016, a current state of the electronic device is compared with a plurality of previous states of the electronic device. At the operation 1018, a transition of an electronic device from a first operating state to a second operating state is detected. At the operation 1020, a transition of an electronic device from a first physical state to a second physical state is detected.

Figure 32:
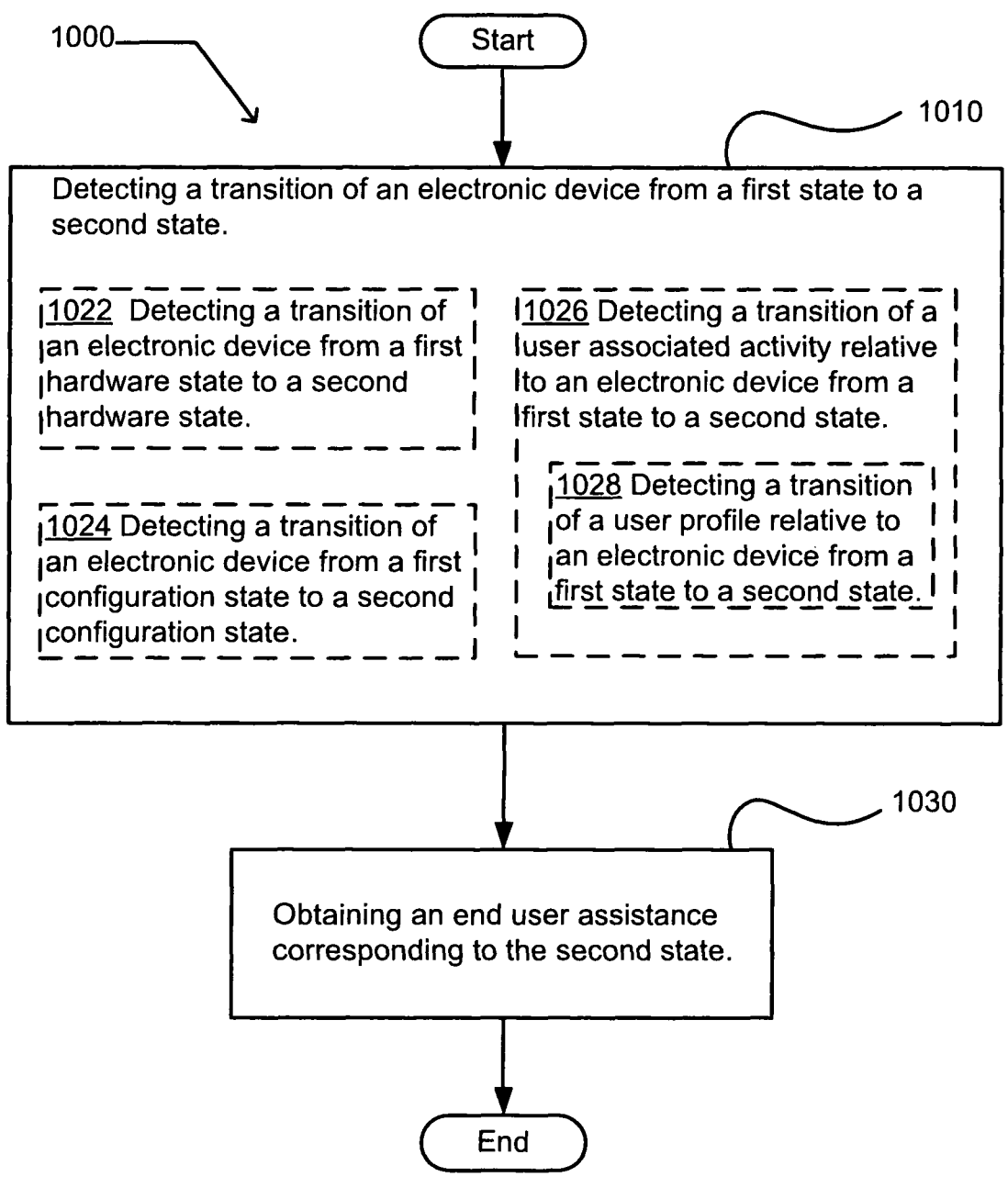
FIG. 32 illustrates another alternative embodiment of the exemplary operational flow of FIG. 30.

FIG. 32 illustrates an alternative embodiment of the exemplary operational flow 1000 of the FIG. 30. FIG. 32 illustrates an embodiment where the recognition operation 1010 may include at least one additional operation. Additional operations may include an operation 1022, an operation 1024, and an operation 1026. At the operation 1022, a transition is detected of an electronic device from a first hardware state to a second hardware state. At the operation 1024, a transition is detected of an electronic device from a first configuration state to a second configuration state. At the operation 1026, a transition is detected of a user associated activity relative to an electronic device from a first state to a second state. The operation 1026 may include at least one additional operation. An additional operation includes an operation 1028, wherein a transition is detected of a user profile relative to an electronic device from a first state to a second state.

Figure 33:
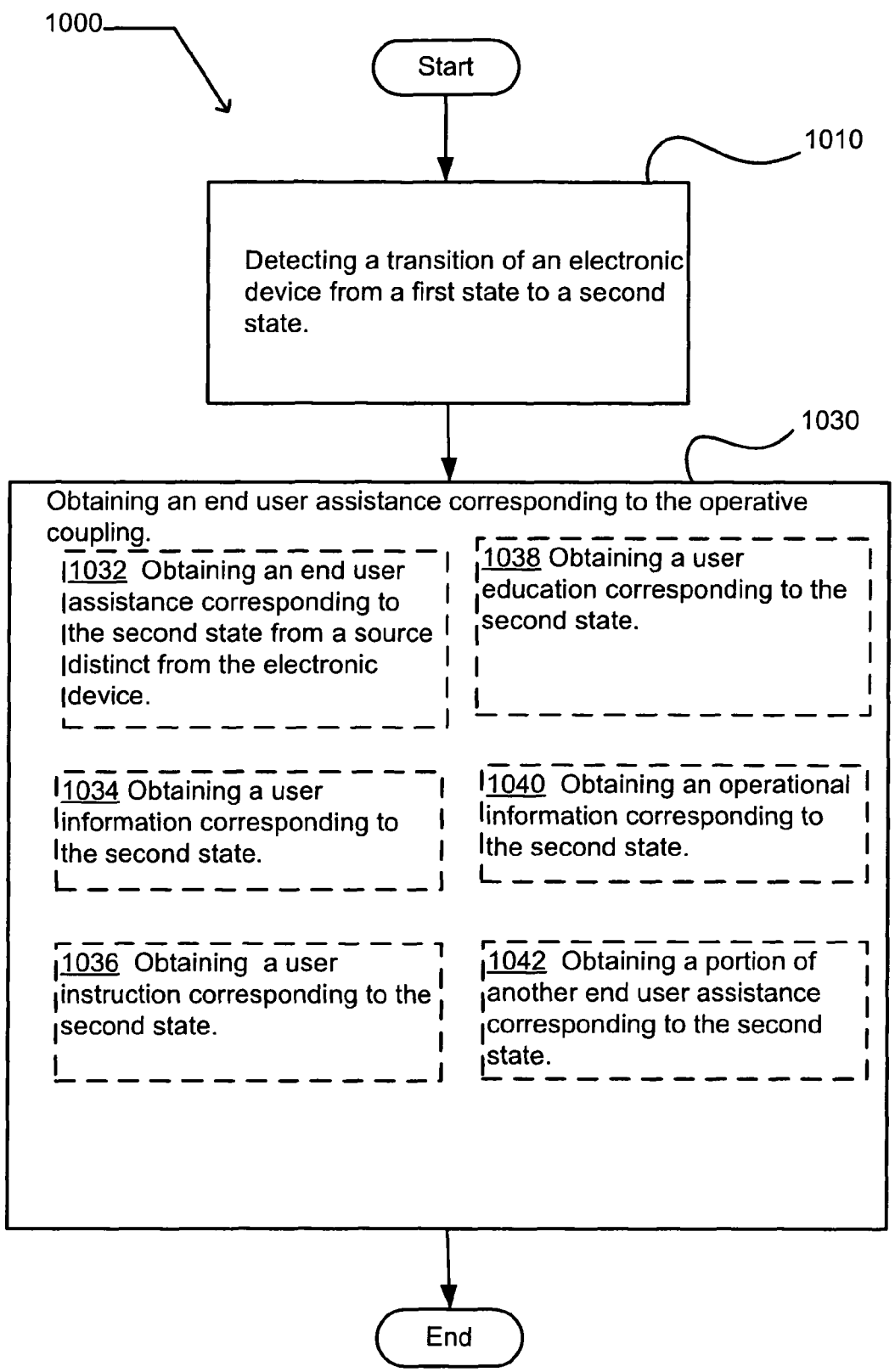
FIG. 33 illustrates a further alternative embodiment of the exemplary operational flow of FIG. 30.

FIG. 33 illustrates an alternative embodiment of the exemplary operational flow 1000 of the FIG. 30. FIG. 33 illustrates an embodiment where the help operation 1030 may include at least one additional operation. Additional operations may include an operation 1032, an operation 1034, an operation 1036, an operation 1038, an operation 1040, and an operation 1042. At the operation 1032, an end user assistance is obtained corresponding to the second state from a source distinct from the electronic device. At the operation 1034, a user information is obtained corresponding to the second state. At the operation 1036, a user instruction is obtained corresponding to the second state. At the operation 1038, a user education is obtained corresponding to the second state. At the operation 1040, an operational information is obtained corresponding to the second state. At the operation 1042, the obtained user assistance corresponding to the second state includes a portion obtained from another user assistance corresponding to the second state.

FIG. 34 illustrates a partial view of an exemplary computer program product 1050 that includes a computer program 1054 for executing a computer process on a computing device. An embodiment of the exemplary computer program product 1050 may be provided using a computer-readable medium 1052, and includes computer executable instructions. The computer product 1050 encodes the computer program 1054 for executing on a computing device a computer process that includes detecting a transition of an electronic device from a first state to a second state, and obtaining an end user assistance corresponding to the second state. In an alternative embodiment, the computer process may additionally include identifying the second state. The computer-readable medium 1052 may include a computer storage medium, which may be carried by a computer-readable carrier (not shown). The computer-readable medium 1052 may include a communications medium (not shown).

FIG. 35 illustrates an exemplary system 1080 in which embodiments may be implemented. The system 1080 includes a monitoring module 1082, and an acquisition module 1084. The monitoring module 1082 includes an operability to detect a transition of an electronic device from a first state to a second state. The acquisition module 1084 includes an operability to obtain an end user assistance corresponding to the second state. In an alternative embodiment, the monitoring module 1082 may include an at least one additional module, such as a module 1086 and a module 1088. Module 1086 includes operability to detect a transition of an electronic device from a first intrinsic state to a second intrinsic state. Module 1088 includes operability to detect a transition of an electronic device from a first extrinsic state to a second extrinsic state. In a further alternative embodiment, the acquisition module 1084 may include at least one additional module, such as a module 1090. Module 1090 includes operability to obtain user information corresponding to the second state.

FIG. 36 illustrates an exemplary system 1100 in which embodiments may be implemented. The system 1100 includes a computing system environment, illustrated as the computing system environment 100 and the computing device 110 of FIG. 2. The system 1100 may include a detector 1105 operable to generate a signal indicative of a transition of an electronic device from a first state to a second state, such as the electronic device 1102. The detector 1105 and the computing device 110 are coupled by a coupler 605. The computing device 110 further includes a computer program product encoding a computer program for executing on the computing device a computer process for obtaining an end user assistance. The computer process includes instructions 1110 that when executed on the computing device cause the computing device to detect a transition of an electronic device from a first state to a second state, and obtain an end user assistance corresponding to the second state. In an alternative embodiment, the process may include additional instructions. The process may include an instruction 1112, an instruction 1114, and an instruction 1116. At the instruction 1112, the process detects a transition of an electronic device from a first intrinsic state to a second intrinsic state. At the instruction 1114, the process detects a transition of an electronic device from a first extrinsic state to a second extrinsic state. At the instruction 1116, the process obtains operational information corresponding to the second state. In an alternative embodiment, the electronic device 1102 includes the computing device 110.

Figure 37:
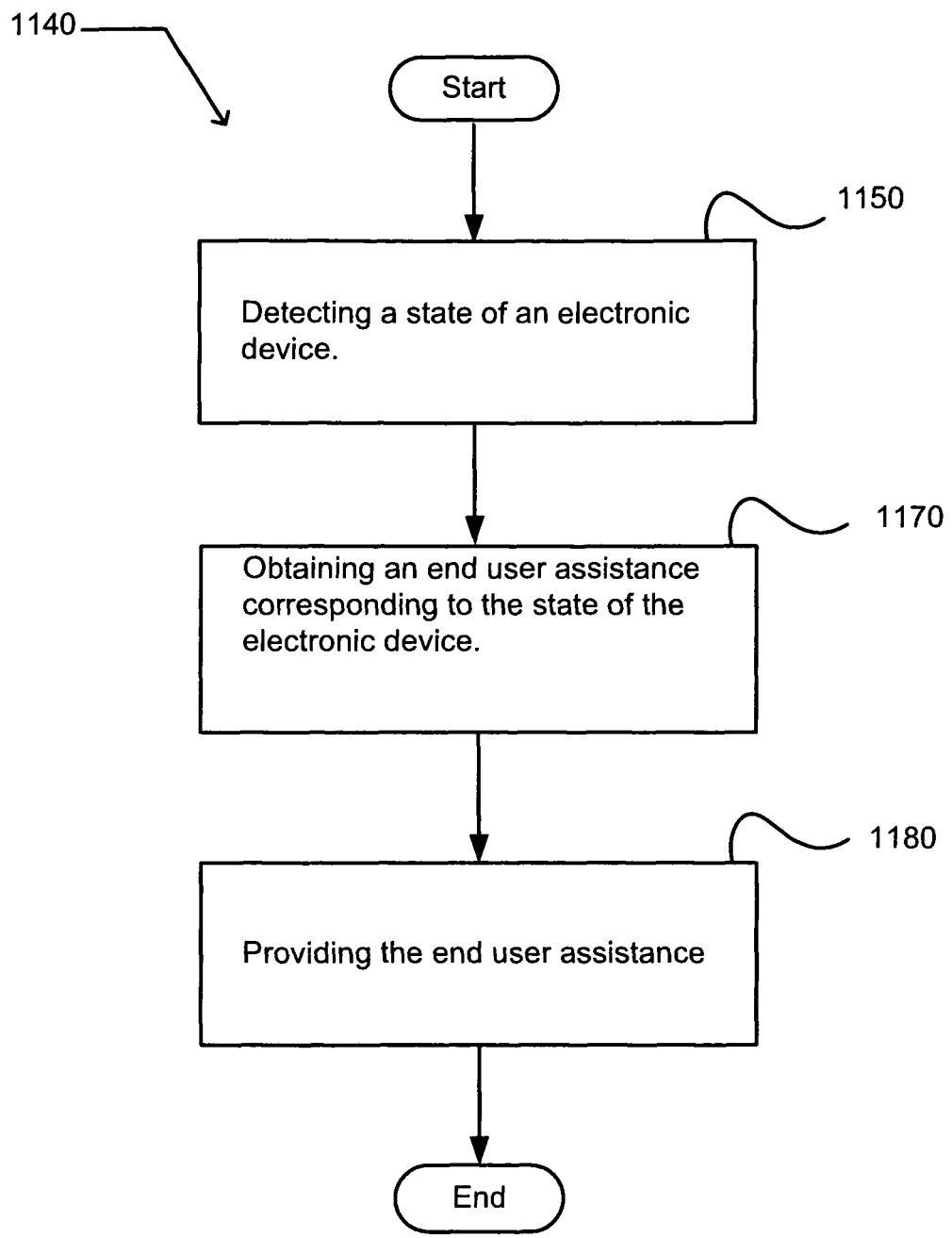
FIG. 37 illustrates an operational flow representing exemplary operations that provide an end user assistance corresponding to a state of an electronic device.

FIG. 37 illustrates an operational flow 1140 representing exemplary operations that provide an end user assistance corresponding to a state of an electronic device. After a start operation, the operation flow 1140 moves to a sensing operation 1150. At the sensing operation 1150, a state of an electronic device is detected. At an acquisition operation 1170, an end user assistance is obtained corresponding to the state of the electronic device. At a help operation 1180, the end user assistance corresponding to the state of the electronic device is provided. The operational flow 1140 then moves to an end operation.

Figure 38:
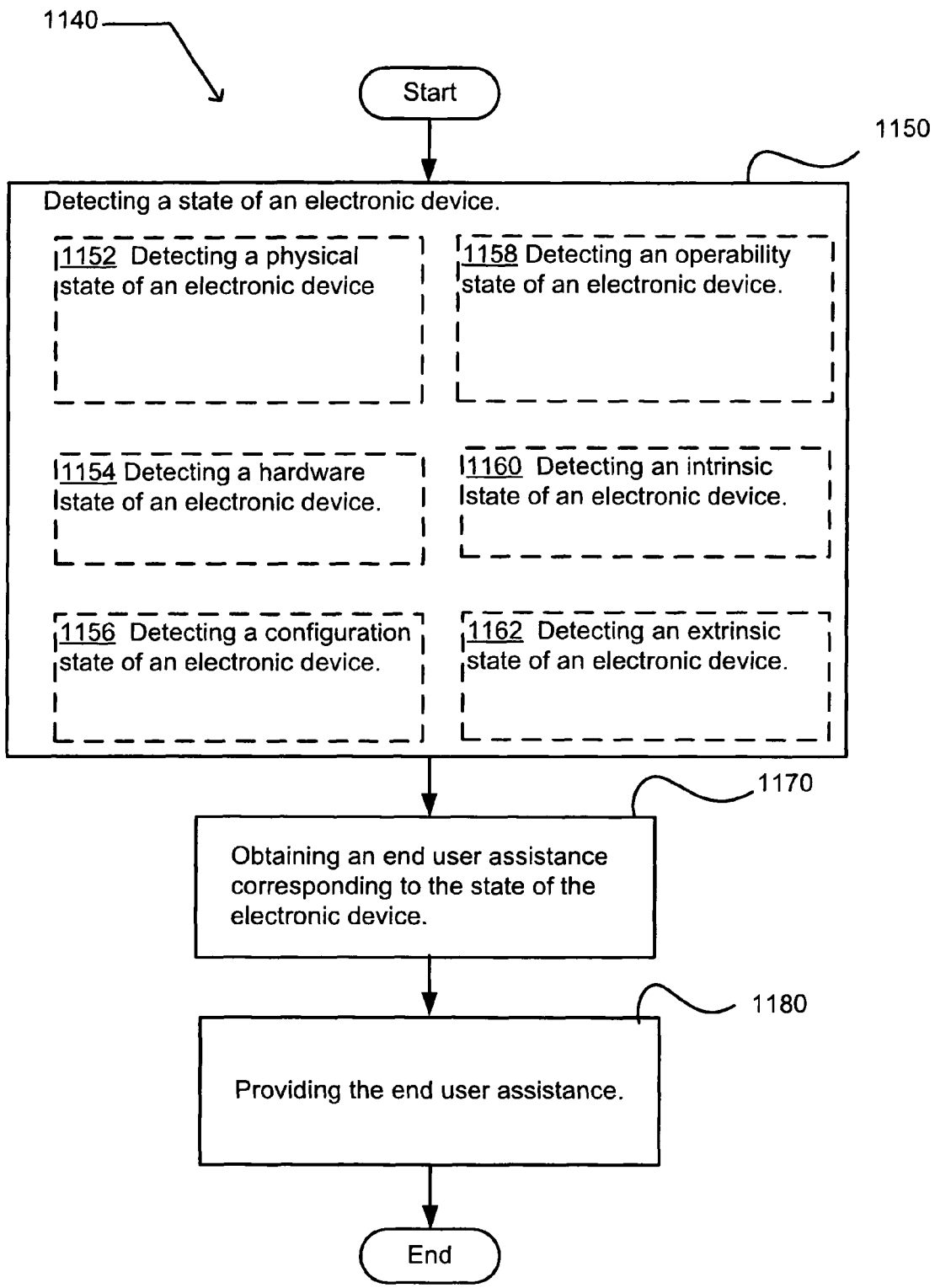
FIG. 38 illustrates an alternative embodiment of the exemplary operational flow of FIG. 37.

FIG. 38 illustrates an alternative embodiment of the exemplary operational flow 1140 of FIG. 37. The sensing operation 1150 may include one or more additional operations. The additional operations may include an operation 1152, an operation 1154, an operation 1156, an operation 1158, an operation 1160, and an operation 1162. At the operation 1152, a physical state of an electronic device is detected. At the operation 1154, a hardware state of an electronic device is detected. At the operation 1156, a configuration state of an electronic device is detected. At the operation 1158, an operability state of an electronic device is detected. The operation 1160, an intrinsic state of an electronic device is detected. At the operation 1162, an extrinsic state of an electronic device is detected.

Figure 39:
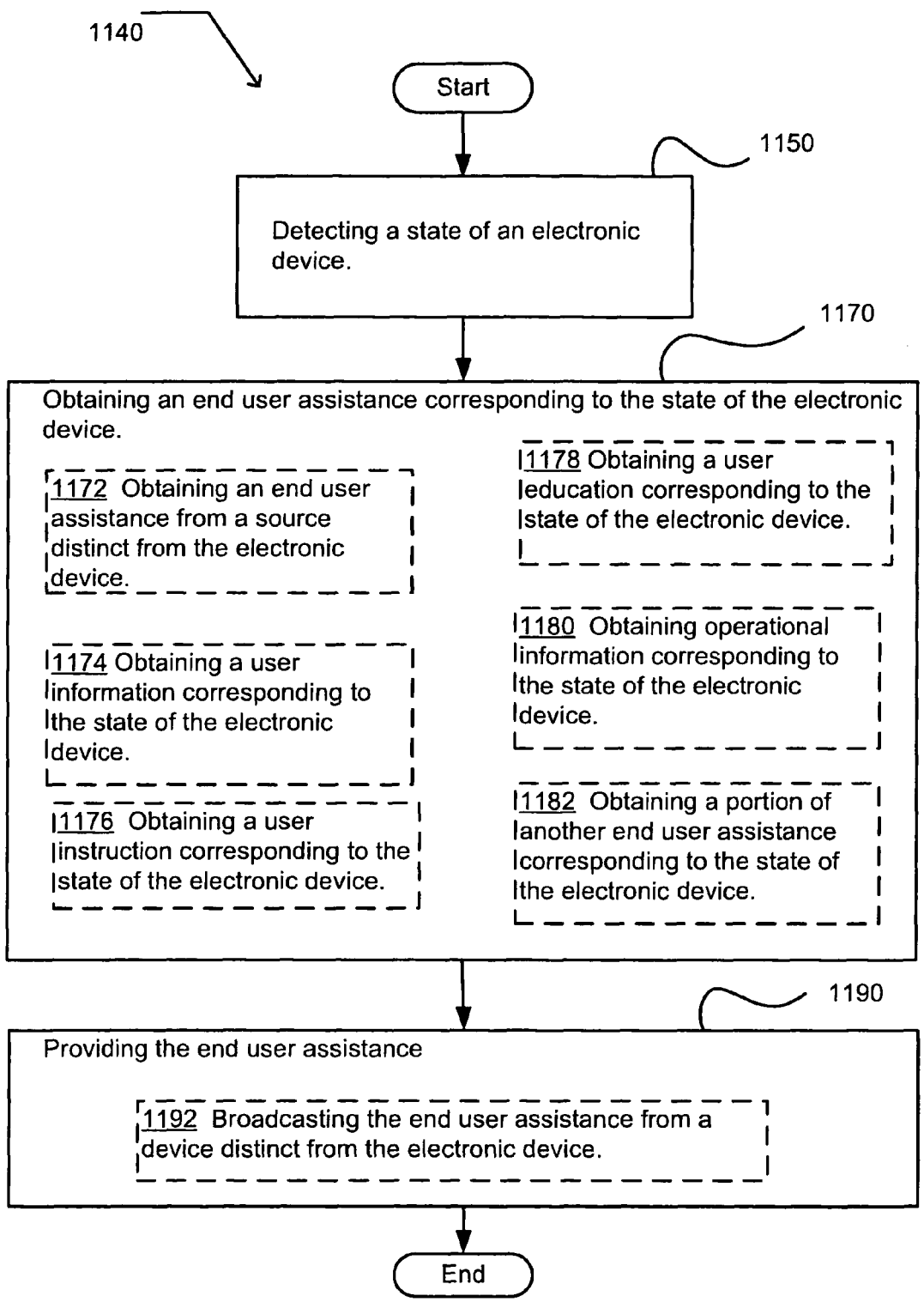
FIG. 39 illustrates an alternative embodiment of exemplary operational flow of FIG. 37.

FIG. 39 illustrates an alternative embodiment of exemplary operational flow 1140 of FIG. 37. In an alternative embodiment, the acquisition operation 1170 may include one or more additional operations. The additional operations may include an operation 1172, an operation 1174, an operation 1176, an operation 1178, an operation 1180, and an operation 1182. At the operation 1172, an end user assistance is obtained from a source distinct from the electronic device. At the operation 1174, a user information corresponding to the state of the electronic device is obtained. At the operation 1176, a user instruction corresponding to the state of the electronic device is obtained. At the operation 1178, a user education corresponding to the state of the electronic device is obtained. At the operation 1180, operational information corresponding to the state of the electronic device is obtained. At the operation 1182, operational information is obtained from a portion of another user assistance corresponding to the state of the electronic device. In a further alternative embodiment, the help operation 1190 may include one or more additional operations, such as additional operation 1192. At the operation 1192, an end user assistance is broadcast from a device distinct from the electronic device.

FIG. 40 illustrates a partial view of an exemplary computer program product 1200 that includes a computer program 1204 for executing a computer process on a computing device. An embodiment of the exemplary computer program product 1200 may be provided using a computer-readable medium 1202, and includes computer executable instructions. The computer product 1200 encodes the computer program 1204 for executing on a computing device a computer process that includes identifying a state of an electronic device, obtaining an end user assistance corresponding to the state of the electronic device, and providing the end user assistance. The computer-readable medium 1202 may include a computer storage medium, which may be carried by a computer-readable carrier (not shown). The computer-readable medium 1202 may include a communications medium (not shown).

Figure 41:
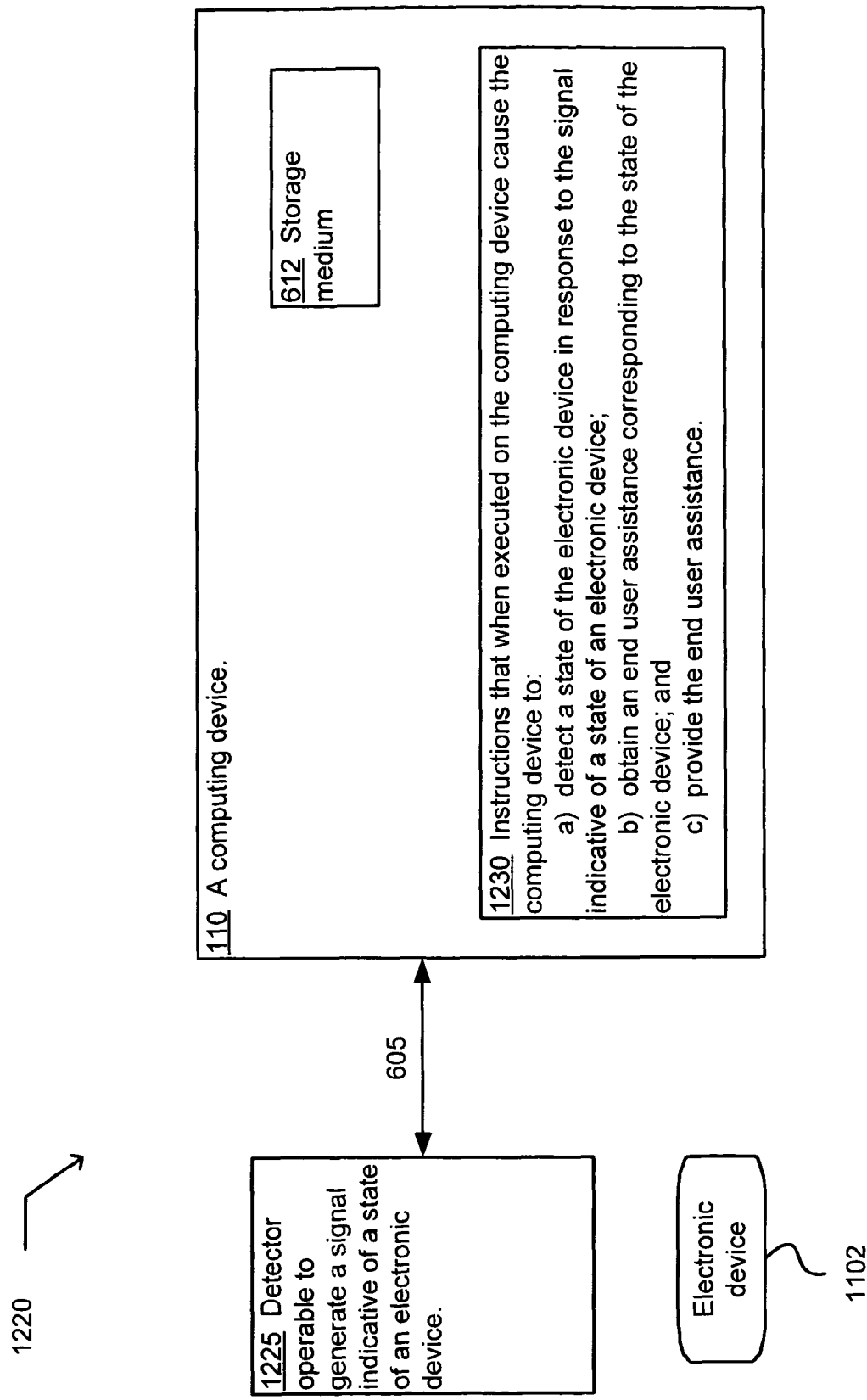
FIG. 41 illustrates an exemplary system in which embodiments may be implemented.

FIG. 41 illustrates an exemplary system 1220 in which embodiments may be implemented. The system 1220 includes a computing device, illustrated as the computing device 110 of FIG. 2. The system 1220 may include a detector 1225 operable to generate a signal indicative of a state of an electronic device, such as the electronic device 1102 of FIG. 36. The computing device 110 includes an operability to receive the signal indicative of a state of an electronic device. The detector 1225 and the computing device 110 are coupled by a coupler, such as the coupler 605 of FIG. 19, which may include a wired and/or a wireless coupler. The computing device 110 further includes a computer program product encoding a computer program for executing on the computing device a computer process for providing an end user assistance. The computer process includes instructions 1230 that when executed on the computing device cause the computing device to detect a state of the electronic device in response to the signal indicative of a state of an electronic device, obtain an end user assistance corresponding to the state of the electronic device, and provide the end user assistance. In an embodiment, the electronic device 1102 may include the computing device 110.

Figure 42:
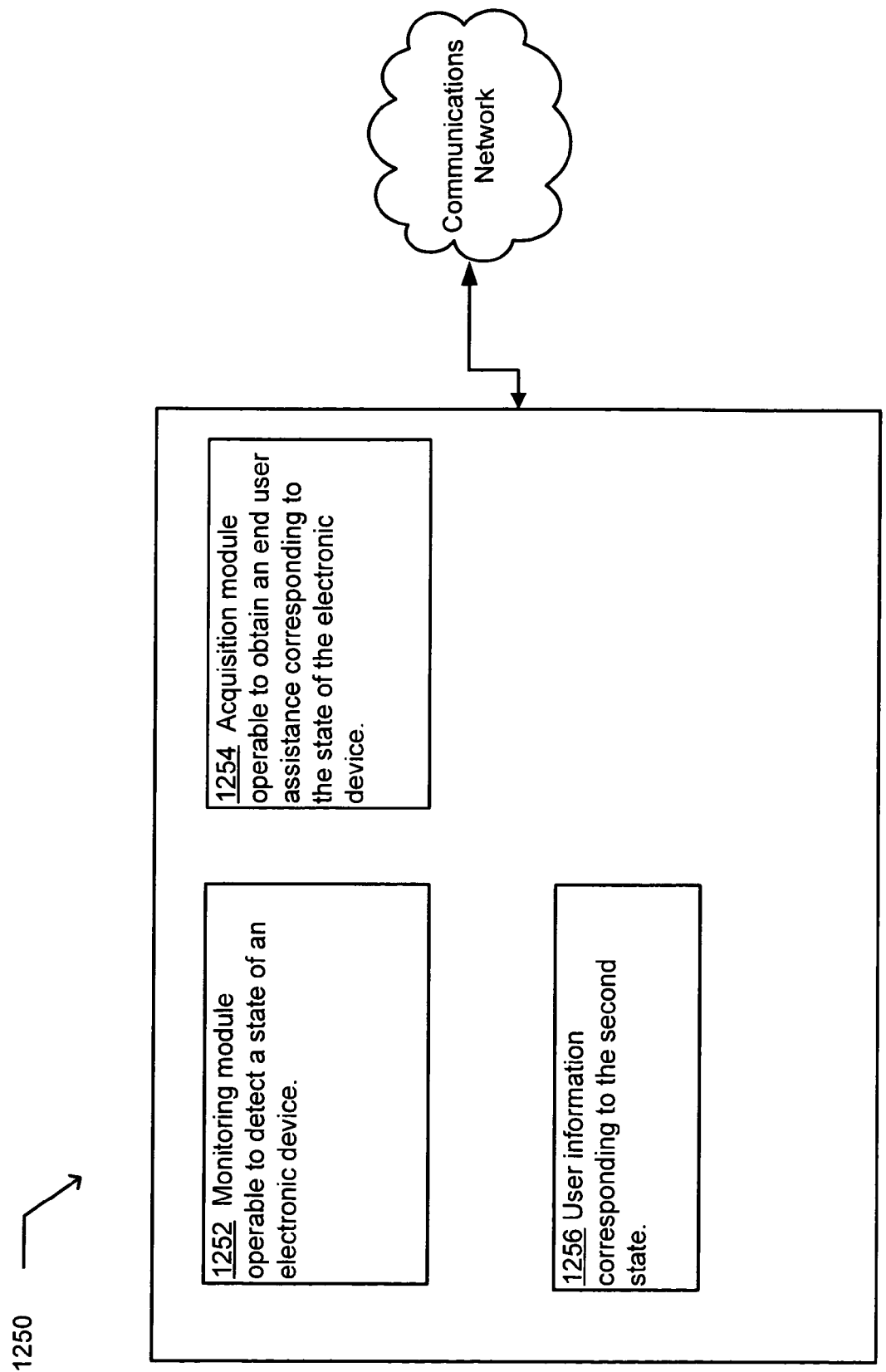
FIG. 42 illustrates another exemplary system in which embodiments may be implemented.

FIG. 42 illustrates an exemplary system 1250 in which embodiments may be implemented. The system 1250 includes a monitoring module 1252, an acquisition module 1254, and a user interface 1256. The monitoring module 1252 includes an operability to detect a state of an electronic device. The acquisition module 1254 includes an operability to obtain an end user assistance corresponding to the state of the electronic device. The user interface module 1256 includes an operability to provide the end user assistance corresponding to the second state of the electronic device.

Figure 43:
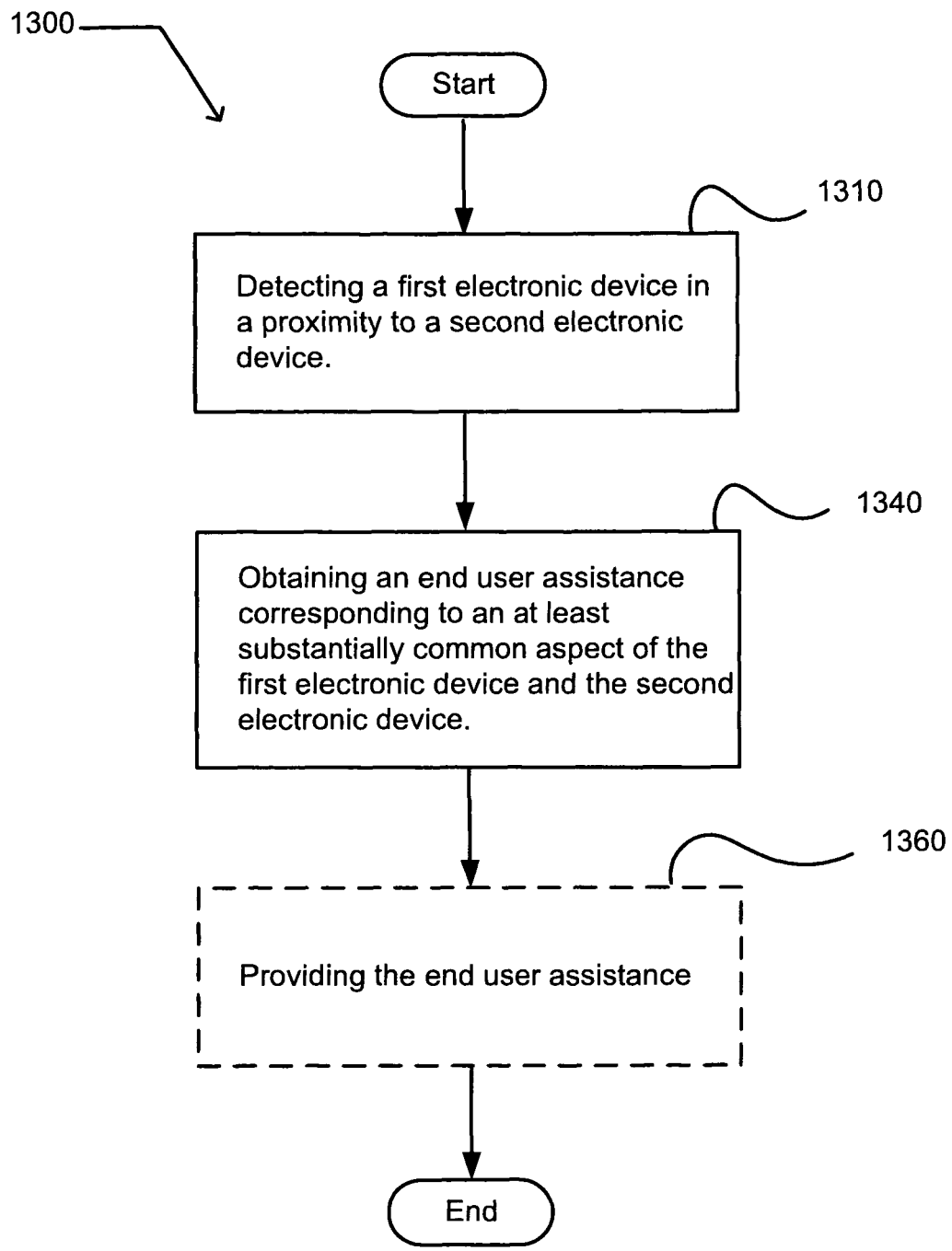
FIG. 43 illustrates an operational flow representing exemplary operations that obtains an end user assistance corresponding to an at least substantially common aspect of the first electronic device and the second electronic device.

FIG. 43 illustrates an operational flow 1300 representing exemplary operations that obtain an end user assistance corresponding to an at least substantially common aspect of the first electronic device and the second electronic device. After a start operation, the operation flow 1300 moves to a sensing operation 1310. At the sensing operation 1310, a first electronic device in a proximity to a second electronic device is detected. At an acquisition operation 1340, an end user assistance corresponding to an at least substantially common aspect of the first electronic device and the second electronic device is obtained. The operational flow 1300 then moves to an end operation. In an alternative embodiment, the operational flow 1300 may include one or more additional operations, such as an operation 1360. At the operation 1360, the end user assistance is provided.

Figure 44:
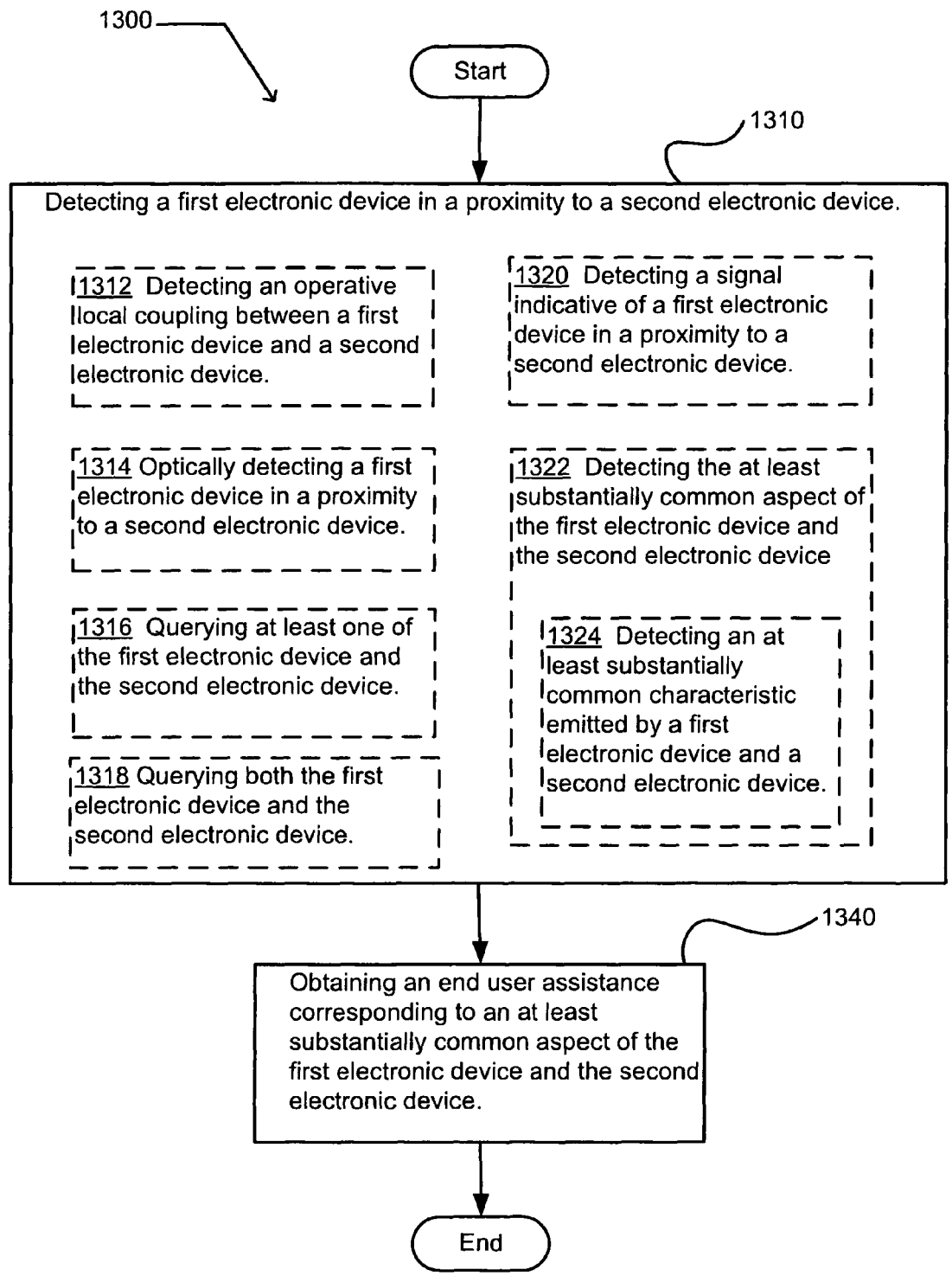
FIG. 44 illustrates an alternative embodiment of the exemplary operational flow of FIG. 43.

FIG. 44 illustrates an alternative embodiment of the exemplary operational flow 1300 of FIG. 43. The sensing operation 1310 may include one or more additional operations. The additional operations may include an operation 1312, an operation 1314, an operation 1316, an operation 1318, an operation 1320, and an operation 1322. At the operation 1312, an operative local coupling is detected between a first electronic device and a second electronic device. In an alternative embodiment, the operative local coupling may include a coupling directly between the first and second electronic devices, and not through an intermediate device. In another alternative embodiment, the operative local coupling may include a coupling between the first and second electronic devices through an intermediate device, wherein the first and second electronic devices and the intermediate device are all located within a premises, such as a residential premises and/or a business premises. At the operation 1314, a first electronic device is optically detected in a proximity to a second electronic device. At the operation 1316, at least one of the first electronic device and the second electronic device is queried to detect a first electronic device in a proximity to a second electronic device. At the operation 1318, both of the first electronic device and the second electronic device are queried to detect a first electronic device in a proximity to a second electronic device. For example, in an embodiment, both the first and second electronic devices may be queried for their GPS coordinates, and proximity detected by comparing the GPS coordinates. At the operation 1320, a signal indicative of a first electronic device in a proximity to a second electronic device is detected. In an embodiment, the detecting may include detecting a presence of a substantially common low power tuner signal, such as a heterodyne signal, RFID signals, emitted sounds, signals transmitted on a preselected frequency and/or frequencies commonly used by portable wireless devices. At the operation 1322, an at least substantially common aspect of the first electronic device and the second electronic device are detected. For example, in an embodiment, the first and second electronic devices may be queried for address books, contact lists, favorites lists, and/or channel presets. The operation 1322 may include one or more additional operations, such as the operation 1324. At the operation 1324, an at least substantially common characteristic emitted by a first electronic device and a second electronic device is detected.

Figure 45:
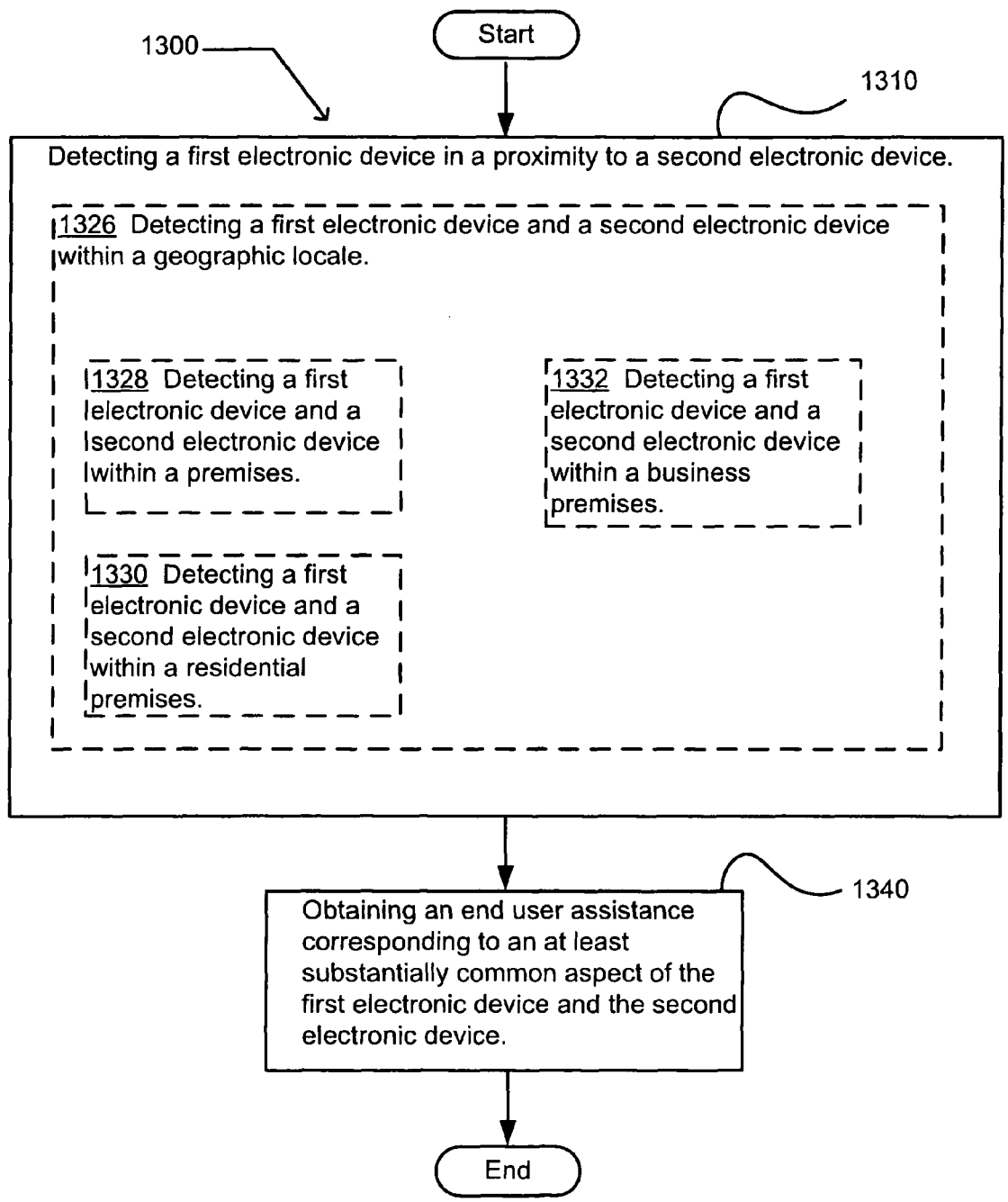
FIG. 45 illustrates another alternative embodiment of the exemplary operational flow of FIG. 43.

FIG. 45 illustrates an alternative embodiment of the exemplary operational flow 1300 of FIG. 43. The sensing operation 1310 may include one or more additional operations, such as the operation 1326. At the operation 1326, a first electronic device and a second electronic device are detected within a geographic locale. The operation 1326 may include one or more additional operations. The additional operations may include an operation 1328, an operation 1330, and an operation 1332. At the operation 1328, a first electronic device and a second electronic device are detected within a premises. At the operation 1330, a first electronic device and a second electronic device are detected within a residential premises. At the operation 1332, a first electronic device and a second electronic device are detected within a business premises.

Figure 46:
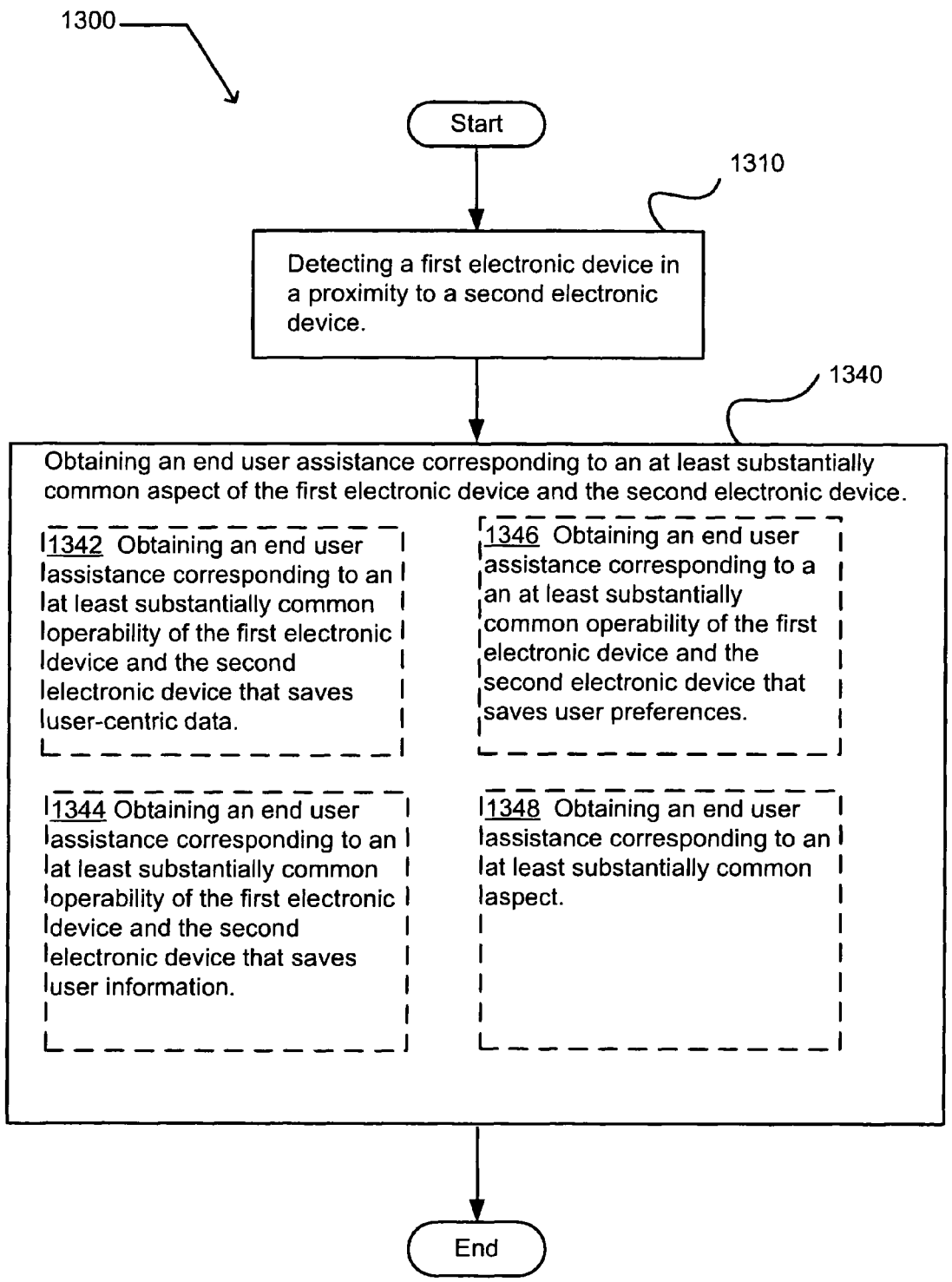
FIG. 46 illustrates an alternative embodiment of the exemplary operational flow of FIG. 43.

FIG. 46 illustrates an alternative embodiment of the exemplary operational flow 1300 of FIG. 43. The acquisition operation 1340 may include one or more additional operations. The additional operations may include an operation 1342, an operation 1344, an operation 1346, and an operation 1348. At the operation 1342, an end user assistance is obtained corresponding to an at least substantially common operability that saves user-centric data of the first electronic device and the second electronic device. At the operation 1344, an end user assistance is obtained corresponding to an at least substantially common operability that saves user information of the first electronic device and the second electronic device. At the operation 1346, an end user assistance is obtained corresponding to an at least substantially common operability that saves user preferences of the first electronic device and the second electronic device. At the operation 1348, an end user assistance is obtained corresponding to an at least substantially common aspect.

FIG. 47 illustrates an alternative embodiment of the exemplary operational flow 1300 of FIG. 43. The acquisition operation 1340 may include one or more additional operations. The additional operations may include an operation 1350, and operation 1352, an operation 1354, and an operation 1356. At the operation 1350, a user instruction is obtained corresponding to an at least substantially common aspect of the first electronic device and the second electronic device. At the operation 1352, a user education is obtained corresponding to a substantially common state of the electronic device of the first electronic device and the second electronic device. At the operation 1354, an operational information is obtained corresponding to a substantially common state of the electronic device of the first electronic device and the second electronic device. At the operation 1356, an end user assistance is obtained from a portion of another user assistance.

FIG. 48 illustrates a partial view of an exemplary computer program product 1380 that includes a computer program 1384 for executing a computer process on a computing device. An embodiment of the exemplary computer program product 1380 may be provided using a computer-readable medium 1382, and includes computer executable instructions. The computer product 1380 encodes the computer program 1384 for executing on a computing device a computer process that includes detecting a first electronic device in a proximity to a second electronic device, and obtaining an end user assistance corresponding to an at least substantially common aspect of the first electronic device and the second electronic device. In an alternative embodiment, the process may include at least one additional instruction, such as an instruction 1386. At the instruction 1386, the process includes providing the end user assistance. The computer-readable medium 1382 may include a computer storage medium, which may be carried by a computer-readable carrier (not shown). The computer-readable medium 1382 may include a communications medium (not shown).

Figure 49:
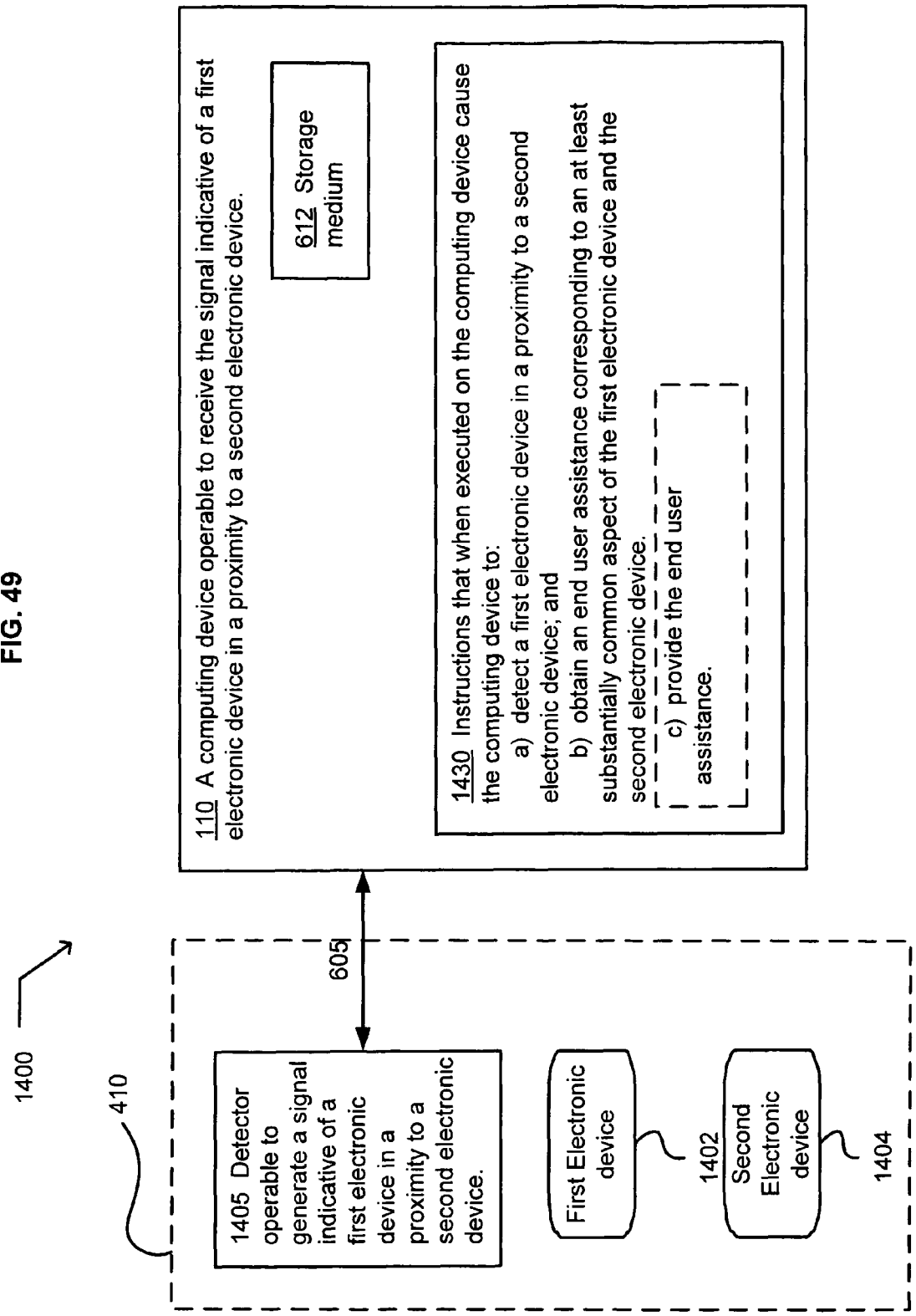
FIG. 49 illustrates an exemplary system in which embodiments may be implemented.

FIG. 49 illustrates an exemplary system 1400 in which embodiments may be implemented. The system 1400 includes a computing device, illustrated as the computing device 110 of FIG. 2. The system 1400 may include a detector 1405 operable to generate a signal indicative of a first electronic device in a proximity to a second electronic device, which is illustrated as a first electronic device 1402 and a second electronic device 1404 located within the geographic locale 410. The computing device 110 includes an operability to receive the signal indicative of a first electronic device 1402 in a proximity to the second atomic device 1404. The detector 1405 and the computing device 110 are coupled by a coupler, such as the coupler 605 of FIG. 19. The computing device 110 further includes a computer program product encoding a computer program for executing on the computing device a computer process for obtaining an end user assistance. The computer process includes instructions 1430 that when executed on the computing device cause the computing device to detect a first electronic device in a proximity to a second electronic device, and obtain an end user assistance corresponding to an at least substantially common aspect of the first electronic device and the second electronic device. In an alternative embodiment, the computer process may include additional instructions, such as to provide the end user assistance. In an embodiment, the first electronic device 1402 may include the computing device 110. In another embodiment, the computing device 110 may include the first electronic device 1402.

Figure 50:
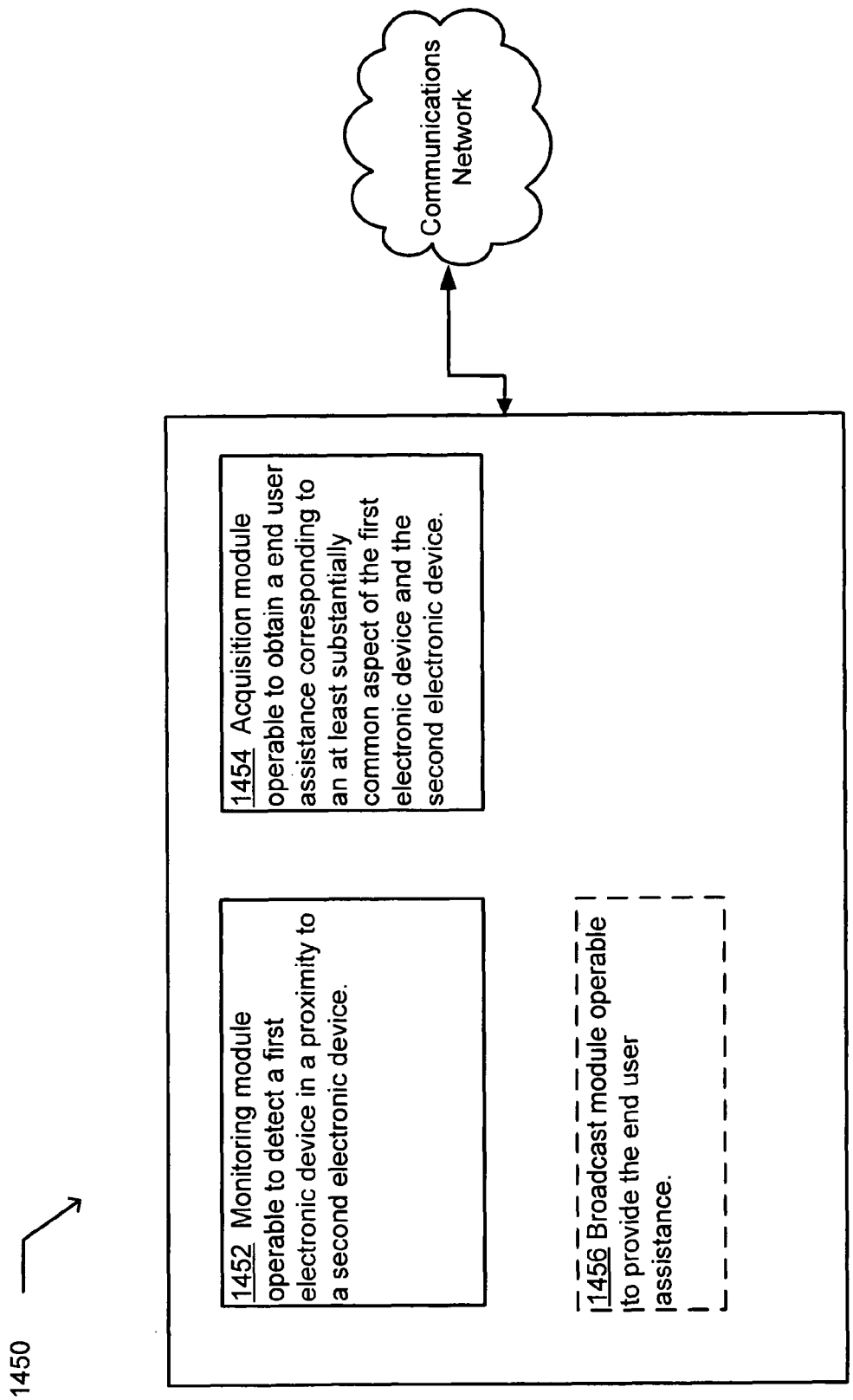
FIG. 50 illustrates an exemplary system in which embodiments may be implemented.

FIG. 50 illustrates an exemplary system 1450 in which embodiments may be implemented. The system 1450 includes a monitoring module 1452, and an acquisition module 1454. The monitoring module 1452 includes an operability to detect a first electronic device in a proximity to a second electronic device. The acquisition module 1454 includes an operability to obtain an end user assistance corresponding to an at least substantially common aspect of the first electronic device and the second electronic device. In an alternative embodiment, the system 1450 may include one or more additional modules, such as a broadcast module 1456. The broadcast module 1456 includes an operability to provide the end user assistance.

Figure 51:
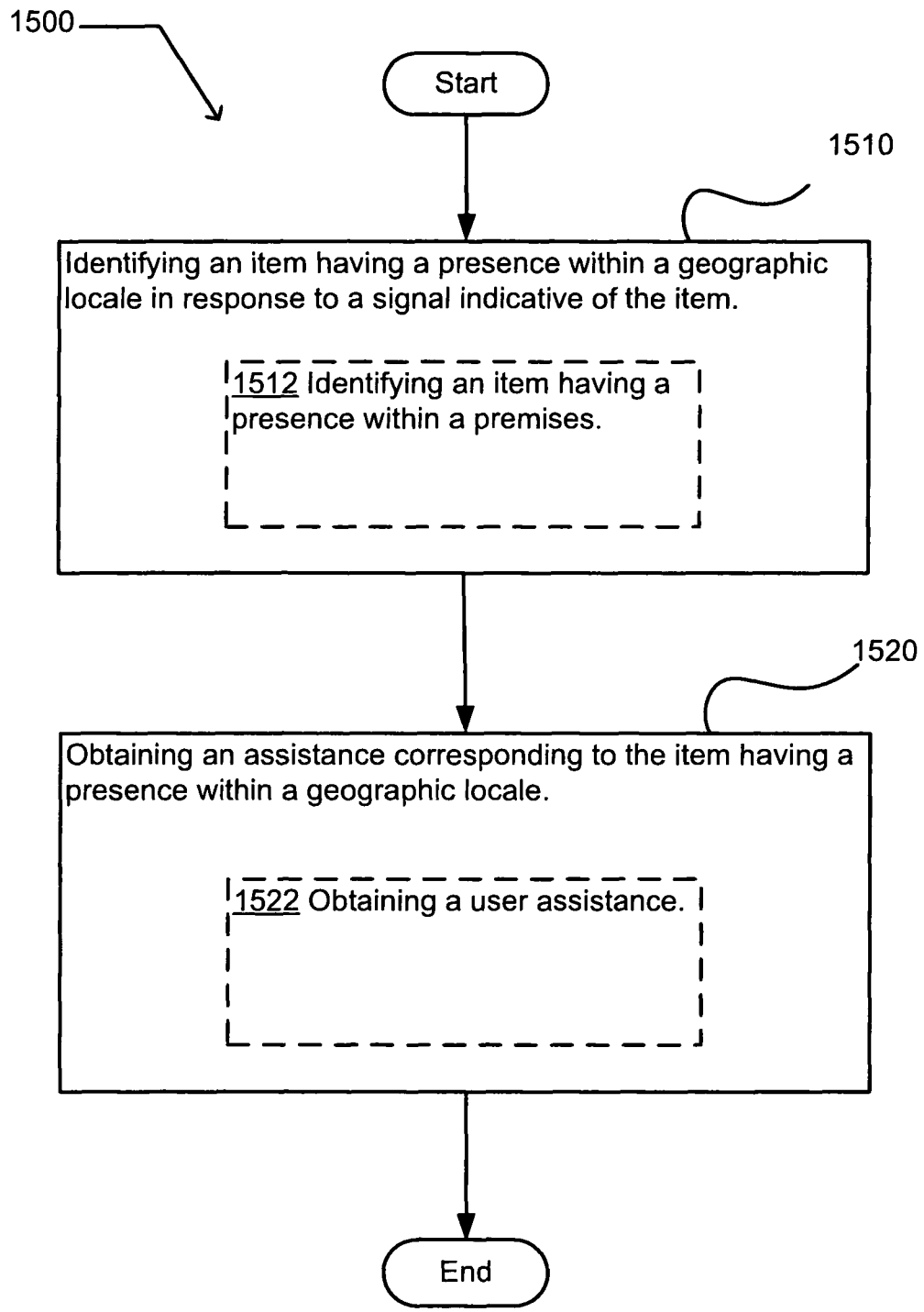
FIG. 51 illustrates an operational flow representing exemplary operations that obtain an assistance corresponding to an item having a presence within a geographic locale.

FIG. 51 illustrates an operational flow 1500 representing exemplary operations that obtain an assistance corresponding to an item having a presence within a geographic locale. After a start operation, the operational flow 1500 moves to a recognition operation 1510 where an item having a presence within a geographic locale is identified in response to a signal indicative of the item. At help operation 1520, an assistance is obtained corresponding to the item having a presence within a geographic locale. In an embodiment, the assistance to its may include any type of assistance. For example, the assistance may include an assistance for use by a user, and/or an assistance for use by the item. By way of further example, an assistance for use by the item may include, for example, an upgrade to a firmware or program present in the item, and responding to a recall notice. A response to a recall notice may include, for example, ordering a replacement part in response to the recall notice. In another example, an assistance may include an assistance correlating to developing, manufacturing, handling, storing, stocking, wholesaling, transporting, and/or retailing the item. In an alternative embodiment, the recognition operation 1510 may include the operation 1512, wherein an item having a presence within a premises is identified in response to a signal indicative of the item. In a further alternative embodiment, the help operation 1520 may include the operation 1522, wherein an end user assistance is obtained. The operational flow 1500 then moves to an end operation.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim 1ncludes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

What is claimed is:

1. A method comprising:
   detecting a first electronic device in a proximity to a second electronic device; and
   obtaining an end user assistance corresponding to an at least substantially common aspect of the first electronic device and the second electronic device.

2. The method of claim 1, wherein the detecting a first electronic device in a proximity to a second electronic device includes
   detecting an operative local coupling between a first electronic device and a second electronic device.

3. The method of claim 1, wherein the detecting a first electronic device in a proximity to a second electronic device includes
   optically detecting a first electronic device in a proximity to a second electronic device.

4. The method of claim 1, wherein the detecting a first electronic device in a proximity to a second electronic device includes
   querying at least one of the first electronic device and the second electronic device.

5. The method of claim 1, wherein the detecting a first electronic device in a proximity to a second electronic device includes
   querying both the first electronic device and the second electronic device.

6. The method of claim 1, wherein the detecting a first electronic device in a proximity to a second electronic device includes
   detecting a signal indicative of a first electronic device in a proximity to a second electronic device.

7. The method of claim 1, wherein the detecting a first electronic device in a proximity to a second electronic device includes
   detecting the at least substantially common aspect of the first electronic device and the second electronic device.

8. The method of claim 7, wherein the detecting an the at least substantially common aspect of the first electronic device and the second electronic device includes
   detecting an at least substantially common characteristic emitted by a first electronic device and a second electronic device.

9. The method of claim 1, wherein the detecting a first electronic device in proximity to a second electronic device includes
   detecting a first electronic device and a second electronic device within a geographic locale.

10. The method of claim 9, wherein the detecting a first electronic device and a second electronic device within a geographic locale includes
    detecting a first electronic device and a second electronic device within a premises.

11. The method of claim 9, wherein the detecting a first electronic device and a second electronic device within a geographic locale includes
 detecting a first electronic device and a second electronic device within a residential premises.

12. The method of claim 9, wherein the detecting a first electronic device and a second electronic device within a geographic locale includes
 detecting a first electronic device and a second electronic device within a business premises.

13. The method of claim 1, wherein the obtaining an end user assistance corresponding to an at least substantially common aspect of the first electronic device and the second electronic device includes
 obtaining an end user assistance corresponding an at least substantially common operability of the first electronic device and the second electronic device that saves a user information.

14. The method of claim 1, wherein the obtaining an end user assistance corresponding to an at least substantially common aspect includes
 obtaining a user information corresponding to an at least substantially common aspect of the first electronic device and the second electronic device.

15. The method of claim 1, wherein the obtaining an end user assistance corresponding to an at least substantially common aspect of the first electronic device and the second electronic device includes
 obtaining a user instruction corresponding to an at least substantially common aspect of the first electronic device and the second electronic device.

16. The method of claim 1, wherein the obtaining an end user assistance corresponding to an at least substantially common aspect of the first electronic device and the second electronic device includes
 obtaining a user education corresponding to a substantially common state of the electronic device of the first electronic device and the second electronic device.

17. The method of claim 1, wherein the obtaining an end user assistance corresponding to an at least substantially common aspect of the first electronic device and the second electronic device
 includes obtaining an operational information corresponding to a substantially common state of the electronic device of the first electronic device and the second electronic device.

18. The method of claim 1, wherein the obtaining an end user assistance corresponding to an at least substantially common aspect of the first electronic device and the second electronic device includes
 obtaining an end user assistance from a portion of another end user assistance.

19. The method of claim 1, further comprising:
 a) providing the end user assistance.

20. A computer program product encoding a computer program for executing on a computing device a computer process, the computer process comprising:
 detecting a first electronic device in a proximity to a second electronic device; and
 obtaining an end user assistance corresponding to an at least substantially common aspect of the first electronic device and the second electronic device.

21. The computer program product of claim 20, the computer process further comprises:
 providing the end user assistance.

22. The computer program product of claim 21, wherein the computer-readable medium includes a computer-readable medium carried by a computer-readable carrier.

23. The computer program product of claim 20, wherein the computer program product includes a computer-readable medium.

24. The computer program product of claim 20, wherein the computer program product includes a communications medium.

25. A system comprising:
 a computing device; and
 instructions that when executed on the computing device configure the computing device for:
  detecting a first electronic device in a proximity to a second electronic device; and
  obtaining an end user assistance corresponding to an at least substantially common aspect of the first electronic device and the second electronic device.

26. The system of claim 25, wherein the instruction further comprise:
 providing the end user assistance.

27. The system of claim 25, wherein the first electronic device includes the computing device.

28. The system of claim 25, wherein the computing device includes the first electronic device.

29. A device comprising:
 a monitoring module operable for:
  detecting a first electronic device in a proximity to a second electronic device; and
 an acquisition module operable for obtaining an end user assistance corresponding to an at least substantially common aspect of the first electronic device and the second electronic device.

30. The device of claim 29, further comprising:
 a broadcast module operable to provide the end user assistance.

31. A method comprising:
 obtaining GPS coordinates of a first electronic device;
 obtaining GPS coordinates of a second electronic device;
 obtaining an end user assistance corresponding to an at least substantially common aspect of the first electronic device and the second electronic device in response to a proximity of the first electronic device and the second electronic device determined from the GPS coordinates of the first electronic device and the GPS coordinates of the second electronic device.

* * * * *